US012700251B2

(12) United States Patent
Montero et al.

(10) Patent No.: US 12,700,251 B2
(45) Date of Patent: Aug. 4, 2026

---

(54) METHODS, SYSTEMS, ARTICLES OF MANUFACTURE, AND APPARATUS TO DETECT LINES ON DOCUMENTS

(71) Applicant: Nielsen Consumer LLC, Chicago, IL (US)

(72) Inventors: David Montero, Valladolid (ES); Jose Javier Yebes Torres, Valladolid (ES)

(73) Assignee: Nielsen Consumer LLC, Chicago, IL (US)

( * ) Notice: Subject to any disclaimer, the term of this patent is extended or adjusted under 35 U.S.C. 154(b) by 526 days.

(21) Appl. No.: 18/148,928

(22) Filed: Dec. 30, 2022

(65) Prior Publication Data

US 2023/0394859 A1 Dec. 7, 2023

Related U.S. Application Data

(60) Provisional application No. 63/349,898, filed on Jun. 7, 2022.

(51) Int. Cl.
| | |
|---|---|
| *G06V 30/148* | (2022.01) |
| *G06V 10/82* | (2022.01) |

(Continued)

(52) U.S. Cl.
CPC ............ *G06V 30/153* (2022.01); *G06V 10/82* (2022.01); *G06V 30/146* (2022.01);

(Continued)

(58) Field of Classification Search
CPC .. G06V 30/146; G06V 30/153; G06V 30/414; G06V 30/1801; G06V 10/82; G06Q 30/0201

See application file for complete search history.

(56) References Cited

U.S. PATENT DOCUMENTS

| | | | |
|---|---|---|---|
| 3,323,135 A | 6/1967 | Miller | |
| 5,410,611 A | 4/1995 | Huttenlocher et al. | |

(Continued)

FOREIGN PATENT DOCUMENTS

| | | |
|---|---|---|
| CA | 2957433 A1 | 9/2017 |
| CA | 2957433 C | 6/2020 |

(Continued)

OTHER PUBLICATIONS

Guillaume et al., "FUNSD: A Dataset for Form Understanding in Noisy Scanned Documents," International Conference on Document Analysis and Recognition (ICDAR), arXiv, Oct. 29, 2019, 6 pages.

(Continued)

*Primary Examiner* — Daniel G Mariam
(74) *Attorney, Agent, or Firm* — Hanley, Flight & Zimmerman, LLC

(57) ABSTRACT

Methods, apparatus, systems, and articles of manufacture are disclosed that detect lines in a document. An example apparatus includes at least one memory; machine readable instructions; and processor circuitry to at least one of instantiate or execute the machine readable instructions to: generate feature embeddings for text segments detected in a document image, the segments associated with respective bounding boxes, wherein the segments are to be represented by nodes in a graph; identify candidate edges between ones of the segments; pass the feature embeddings through graph attention layers (GAT) to update the feature embeddings with information from neighbor nodes; generate an adjacency matrix for the document image by determining confidence scores for the edges; and cluster the nodes based on the adjacency matrix to group ones of the nodes that belong to a same line.

25 Claims, 19 Drawing Sheets

(51) Int. Cl.
    *G06V 30/146*      (2022.01)
    *G06V 30/18*        (2022.01)
    *G06V 30/414*      (2022.01)
    *G06Q 30/0201*    (2023.01)

(52) U.S. Cl.
    CPC ........ *G06V 30/1801* (2022.01); *G06V 30/414*
        (2022.01); *G06Q 30/0201* (2013.01)

(56)         References Cited

U.S. PATENT DOCUMENTS

| | | | |
|---|---|---|---|
| 5,606,690 | A | 2/1997 | Hunter et al. |
| 7,454,063 | B1 | 11/2008 | Kneisl et al. |
| 7,792,709 | B1 | 9/2010 | Trandal et al. |
| 8,285,047 | B2 | 10/2012 | Nagarajan et al. |
| 8,494,281 | B2 | 7/2013 | Nagarajan |
| 8,787,695 | B2 | 7/2014 | Wu |
| 8,792,141 | B2 | 7/2014 | Moore et al. |
| 8,855,375 | B2 | 10/2014 | Macciola et al. |
| 8,983,170 | B2 | 3/2015 | Nepomniachtchi et al. |
| 9,014,432 | B2 | 4/2015 | Fan et al. |
| 9,158,744 | B2 | 10/2015 | Rao |
| 9,239,952 | B2 | 1/2016 | Hsu |
| 9,262,686 | B1 | 2/2016 | Singer |
| 9,290,022 | B2 | 3/2016 | Makabe |
| 9,298,685 | B2 | 3/2016 | Barrus |
| 9,298,979 | B2 | 3/2016 | Nepomniachtchi et al. |
| 9,323,135 | B1 | 4/2016 | Veloso |
| 9,324,073 | B2 | 4/2016 | Nepomniachtchi et al. |
| 9,384,389 | B1 | 7/2016 | Sankaranarayanan |
| 9,384,839 | B2 | 7/2016 | Avila et al. |
| 9,396,540 | B1 | 7/2016 | Sampson |
| 9,684,842 | B2 | 6/2017 | Deng |
| 9,710,702 | B2 | 7/2017 | Nepomniachtchi et al. |
| 9,747,504 | B2 | 8/2017 | Ma et al. |
| 9,760,786 | B2 | 9/2017 | Sahagun et al. |
| 9,824,270 | B1 | 11/2017 | Mao |
| 9,875,385 | B1 | 1/2018 | Humphreys |
| 10,026,061 | B2 | 7/2018 | Cheek |
| 10,032,072 | B1 | 7/2018 | Tran et al. |
| 10,157,425 | B2 | 12/2018 | Chelst et al. |
| 10,235,585 | B2 | 3/2019 | Deng |
| 10,242,285 | B2 | 3/2019 | Thrasher et al. |
| 10,395,772 | B1 | 8/2019 | Lucas et al. |
| 10,679,283 | B1 | 6/2020 | Pesce |
| 10,970,768 | B2 | 4/2021 | Zheng et al. |
| 11,256,760 | B1 | 2/2022 | Corcoran |
| 11,257,049 | B1 | 2/2022 | Durazo Almeida |
| 11,321,956 | B1 | 5/2022 | Geng |
| 11,410,446 | B2 | 8/2022 | Shanmuganathan et al. |
| 11,414,053 | B2 | 8/2022 | Tanaami et al. |
| 11,468,491 | B2 | 10/2022 | Dalal |
| 11,476,981 | B2 | 10/2022 | Wei et al. |
| 11,562,557 | B2 | 1/2023 | Miginnis et al. |
| 11,587,148 | B2 | 2/2023 | Elder |
| 11,593,552 | B2 | 2/2023 | Sarkar |
| 11,609,956 | B2 | 3/2023 | Jain |
| 11,625,930 | B2 | 4/2023 | Rodriguez et al. |
| 11,809,985 | B2 | 11/2023 | Polania Cabrera |
| 11,810,380 | B2 | 11/2023 | Arroyo |
| 11,810,383 | B2 | 11/2023 | Patel et al. |
| 11,842,035 | B2 | 12/2023 | Jahjah et al. |
| 2002/0037097 | A1 | 3/2002 | Hoyos et al. |
| 2003/0185448 | A1 | 10/2003 | Seeger et al. |
| 2006/0232619 | A1 | 10/2006 | Otsuka et al. |
| 2006/0245650 | A1 | 11/2006 | Jun |
| 2007/0033533 | A1 | 2/2007 | Sull |
| 2007/0041642 | A1 | 2/2007 | Romanoff et al. |
| 2008/0205759 | A1 | 8/2008 | Zandifar et al. |
| 2009/0164422 | A1 | 6/2009 | Pacella |
| 2010/0306080 | A1 | 12/2010 | Trandal et al. |
| 2011/0122443 | A1 | 5/2011 | Otsuka et al. |
| 2011/0243445 | A1 | 10/2011 | Uzelac et al. |
| 2011/0289395 | A1 | 11/2011 | Breuel et al. |
| 2011/0311145 | A1 | 12/2011 | Bern et al. |
| 2012/0183211 | A1 | 7/2012 | Hsu et al. |
| 2012/0274953 | A1 | 11/2012 | Makabe |
| 2012/0330971 | A1 | 12/2012 | Thomas et al. |
| 2013/0058575 | A1 | 3/2013 | Koo et al. |
| 2013/0170741 | A9 | 7/2013 | Hsu et al. |
| 2014/0002868 | A1 | 1/2014 | Landa et al. |
| 2014/0064618 | A1 | 3/2014 | Janssen, Jr. |
| 2014/0188647 | A1 | 7/2014 | Argue |
| 2014/0195891 | A1 | 7/2014 | Venkata Radha Krishna Rao |
| 2015/0039479 | A1 | 2/2015 | Gotanda |
| 2015/0127428 | A1 | 5/2015 | Gharachorloo |
| 2015/0169951 | A1 | 6/2015 | Khintsitskiy et al. |
| 2015/0254778 | A1 | 9/2015 | Kmak et al. |
| 2015/0317642 | A1 | 11/2015 | Argue |
| 2015/0363792 | A1 | 12/2015 | Arini |
| 2015/0363822 | A1 | 12/2015 | Rowe |
| 2016/0005189 | A1 | 1/2016 | Gray |
| 2016/0034863 | A1 | 2/2016 | Ross |
| 2016/0063469 | A1 | 3/2016 | Etzion |
| 2016/0125383 | A1 | 5/2016 | Chan |
| 2016/0171585 | A1 | 6/2016 | Singh |
| 2016/0203625 | A1 | 7/2016 | Khan et al. |
| 2016/0210507 | A1 | 7/2016 | Abdollahian |
| 2016/0234431 | A1 | 8/2016 | Kraft et al. |
| 2016/0307059 | A1 | 10/2016 | Chaudhury et al. |
| 2016/0342863 | A1 | 11/2016 | Kwon et al. |
| 2016/0350954 | A1 | 12/2016 | Agarwala |
| 2017/0206536 | A1 | 7/2017 | Brelig |
| 2017/0293819 | A1 | 10/2017 | Deng |
| 2017/0329749 | A1 | 11/2017 | Milward |
| 2017/0364450 | A1 | 12/2017 | Struttmann |
| 2018/0005345 | A1 | 1/2018 | Apodaca et al. |
| 2018/0053045 | A1 | 2/2018 | Lorenzini et al. |
| 2018/0060302 | A1 | 3/2018 | Liang et al. |
| 2018/0317116 | A1 | 11/2018 | Komissarov et al. |
| 2018/0336509 | A1 | 11/2018 | Guttmann |
| 2019/0026803 | A1 | 1/2019 | De Guzman |
| 2019/0050639 | A1 | 2/2019 | Ast |
| 2019/0080207 | A1 | 3/2019 | Chang |
| 2019/0130622 | A1 | 5/2019 | Hoover |
| 2019/0171900 | A1 | 6/2019 | Thrasher et al. |
| 2019/0244020 | A1 | 8/2019 | Yoshino et al. |
| 2019/0272360 | A1 | 9/2019 | Kursun |
| 2019/0325211 | A1 | 10/2019 | Ordonez et al. |
| 2019/0332662 | A1 | 10/2019 | Middendorf et al. |
| 2019/0354818 | A1 | 11/2019 | Reisswig et al. |
| 2020/0097718 | A1 | 3/2020 | Schäfer |
| 2020/0097759 | A1 | 3/2020 | Nadim |
| 2020/0142856 | A1 | 5/2020 | Neelamana |
| 2020/0151444 | A1 | 5/2020 | Price et al. |
| 2020/0151902 | A1 | 5/2020 | Almazán |
| 2020/0175267 | A1 | 6/2020 | Schäfer et al. |
| 2020/0190963 | A1 | 6/2020 | Gooneratne |
| 2020/0249803 | A1 | 8/2020 | Sobel et al. |
| 2020/0279107 | A1 | 9/2020 | Staar |
| 2020/0364451 | A1 | 11/2020 | Ammar et al. |
| 2020/0401798 | A1 | 12/2020 | Foncubierta Rodriguez et al. |
| 2020/0410231 | A1 | 12/2020 | Chua et al. |
| 2021/0004880 | A1 | 1/2021 | Benkreira et al. |
| 2021/0009163 | A1 | 1/2021 | Urtasun |
| 2021/0019287 | A1 | 1/2021 | Prasad et al. |
| 2021/0034856 | A1 | 2/2021 | Torres et al. |
| 2021/0090694 | A1 | 3/2021 | Colley et al. |
| 2021/0117665 | A1 | 4/2021 | Simantov et al. |
| 2021/0117668 | A1 | 4/2021 | Zhong et al. |
| 2021/0142092 | A1 | 5/2021 | Zhao et al. |
| 2021/0149926 | A1 | 5/2021 | Komninos et al. |
| 2021/0158038 | A1 | 5/2021 | Shanmuganathan et al. |
| 2021/0216765 | A1 | 7/2021 | Xu |
| 2021/0248420 | A1 | 8/2021 | Zhong et al. |
| 2021/0287313 | A1 | 9/2021 | McCarthy |
| 2021/0295101 | A1 | 9/2021 | Tang et al. |
| 2021/0319217 | A1 | 10/2021 | Wang et al. |
| 2021/0334737 | A1 | 10/2021 | Balaji |
| 2021/0343030 | A1 | 11/2021 | Sagonas et al. |
| 2021/0357710 | A1 | 11/2021 | Zhang et al. |
| 2021/0406533 | A1 | 12/2021 | Arroyo et al. |
| 2022/0004756 | A1 | 1/2022 | Jennings |
| 2022/0114821 | A1 | 4/2022 | Arroyo et al. |

(56) References Cited

U.S. PATENT DOCUMENTS

| 2022/0156489 | A1* | 5/2022 | Agarwal | G06F 40/106 |
|---|---|---|---|---|
| 2022/0180113 | A1 | 6/2022 | Patel | |
| 2022/0189190 | A1 | 6/2022 | Arroyo et al. | |
| 2022/0198185 | A1 | 6/2022 | Prebble | |
| 2022/0350946 | A1 | 11/2022 | Hjerrild | |
| 2022/0383651 | A1 | 12/2022 | Shanmuganathan et al. | |
| 2022/0397809 | A1 | 12/2022 | Talpade et al. | |
| 2022/0414630 | A1 | 12/2022 | Yebes Torres et al. | |
| 2023/0004748 | A1 | 1/2023 | Rodriguez et al. | |
| 2023/0005286 | A1 | 1/2023 | Yebes Torres et al. | |
| 2023/0008198 | A1 | 1/2023 | Gadde et al. | |
| 2023/0057687 | A1 | 2/2023 | Mantri | |
| 2023/0065915 | A1 | 3/2023 | Berestovsky | |
| 2023/0196806 | A1 | 6/2023 | Ramalingam et al. | |
| 2023/0214899 | A1 | 7/2023 | Martínez Cebrián et al. | |
| 2023/0230408 | A1 | 7/2023 | Arroyo et al. | |
| 2023/0306203 | A1* | 9/2023 | Hoang | G06F 40/30 |
| 2023/0394859 | A1 | 12/2023 | Montero et al. | |
| 2024/0013562 | A1 | 1/2024 | Montero | |

FOREIGN PATENT DOCUMENTS

| CN | 100369049 | C | 2/2008 |
|---|---|---|---|
| CN | 103123685 | A | 5/2013 |
| CN | 104866849 | A | 8/2015 |
| CN | 108229397 | A | 6/2018 |
| CN | 108829397 | A | 11/2018 |
| CN | 109389124 | A | 2/2019 |
| CN | 112380835 | A | 2/2021 |
| CN | 112446351 | A | 3/2021 |
| CN | 112560862 | A | 3/2021 |
| CN | 113282726 | A | 8/2021 |
| CN | 112699662 | B | 8/2022 |
| CN | 115017144 | A | 9/2022 |
| CN | 112907973 | B | 4/2023 |
| DE | 202013005144 | U1 | 10/2013 |
| GB | 2595412 | A | 11/2021 |
| JP | H0749529 | A | 2/1995 |
| JP | 2008210850 | A | 9/2008 |
| JP | 2008211850 | A | 9/2008 |
| JP | 2019139737 | A | 8/2019 |
| JP | 7049529 | B2 | 4/2022 |
| KR | 101831204 | B1 | 2/2018 |
| TW | 200821850 | A | 5/2008 |
| WO | 2013044145 | A1 | 3/2013 |
| WO | 2018054326 | A1 | 3/2018 |
| WO | 2018201423 | A1 | 11/2018 |
| WO | 2020194004 | A1 | 10/2020 |
| WO | 2022006295 | A1 | 1/2022 |
| WO | 2022123199 | A1 | 6/2022 |

OTHER PUBLICATIONS

Yadati et al., "HyperGCN: Hypergraph Convolutional Networks for Semi-Supervised Classification," Proceedings of the 33rd International Conference on Neural Information Processing Systems, arXiv, Jan. 26, 2019, 18 pages.
International Searching Authority, " Written Opinion," issued in connection with International Patent Application No. PCT/IB2019/000299, mailed on Dec. 23, 2019, 4 pages.
International Searching Authority, "International Search Report," issued in connection with International Patent Application No. PCT/IB2019/000299, mailed on Dec. 23, 2019, 3 pages.
Github, "Tesseract OCR," Tesseract Repository on GitHub, URL:[https://github. com/tesseract-ocr/], 2020, 3 pages.
Carbonell et al., "Named Entity Recognition and Relation Extraction with Graph Neural Networks in Semi Structured Documents," 2020 International Conference on Pattern Recognition (ICPR), Jan. 10, 2021, 6 pages.
Zacharias et al., "Image Processing Based Scene-Text Detection and Recognition with Tesseract," arXiv (CoRR), dated Apr. 17, 2020, 6 pages.

Liu et al., "RoBERTa: A Robustly Optimized BERT Pretraining Approach," ArXiv abs/1907.11692, Jul. 26, 2019, 13 pages.
Xu et al., "LayoutLM: Pre-training of Text and Layout for Document Image Understanding," International Conference on Knowledge Discovery & Data Mining (SIGKDD), Jun. 16, 2020, 9 pages.
Dong et al., "HNHN: Hypergraph Networks with Hyperedge Neurons," ArXiv abs/2006.12278, dated Jun. 22, 2020, 11 pages.
Yu et al., "PICK: Processing Key Information Extraction from Documents using Improved Graph Learning-Convolutional Networks," International Conference on Pattern Recognition (ICPR), arXiv, dated Jul. 18, 2020, 8 pages.
Chen et al., "HGMF: Heterogeneous Graph-Based Fusion for Multimodal Data with Incompleteness," 26th ACM SIGKDD International Conference on Knowledge Discovery & Data Mining, dated Aug. 23-27, 2020, 11 pages.
Wang et al., "DocStruct: A Multimodal Method to Extract Hierarchy Structure in Document for General Form Understanding," 2020 Conference Empirical Methods in Natural Language Processing (EMNLP), Nov. 16, 2020, 11 pages.
Zhu et al., "Heterogeneous Mini-Graph Neural Network and Its Application to Fraud Invitation Detection," 2020 IEEE International Conference on Data Mining (ICDM), Nov. 17, 2020, 9 pages.
Bandyopadhyay et al. "Hypergraph Attention Isomorphism Network by Learning Line Graph Expansion," 2020 IEEE International Conference on Big Data (Big Data) (2020), 10 pages.
Arroyo et al., "Multi-label classification of promotions in digital leaflets using textual and visual information," Proceedings of the Workshop on Natural Language Processing in E-Commerce (EComNLP), Dec. 12, 2020, 10 pages.
Deepdive, "Distant Supervision," Stanford University, URL:[http://deepdive.stanford.edu/distant supervision], retrieved on Apr. 1, 2022, 2 pages.
Nguyen et al. "End-to-End Hierarchical Relation Extraction for Generic Form Understanding", International Conference on Pattern Recognition (ICPR), arXiv, Jun. 2, 2021, 8 pages.
International Searching Authority, "International Search Report," issued in connection with International Patent Application No. PCT/US2020/061269, mailed on Mar. 11, 2021, 3 pages.
International Searching Authority, "Written Opinion," issued in connection with International Patent Application No. PCT/US2020/061269, mailed on Mar. 11, 2021, 4 Pages.
United States Patent and Trademark Office, "Non-Final Office Action," issued in connection with U.S. Appl. No. 16/692,797, dated Mar. 16, 2021, 12 pages.
Google, "Detect Text in Images," URL:[http://cloud.google.com/vision/docs/ocr], Mar. 29, 2021, 16 pages.
Xu et al., "LayoutXLM: Multimodal Pre-training for Multilingual Visually-rich Document Understanding," arXiv, Sep. 9, 2021, 10 pages.
Ma et al., "Graph Attention Networks with Positional Embeddings," Pacific-Asia Conference on Knowledge Discovery and Data Mining, arXiv, Oct. 24, 2021, 13 pages.
Chen et al., "TextPolar: Irregular Scene Text Detection Using Polar Representation," International Journal on Document Analysis and Recognition (IJDAR), May 7, 2021, 9 pages.
Li et al. "SelfDoc: Self-Supervised Document Representation Learning," 2021 IEEE/CVF Conference on Computer Vision and Pattern Recognition (CVPR), arXiv, Jun. 7, 2021, 10 pages.
Hwang et al., "Spatial Dependency Parsing for Semi-Structured Document Information Extraction," in International Joint Conference on Natural Language Processing (IJCNLP), Jul. 1, 2021, 14 pages.
Li et al., "StructuralLM: Structural Pre-training for Form Understanding," 59th Annual Meeting of the Association for Computational Linguistics, arXiv, May 24, 2021, 10 pages.
Xu et al., "LayoutLMv2: Multi-Modal Pre-Training for Visually-Rich Document Understanding," 59th Annual Meeting of the Association for Computational Linguistics (ACL), arXiv, dated Jan. 10, 2022, 13 pages.
Tang et al., "MatchVIE: Exploiting Match Relevancy between Entities for Visual Information Extraction," 2021 International Joint Conference on Artificial Intelligence (IJCAI), arXiv, Jun. 24, 2021, 7 pages.

(56) References Cited

OTHER PUBLICATIONS

Huang et al., "UniGNN: a Unified Framework for Graph and Hypergraph Neural Networks," 30th International Joint Conference on Artificial Intelligence (IJCAI), arXiv, May 3, 2021, 9 pages.

Qian et al., "A Region-Based Hypergraph Network for Joint Entity-Relation Extraction," Knowledge-Based Systems. vol. 228, Sep. 2021, 8 pages.

Prabhu et al., "MTL-FoUn: A Multi-Task Learning Approach to Form Understanding," 2021 International Conference on Document Analysis and Recognition (ICDAR), Sep. 5, 2021, 5 pages.

Garncarek et al., "LAMBERT: Layout-Aware Language Modeling for Information Extraction," International Conference on Document Analysis and Recognition (ICDAR), arXiv, May 28, 2021, 16 pages.

Davis et al., "Visual FUDGE: Form Understanding via Dynamic Graph Editing," International Conference on Document Analysis and Recognition (ICDAR), arXiv, Jul. 16, 2021, 16 pages.

Shen et al., "LayoutParser: A Unified Toolkit for Deep Learning Based Document Image Analysis," in International Conference on Document Analysis and Recognition (ICDAR), arXiv, Jun. 21, 2021, 16 pages.

Powalski et al., "Going Full-TILT Boogie on Document Understanding with Text-Image-Layout Transformer," International Conference on Document Analysis and Recognition, arXiv, Mar. 2, 2021, 17 pages.

Hong et al., "Bros: A Pre-trained Language Model Focusing on Text and Layout for Better Key Information Extraction from Documents," arXiv (CoRR), Sep. 10, 2021, 13 pages.

Appalaraju et al., "DocFormer: End-to-End Transformer for Document Understanding," arXiv (CoRR), Sep. 20, 2021, 22 pages.

International Searching Authority, "International Preliminary Report on Patentability," issued in connection with International Patent Application No. PCT/IB2019/000299, issued on Sep. 28, 2021, 5 pages.

Li et al., "StrucTexT: Structured Text Understanding with Multi-Modal Transformers," ACM International Conference on Multimedia (ACM Multimedia), arXiv, Nov. 8, 2021, 9 pages.

United States Patent and Trademark Office, "Final Office Action," issued in connection with U.S. Appl. No. 16/692,797, dated Oct. 27, 2021, 14 pages.

International Searching Authority, "International Search Report," issued in connection with International Patent Application No. PCT/US2021/039931, mailed on Nov. 4, 2021, 3 pages.

International Searching Authority, "Written Opinion," issued in connection with International Patent Application No. PCT/US2021/039931, mailed on Nov. 4, 2021, 4 pages.

Zhang et al., "Entity Relation Extraction as Dependency Parsing in Visually Rich Documents," Empirical Methods in Natural Language Processing (EMNLP), Nov. 7, 2021, 10 pages.

Hwang et al., "Cost-Effective End-to-end Information Extraction for Semi-structured Document Images," Empirical Methods in Natural Language Processing (EMNLP), arXiv, Aug. 30, 2021, 9 pages.

Datasetlist, "Annotation Tools For Building Datasets," Labeling tools- List of labeling tools, URL:[retrieved from: https://www.datasetlist.com/tools/], updated Dec. 2021, 12 pages.

Gu et al., "UniDoc: Unified Pretraining Framework for Document Understanding," Neural Information Processing Systems (NeurIPS), arXiv, Apr. 28, 2022, 12 pages.

Park et al. "CORD: A Consolidated Receipt Dataset for Post-OCR Parsing," In Workshop on Document Intelligence NeurIPS 2019, 33rd Conference on Neural Information Processing Systems, Vancouver, Canada, 4 pages.

Wang et al. "LiLT: A Simple yet Effective Language-Independent Layout Transformer for Structured Document Understanding," Annual Meeting of the Association for Computational Linguistics (ACL), arXiv, Feb. 28, 2022, 11 pages.

European Patent Office, "Communication pursuant to Article 94(3) EPC," issued in connection with European Application No. 22184405.3, dated Mar. 19, 2025, 4 pages.

United States Patent and Trademark Office, "Non-Final Office Action," issued in connection with U.S. Appl. No. 18/176,273, dated Apr. 24, 2025, 7 pages.

European Patent Office, "Extended European Search Report," issued in connection with European Patent Application No. 20891012.5, dated Nov. 17, 2023, 12 pages.

Visich, "Bar Codes and Their Applications," Research Foundation of State University of New York, 1990, 59 pages.

Powalski et al., "Going Full-TILT Boogie on Document Understanding with Text-Image-Layout Transformer," International Conference on Document Analysis and Recognition, Sep. 5, 2021, 17 pages.

European Patent Office, "Communication pursuant to Rules 161(2) and 162 EPC," in connection with European Patent Application No. 19921870.2, issued Nov. 5, 2021, 3 pages.

Datasetlist, "Annotation tools for building datasets," Labeling tools— List of labeling tools, Datasetlist.com, updated Dec. 2021, downloaded on Apr. 1, 2022, 12 pages. [retrieved from:https://www.datasetlist.com/tools/].

European Patent Office, "Communication pursuant to Rules 161(2) and 162 EPC," issuedin connection with Application No. 20891012.5, dated Jun. 29, 2022, 3 pages.

European Patent Office, "Communication pursuant to Rules 70(2) and 70a(2) EPC," issued in connection with Application No. 19921870.2, dated Nov. 2, 2022, 1 page.

European Patent Office, "Communication Pursuant to Rule 69 EPC," issued in connection with European Patent Application No. 22180113.7, dated Jan. 10, 2023. 2 pages.

European Patent Office, "Communication pursuant to Rules 70(2) and 70a(2) EPC," issued in connection with European Patent Application No. 20891012.5, dated Dec. 5, 2023, 1 page.

United States Patent and Trademark Office, "Notice of Allowance and Fee(s) Due," issued in connection with U.S. Appl. No. 17/710,538, dated Apr. 19, 2024, 8 pages.

United States Patent and Trademark Office, "Supplemental Notice of Allowability," issued in connection with U.S. Appl. No. 17/710,538, dated May 8, 2024, 3 pages.

Canadian Intellectual Property Office, "Examiner requisition," issued in connection with Canadian Patent Application No. 3,182,471, dated May 28, 2024, 5 pages.

United States Patent and Trademark Office, "Corrected Notice of Allowability," issued in connection with U.S. Appl. No. 17/598,792, dated Jul. 3, 2024, 2 pages.

United States Patent and Trademark Office, "Final Office Action," issued in connection with U.S. Appl. No. 17/566,135, dated Jul. 25, 2024, 17 pages.

International Searching Authority, "International Preliminary Report on Patentability," issued in connection with International Application No. PCT/US2023/011859, mailed on Aug. 6, 2024, 5 pages.

United States Patent and Trademark Office, "Final Office Action," issued in connection with U.S. Appl. No. 18/476,978, dated Aug. 14, 2024, 22 pages.

United States Patent and Trademark Office, "Notice of Allowance and Fee(s) Due," issued in connection with U.S. Appl. No. 17/710,538, dated Aug. 14, 2024, 8 pages.

United States Patent and Trademark Office, "Notice of Allowance and Fee(s) Due," issued in connection with U.S. Appl. No. 17/598,792, dated Aug. 27, 2024, 9 pages.

United States Patent and Trademark Office, "Notice of Allowance and Fee(s) Due," issued in connection with U.S. Appl. No. 18/191,642, dated Aug. 28, 2024, 7 pages.

United States Patent and Trademark Office, "Supplemental Notice of Allowability," issued in connection with U.S. Appl. No. 17/710,538, dated Sep. 11, 2024, 3 pages.

United States Patent and Trademark Office, "Second Notice of Allowability," issued in connection with U.S. Appl. No. 18/191,642, dated Sep. 16, 2024, 2 pages.

United States Patent and Trademark Office, "Non-Final Office Action," issued in connection with U.S. Appl. No. 17/710,649, dated Sep. 16, 2024, 12 pages.

United States Patent and Trademark Office, "Notice of Allowance and Fee(s) Due," issued in connection with U.S. Appl. No. 17/710,660, dated Sep. 25, 2024, 9 pages.

(56) References Cited

OTHER PUBLICATIONS

United States Patent and Trademark Office, "Advisory Action," issued in connection with U.S. Appl. No. 18/476,978, dated Oct. 7, 2024, 3 pages.

United States Patent and Trademark Office, "Corrected Notice of Allowability," issued in connection with U.S. Appl. No. 17/710,660, dated Oct. 9, 2024, 2 pages.

United States Patent and Trademark Office, "Corrected Notice of Allowability," issued in connection with U.S. Appl. No. 17/598,792, dated Oct. 10, 2024, 2 pages.

United States Patent and Trademark Office, "Notice of Allowance and Fee(s) Due," issued in connection with U.S. Appl. No. 17/566,135, dated Oct. 11, 2024, 9 pages.

United States Patent and Trademark Office, "Corrected Notice of Allowability," issued in connection with U.S. Appl. No. 18/191,642, dated Oct. 11, 2024, 2 pages.

United States Patent and Trademark Office, "Corrected Notice of Allowability," issued in connection with U.S. Appl. No. 17/566,135, dated Oct. 23, 2024, 3 pages.

United States Patent and Trademark Office, "Corrected Notice of Allowability," issued in connection with U.S. Appl. No. 17/710,660, dated Oct. 30, 2024, 2 pages.

United States Patent and Trademark Office, "Notice of Allowability," issued in connection with U.S. Appl. No. 17/710,538, dated Nov. 20, 2024, 3 pages.

United States Patent and Trademark Office, "Second Corrected Notice of Allowability," issued in connection with U.S. Appl. No. 18/191,642, dated Nov. 22, 2024, 2 pages.

United States Patent and Trademark Office, "Corrected Notice of Allowability," issued in connection with U.S. Appl. No. 17/598,792, dated Dec. 5, 2024, 2 pages.

United States Patent and Trademark Office, "Notice of Allowance and Fee(s) Due," issued in connection with U.S. Appl. No. 18/476,978, dated Dec. 13, 2024, 11 pages.

United States Patent and Trademark Office, "Notice of Allowance and Fee(s) Due," issued in connection with U.S. Appl. No. 17/822,664, dated Dec. 31, 2024, 7 pages.

European Patent Office, "Communication pursuant to Article 94(3) EPC," issued in connection with European Patent Application No. 22180113.7, Jan. 7, 2025, 6 pages.

European Patent Office, "Communication pursuant to Article 94(3) EPC," issued in connection with European Patent Application No. 22214553.4, dated Jan. 7, 2025, 9 pages.

United States Patent and Trademark Office, "Notice of Allowance and Fee(s) Due," issued in connection with U.S. Appl. No. 18/148,947, dated Jan. 8, 2025, 12 pages.

United States Patent and Trademark Office, "Notice of Allowance and Fee(s) Due," issued in connection with U.S. Appl. No. 17/710,649, dated Jan. 16, 2025, 9 pages.

United States Patent and Trademark Office, "Corrected Notice of Allowability," issued in connection with U.S. Appl. No. 17/822,664, dated Jan. 16, 2025, 2 pages.

United States Patent and Trademark Office, "Corrected Notice of Allowability" issued in connection with U.S. Appl. No. 17/566,135, dated Jan. 16, 2025, 3 pages.

United States Patent and Trademark Office, "Notice of Allowance and Fee(s) Due," with U.S. Appl. No. 17/872,801, dated Jan. 30, 2025, 13 pages.

Levenshtein, "Binary Codes Capable of Correcting Deletions, Insertions, and Reversals," Soviet Physics—Doklady, Cybernetics and Control Theory, pp. 707-710, vol. 10, No. 8, Feb. 1966, 4 pages.

Smith et al., "Identification of Common Molecular Subsequences," Reprinted Journal of Molecular Biology, Academic Press Inc. (London) Ltd., 1981, 3 pages.

Govindan et al., "Character Recognition—A Review," Pattern Recognition, vol. 23, No. 7, pp. 671-683, published Jul. 20, 1990, 13 pages.

Poulovassilis et al., "A Nested-Graph Model for the Representation and Manipulation of Complex Objects." ACM Transactions on Information Systems, vol. 12, Jan. 1994, 34 pages.

Hochreiter et al., "Long Short-Term Memory," Neural Computation, vol. 9, No. 8, Nov. 1997, 46 pages.

Ng et al., "On Spectral Clustering: Analysis and an Algorithm," NIPS'01: Proceedings of the 14th International Conference on Neural Information Processing Systems: Natural and Synthetic, Jan. 2001, 8 pages.

Crandall et al., "Extraction of Special Effects Caption Text Events From Digital Video," IJDAR, Department of Computer Science and Engineering, The Pennsylvania State University, accepted Sep. 13, 2022, 20 pages.

Lowe, "Distinctive Image Features from Scale-Invariant Key points," International Journal of Computer Vision (HCV), published Jan. 22, 2004, 20 pages.

Marinai, "Introduction to Document Analysis and Recognition," Machine Learning in Document Analysis and Recognition, published 2008, 20 pages.

Vogel et al., "Parallel Implementations of Word Alignment Tool," Software Engineering, Testing, and Quality Assurance for Natural Language Processing, Jun. 2008, 10 pages.

O'Gorman et al., "Document Image Analysis," IEEE Computer Society Executive Briefings, 2009, 125 pages.

Krizhevsky et al., "ImageNet Classification with Deep Convolutional Neural Networks," International Conference on Neural Information Processing Systems (NIPS), published 2012, 9 pages.

Chung et al. "Empirical Evaluation of Gated Recurrent Neural Networks on Sequence Modeling," NIPS 2014 Workshop on Deep Learning, Dec. 2014, 9 pages.

Nshuti, "Mobile Scanner and OCR (A First Step Towards Receipt to Spreadsheet)," published 2015, 3 pages.

Ronneberger et al., "U-Net: Convolutional Networks for Biomedical Image Segmentation," Medical Image Computing and Computer-Assisted Intervention (MICCAI), arXiv, dated May 18, 2015, 8 pages.

Lecun et al., "Deep Learning," Nature, vol. 521, dated May 28, 2015, 9 pages.

Genereux et al., "NLP Challenges in Dealing with OCR-ed Documents of Derogated Quality," Workshop on Replicability and Reproducibility in Natural Language Processing, IJCAI 2015, dated Jul. 2015, 6 pages.

Ren et al., "Faster R-CNN: Towards Real-Time Object Detection with Region Proposal Networks," In International Conference on Neural Information Processing Systems (NIPS), arXiv, Jan. 6, 2016, 14 pages.

Kim et al., "Character-Aware Neural Language Models," Thirtieth AAAI Conference on Artificial Intelligence (AAAI'IO), pp. 2741-2749, arXiv, Dec. 1, 2015, 9 pages.

Redmon et al., "You Only Look Once: Unified, Real-Time Object Detection," Conference on Computer Vision and Pattern Recognition (CVPR), arXiv, May 9, 2016, 10 pages.

Osindero et al., "Recursive Recurrent Nets with Attention Modeling for OCR in the Wild," in Conference on Computer Vision and Pattern Recognition (CVPR), arXiv, Mar. 9, 2016, 10 pages.

Joulin et al., "Bag of Tricks for Efficient Text Classification," Proceedings of the 15th Conference of the European Chapter of the Association for Computational Linguistics, arXiv, Aug. 9, 2016, 5 pages.

Konda et al., "Magellan: Toward Building Entity Matching Management Systems Over Data Science Stacks," Proceedings of the VLDB Endowment, vol. 9, No. 13, 2016, 4 pages.

Kipf et al., "Semi-Supervised Classification with Graph Convolutional Networks," 5th International Conference on Learning Representations, arXiv, Feb. 22, 2017, 14 Pages.

Bojanowski et al., "Enriching Word Vectors with Subword Information," In Journal Transactions of the Association for Computational Linguistics, vol. 5, dated Jun. 2017, 12 pages.

Ozhiganov et al., "Deep Dive Into OCR for Receipt Recognition," DZone, dated Jun. 21, 2017, 18 pages.

Bartz et at, "STN-OCT: A Single Neural Network for Text Detection and Text Recognition," Computer Vision and Pattern Recognition, arXiv, Jul. 27, 2017, 9 pages.

(56)                References Cited

OTHER PUBLICATIONS

Vaswani et al., "Attention Is All You Need," Advances in Neural Information Processing Systems, 31st Conference on Neural Information Processing Systems (NIPS 2017), arXiv, last revised Dec. 6, 2017, 15 pages.

Hui, "mAP (mean Average Precision) for Object Detection," URL:[https://medium.eom/@jonathan hui/map-mean-average-precision-for-object-detection-45cl21a311731], dated Mar. 6, 2018, 2 pages.

Veličković et al., "Graph Attention Networks," 2018 International Conference on Learning Representations, arXiv, Feb. 4, 2018, 12 pages.

Mudgal et al., "Deep Learning for Entity Matching: A Design Space Exploration," Proceedings of the 2018 International Conference on Management of Data, dated Jun. 10, 2018, 16 pages.

Wick et al., "Calamari—A High-Performance Tensorflow-Based Deep Learning Package for Optical Character Recognition," Digital Humanities Quarterly, Jul. 5, 2018, 12 pages.

Akbik et al., "Contextual String Embeddings for Sequence Labeling," Proceedings of the 27th International Conference on Computational Linguistics (COLING), dated Aug. 2018, 12 pages.

Follmann et al., "MVTec D2S: Densely Segmented Supermarket Dataset," European Conference on Computer Vision (ECCV), dated 2018, 17 pages.

Ray et al., "U-PC: Unsupervised Planogram Compliance," European Conference on Computer Vision (ECCV), 2018, 15 pages.

Li et al., "Extracting Figures and Captions from Scientific Publications," Short Paper, CIKM18, Oct. 22-26, 2018, Torino, Italy, 4 pages.

Elfwing et al. "Sigmoid-Weighted Linear Units for Neural Network Function Approximation in Reinforcement Learning," Neural Networks: Journal of the International Neural Network Society, vol. 107, arXiv, Nov. 2, 2017, 18 pages.

Huang et al., "Mask R-CNN with Pyramid Attention Network for Scene Text Detection", arXiv:1811.09058v1, Nov. 22, 2018, 9 pages.

Wikipedia, "Precision & Recall," Dec. 17, 2018 revision, 12 pages.

A2ia, "Intelligent Automation Eliminates Manual Data Entry From Complex Documents," Artificial Intelligence & Image Analysis, White Paper, accessed on Jan. 30, 2019, 3 pages.

A2ia, "Historic Document Conversion," Industry Paper, Historic Document Conversion, Artificial Intelligence & Image Analysis, Industry Paper, accessed on Jan. 30, 2019, 4 pages.

Loshchilov et al., "Decoupled Weight Decay Regularization," 2019 International Conference on Learning Representations, arXiv, Jan. 4, 2019, pages.

Nathancy, "How Do I Make Masks to Set All of Image Background, Except the Text, to White?", URL:[https://stackoverflow.com/questions/56465359/how-do-i-make-masks-to-set-all-of-image-background-except-the-text-to-white], Jun. 5, 2019, 5 pages.

Devlin et al., "BERT: Pre-training of Deep Bidirectional Transformers for Language Understanding," Conference of the North American Chapter of the Association for Computational Linguistics (NAACL-HLT), arXiv, May 24, 2019, 16 pages.

Qasim et al., "Rethinking Table Recognition using Graph Neural Networks," International Conference on Document Analysis and Recognition (ICDAR), arXiv, Jul. 3, 2019, 6 pages.

Feng et al., "Computer Vision Algorithms and Hardware Implementations: A Survey," Integration: the VLSI Journal, vol. 69, dated Jul. 27, 2019, 12 pages.

Hu et al., "Semi-Supervised Node Classification via Hierarchical Graph Convolutional Networks," ArXiv abs/1902.06667, Jun. 10, 2019, 8 pages.

Oliveira et al., "dhSegment: A Generic Deep-Learning Approach for Document Segmentation," 16th International Conference on Frontiers in Handwriting Recognition (ICFHR), arXiv, Aug. 14, 2019, 6 pages.

Zhong et al., "PubLayNet: Largest Dataset Ever for Document Layout Analysis," In International Conference on Document Analysis and Recognition (ICDAR), arXiv, Aug. 16, 2019, 8 pages.

United States Patent and Trademark Office, "Notice of Allowance and Fee(s) Due," issued in connection with U.S. Appl. No. 17/075,675, dated Jun. 26, 2023, 3 pages.

Leicester et al., "Using Scanner Technology to Collect Expenditure Data," Fiscal Studies, vol. 30, Issue 3-4, 2009, 29 pages.

Datasetlist, "A tool using OpenCV to annotate images for image classification, optical character reading, . . . ," Datasetlist.com, Jul. 13, 2022, 30 pages.

United States Patent and Trademark Office, "Non-Final Office Action," issued in connection with U.S. Appl. No. 17/598,792, dated Dec. 29, 2023, 17 pages.

International Searching Authority, "International Preliminary Report on Patentability," issued in connection with International Patent Application No. PCT/US2022/034570, issued on Jan. 4, 2024, 7 pages.

United States Patent and Trademark Office, "Non-Final Office Action," issued in connection with U.S. Appl. No. 18/191,642, dated Feb. 7, 2024, 18 pages.

United States and Patent and Trademark Office, "Non-Final Office Action," issued in connection with U.S. Appl. No. 17/566,135, dated Mar. 27, 2024, 13 pages.

United States Patent and Trademark Office, "Non-Final Office Action," issued in connection with U.S. Appl. No. 18/476,978, dated Apr. 18, 2024, 20 pages.

United States Patent and Trademark Office, "Non-Final Office Action," issued in connection with U.S. Appl. No. 17/710,660, on May 28, 2024, 9 pages.

European Patent Office, "Communication pursuant to Article 94(3) EPC," issued in connection with European Patent Application No. 19 921 870.2-1207, on Apr. 9, 2024, 7 pages.

United States Patent and Trademark Office, "Notice of Allowance and Fee(s) Due," issued in connection with U.S. Appl. No. 17/598,792, dated Jun. 17, 2024, 9 pages.

United States Patent and Trademark Office, "Notice of Allowance and Fee(s) Due," issued in connection with U.S. Appl. No. 18/191,642, dated Jun. 17, 2024, 9 pages.

United States Patent and Trademark Office, "Advisory Action," issued in connection with U.S. Appl. No. 16/692,797, dated Feb. 16, 2022, 2 pages.

Nielseniq, "Nielsen Brandbank Product Library, Power the Path To Purchase With Brand Approved Content" URL:[retrieved from: https://www.brandbank.com/us/product-library/], retrieved on Apr. 1, 2022. 5 pages.

Github, "Fiat Tool—Fast Image Data Annotation Tool," Github. com, URL:[https://github.com/christopher5106/FastAimotation Tool], downloaded on Apr. 1, 2022, 30 pages.

United States Patent and Trademark Office, "Notice of Allowance and Fee(s) Due," issued in connection with U.S. Appl. No. 16/692,797, dated Apr. 5, 2022, 10 pages.

Github, "Doccano Tool," Github.com, URL:[https://github.com/doccano/doccano], downloaded on Apr. 11, 2022, 12 pages.

United States Patent and Trademark Office, "Corrected Notice of Allowability," issued in connection with U.S. Appl. No. 16/692,797, dated Apr. 22, 2022, 3 pages.

International Searching Authority, "International Preliminary Report on Patentability," issued in connection with International Patent Application No. PCT/US2020/061269, issued on May 17, 2022, 5 pages.

Gu et al.," XYLayoutLM: Towards Layout-Aware Multimodal Networks For Visually-Rich Document Understanding," Conference on Computer Vision and Pattern Recognition (CVPR), Jun. 18, 2022, 10 pages.

Villota et al., "Text Classification Models for Form Entity Linking," International Symposium on Distributed Computing and Artificial Intelligence, arXiv, Dec. 14, 2021, 10 pages.

Oliveira et al., "A New Method for Text-Line Segmentation for Warped Documents," International Conference on Image Analysis and Recognition (ICIAR), Jun. 2010, 11 pages.

United States Patent and Trademark Office, "Non-Final Office Action," issued in connection with U.S. Appl. No. 17/345,940, dated Aug. 18, 2022, 8 pages.

(56)            References Cited

OTHER PUBLICATIONS

United States Patent and Trademark Office, "Non-Final Office Action," issued in connection with U.S. Appl. No. 17/075,675, issued Sep. 22, 2022, 12 Pages.

Huang et al., "LayoutLMv3: Pre-training for Document Al with Unified Text and Image Masking," 30th ACM International Conference on Multimedia, arXiv, Jul. 19, 2022, 10 pages.

Zhang et al.,"Multimodal Pre-Training Based on Graph Attention Network for Document Understanding," IEEE Transactions on Multimedia, vol. 25, arXiv, Oct. 23, 2022, 13 pages.

European Patent Office, "Extended European Search Report," issued in connection with European Patent Application No. 19921870.2, dated Oct. 12, 2022, 11 pages.

International Searching Authority, "International Search Report," issued in connection with International Patent Application No. PCT/US2022/034570, mailed on Oct. 20, 2022, 3 pages.

International Searching Authority, "Written Opinion," issued in connection with International Patent Application No. PCT/US2022/034570, mailed on Oct. 20, 2022, 5 pages.

Kim et al., "Donut: Document Understanding Transformer Without OCR," European Conference on Computer Vision, arXiv, Oct. 6, 2022, 29 pages.

United States Patent and Trademark Office, "Notice of Allowance and Fee(s) Due," issued in connection with U.S. Appl. No. 17/364,419, dated Nov. 4, 2022, 10 pages.

Canadian Intellectual Property Office, "Examiner's Report," issued in connection with Canadian Patent Application No. 3,124,868, dated Nov. 10, 2022, 4 pages.

United States Patent and Trademark Office, "Corrected Notice of Allowability," issued in connection with U.S. Appl. No. 17/364,419, dated Nov. 15, 2022, 2 pages.

Zhong et al., "Hierarchical Message-Passing Graph Neural Networks," Data Mining and Knowledge Discovery, Nov. 17, 2022, 28 pages.

European Patent Office, "Extended European Search Report," in connection with European Patent Application No. 22180113.7, dated Nov. 22, 2022, 7 pages.

Dwivedi et al., "Benchmarking Graph Neural Networks," Journal of Machine Learning Research, arXiv, Dec. 28, 2022, 49 pages.

United States Patent and Trademark Office, "Non-Final Office Action," issued in connection with U.S. Appl. No. 17/379,280, dated Dec. 2, 2022, 14 Pages.

European Patent Office, "European Search Report," issued in connection with European Patent Application No. 22184405.3, dated Dec. 2, 2022, 2 pages.

International Searching Authority, "International Preliminary Report on Patentability," issued in connection with International Patent Application No. PCT/US2021/039931, issued on Dec. 13, 2022, 6 pages.

United States Patent and Trademark Office, "Corrected Notice of Allowability," issued in connection with U.S. Appl. No. 17/364,419, dated Jan. 4, 2023, 2 pages.

United States Patent and Trademark Office, "Non-Final Office Action," issued in connection with U.S. Appl. No. 17/883,309, dated Jan. 20, 2023, 14 pages.

United States Patent and Trademark Office, "Corrected Notice of Allowability", issued in connection with U.S. Appl. No. 17/364,419, dated Feb. 15, 2023, 2 pages.

United Kingdom Patent Office, "Examination Report Under Section 18(3)," issued in connection with U.K. Patent Application No. 2112299.9, dated Feb. 17, 2023, 2 pages.

United States Patent and Trademark Office, "Final Office Action," issued in connection with U.S. Appl. No. 17/075,675, dated Mar. 7, 2023, 11 pages.

United States Patent and Trademark Office, "Non-Final Office Action," issued in connection with U.S. Appl. No. 17/345,940, dated Mar. 16, 2023, 13 pages.

United States Patent and Trademark Office, "Final Office Action," issued in connection with U.S. Appl. No. 17/379,280, dated May 5, 2023, 17 pages.

United States and Patent and Trademark Office, "Notice of Allowance and Fee(s) Due," issued in connection with U.S. Appl. No. 17/883,309, dated May 11, 2023, 14 pages.

European Patent Office, "Extended European Search Report," issued in connection with European Patent Application No. 22214553.4, dated May 17, 2023, 9 pages.

United States Patent and Trademark Office, "Advisory Action," issued in connection with U.S. Appl. No. 17/075,675, dated May 30, 2023, 3 pages.

International Searching Authority, "International Search Report," issued in connection with International Patent Application No. PCT/US2023/011859, mailed on Jun. 1, 2023, 3 pages.

International Searching Authority, "Written Opinion," issued in connection with International Patent Application No. PCT/US2023/011859, mailed on Jun. 1, 2023, 4 pages.

United States Patent and Trademark Office, "Notice of Allowance and Fee(s) Due," issued in connection with U.S. Appl. No. 17/345,940, dated Jul. 7, 2023, 8 pages.

United Kingdom Intellectual Property Office, "Intention to Grant Under Section 18(4)," issued in connection with U.K. Patent Application No. 2112299.9, dated Jul. 13, 2023, 2 pages.

United States Patent and Trademark Office, "Advisory Action," issued in connection with U.S. Appl. No. 17/379,280, dated Jul. 18, 2023, 3 pages.

Gopal et al., "What is Intelligent Document Processing?" Nano Net Technologies, URL:[https://nanonets.com/blog/intelligent-document-processing/], Jul. 19, 2023, 21 pages.

United States Patent and Trademark Office, "Corrected Notice of Allowability," issued in connection with U.S. Appl. No. 17/345,940, dated Jul. 20, 2023, 3 pages.

Canadian Intellectual Property Office, "Examiner's Report," issued in connection with Canadian Patent Application No. 3,124,868, dated Aug. 10, 2023, 5 pages.

United States Patent and Trademark Office, "Corrected Notice of Allowability," issued in connection with U.S. Appl. No. 17/883,309, dated Aug. 17, 2023, 2 pages.

United Kingdom Intellectual Property Office, "Notification of Grant," issued in connection with U.K. Patent Application No. 2112299.9, dated Aug. 29, 2023, 2 pages.

Amazon, "Intelligent Document Processing," Amazon Web Services, URL:[https://aws.amazon.com/machine-learning/ml-use-cases/document-processing/fintech/], retrieved on Sep. 8, 2023, 6 pages.

United States Patent and Trademark Office, "Corrected Notice of Allowability," issued in connection with U.S. Appl. No. 17/075,675, dated Oct. 10, 2023, 2 pages.

United States Patent and Trademark Office, "Non-Final Office Action," issued in connection with U.S. Appl. No. 17/710,538, dated Oct. 26, 2023, 6 pages.

United States Patent and Trademark Office, "Non-Final Office Action", issued in connection with U.S. Appl. No. 17/941,547, filed Aug. 27, 2025, 7 pages.

European Patent Office, "Communication pursuant to Article 94(3) EPC," issued in connection with European Patent Application No. 19921870.2, dated Sep. 8, 2025, 4 pages.

Mexican Patent Office, "Proceed to Grant," issued in connection with Mexican Patent Application No. MX/a/2023/000642, dated Sep. 25, 2025, 6 pages. [Machine English Translation Included].

United States Patent and Trademark Office, "Notice of Allowance and Fee(s) Due," issued in connection with U.S. Appl. No. 18/176,273, dated Oct. 7, 2025, 14 pages.

United States Patent and Trademark Office, "Notice of Allowance and Fee(s) Due," issued in connection with U.S. Appl. No. 17/941,547, dated Jan. 7, 2026, 8 pages.

Halkidi et al., "Cluster Validity Methods : Part I," access at [https://dl.acm.org/doi/epdf/10. 1145/565117.565124], Jun. 1, 2002, 6 pages.

Diem et al., "cBAD: ICDAR2017 Competition on Baseline Detection," International Conference on Document Analysis and Recognition (ICDAR), 2017, pp. 1355-1360, 6 pages.

Liu et al., "Unified Line and Paragraph Detection by Graph Convolutional Networks," access at [https://arxiv.org/pdf/2203.09638], Mar. 17, 2022, 15 pages.

(56) References Cited

OTHER PUBLICATIONS

Alberti et al., "Labeling, Cutting, Grouping: an Efficient Text Line Segmentation Method for Medieval Manuscripts," Jul. 1, 2019, 7 pages.

Grüning et al. "A two-stage method for text line detection in historical documents," In International Journal on Document Analysis and Recognition (IJDAR), access at [https://arxiv.org/pdf/1802. 03345], Jul. 11, 2019, 25 pages.

Mechi et al., "Text Line Segmentation in Historical Document Images Using an Adaptive U-Net Architecture," access at [https:// www.researchgate.net/publication/339025343_Text_Line_ Segmentation_in_Historical_Document_Images_Using_an_Adaptive_ U-Net_Architecture], Sep. 2019, 6 pages.

Siddiqui et al., "DeepTabStR: Deep Learning based Table Structure Recognition," access at [https://www.researchgate.net/publication/ 339025475_DeepTabStR_Deep_Learning_based_Table_Structure_ Recognition], Sep. 2019, 7 pages.

Zhong et al., "Image-based table recognition: data, model, and evaluation," access at [https://arxiv.org/pdf/1911.10683], Mar. 4, 2020, 11 pages.

Barakat et al., "Unsupervised deep learning for text line segmentation," access at [https://arxiv.org/pdf/2003.08632], Mar. 19, 2020, revised Oct. 24, 2020, 8 pages.

Azran et al., "Text line extraction using deep learning and minimal sub seams," Proceedings of the 21st ACM Symposium on Document Engineering, access at [https://dl.acm.org/doi/epdf/10.1145/ 3469096.3474941], Aug. 16, 2021, 4 pages.

Wang et al., "Post-OCR Paragraph Recognition by Graph Convolutional Networks," 2022 IEEE/CVF Winter Conference on Applications of Computer Vision (WACV), 2022, 10 pages.

Grüning et al., "A Robust and Binarization-Free Approach for Text Line Detection in Historical Documents," 2017 14th IAPR International Conference on Document Analysis and Recognition (ICDAR), Nov. 2017, pp. 236-241, 6 pages.

Tensmeyer et al., "Deep Splitting and Merging for Table Structure Decomposition." 2019 International Conference on Document Analysis and Recognition (ICDAR) (2019): 114-121, abstract only included, 1 page.

Gruning et al., "Read-Bad: A New Dataset and Evaluation Scheme for Baseline Detection in Archival Documents," access at arXiv: 1705.03311v2, Dec. 11, 2017, 6 pages.

United States Patent and Trademark Office, "Non-Final Office Action," issued in connection with U.S. Appl. No. 18/793,412, dated May 6, 2026, 6 pages.

Mexican Patent Office, "First background Requirement Report," issued in connection with Mexican Patent Application No. MX/a/ 2022/006102, dated May 26, 2026, 6 pages. [Machine English Translation Included].

Mexican Intellectual Patent Office, "First background requirement report," issued in connection with Mexican Patent Application No. MX/a/2022/016462, dated May 27, 2026, 8 pages. [Machine English Translation Included].

European Patent Office, "Communication under Rule 71(3) EPC," mailed in connection with European Patent Application No. 22180113. 7, dated Jun. 17, 2026, 8 pages.

* cited by examiner

414

Nx5

| GAT LAYER WITH RESIDUAL CONNECTION | 502 |

N x 8 x 16

| SiLU ACTIVATION | 504 |

N x 8 x 16

| GAT LAYER WITH RESIDUAL CONNECTION | 502 |

N x 16 x 32

| SiLU ACTIVATION | 504 |

N x 16 x 32

| GAT LAYER WITH RESIDUAL CONNECTION | 502 |

N x 4 x 32

| SiLU ACTIVATION | 504 |

N x 4 x 32

| GAT LAYER WITH RESIDUAL CONNECTION | 502 |

N x 8 x 16

OUTPUT FEATURES

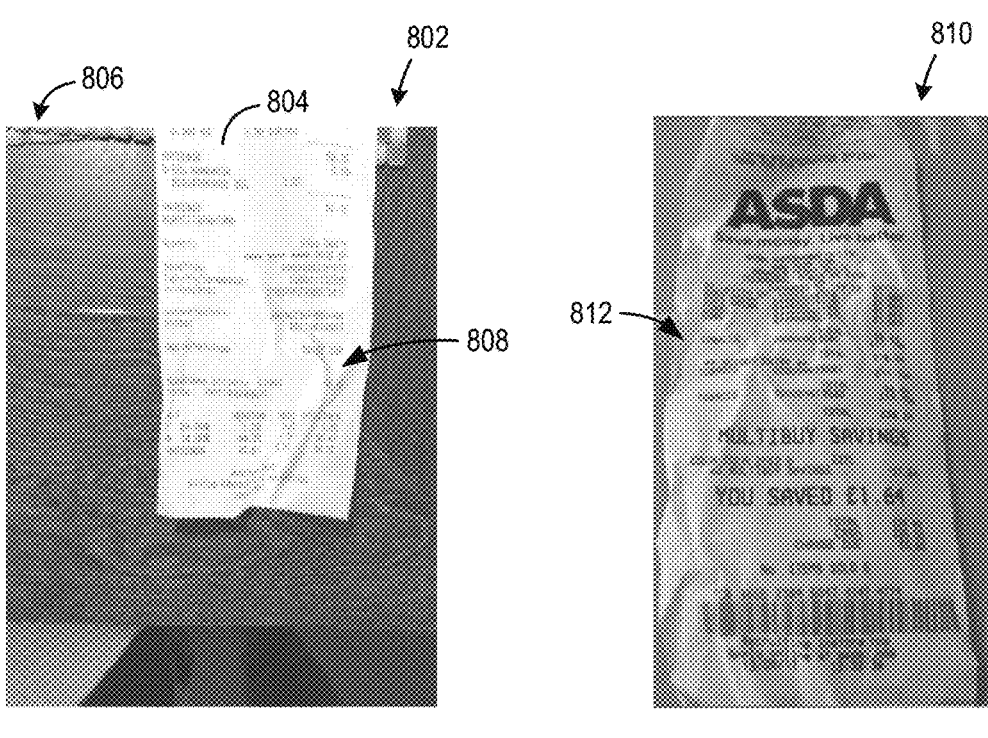
FIG. 8A
FIG. 8B
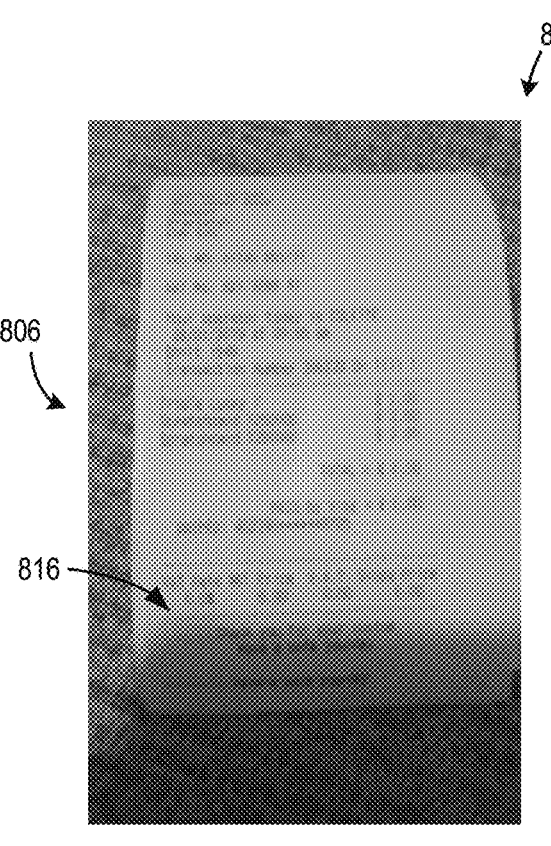
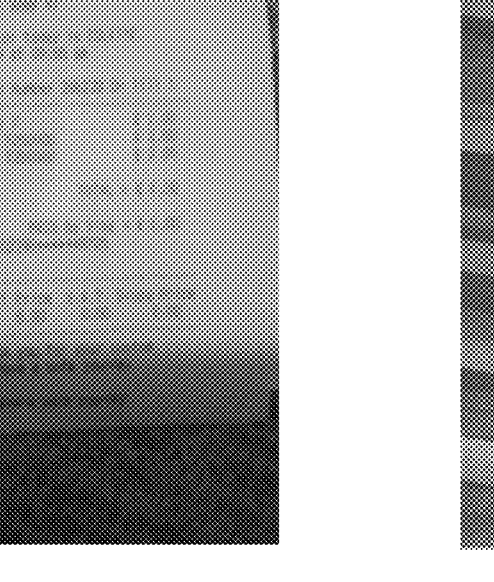
FIG. 8C
FIG. 8D

1000

START

1002
CROP A RECEIPT PORTION OF A RECEIPT IMAGE

1004
APPLY AN OCR ALGORITHM TO THE RECEIPT TO DETECT TEXT

1006
GENERATE A SEQUENCE OF TEXT SEGMENTS

1008
APPLY A LINE DETECTION MODEL TO DETECT LINES IN THE RECEIPT USING THE SEQUENCE OF TEXT SEGMENTS

1010
PROCESS THE RECEIPT TO EXTRACT PURCHASE DATA USING THE DETECTED LINES

1012
STORE THE PURCHASE DATA

END

1008 ⟍

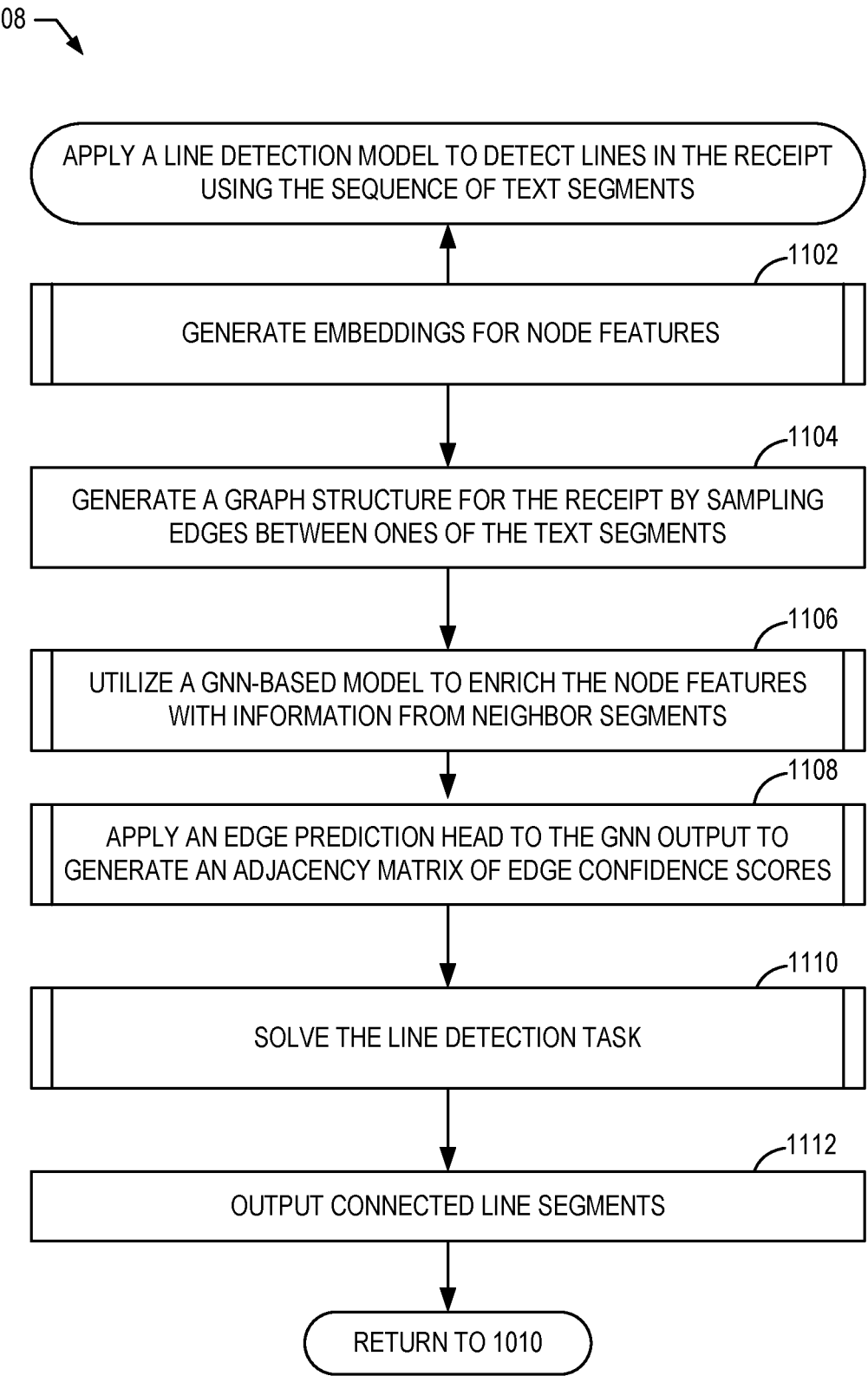

APPLY A LINE DETECTION MODEL TO DETECT LINES IN THE RECEIPT USING THE SEQUENCE OF TEXT SEGMENTS

1102
GENERATE EMBEDDINGS FOR NODE FEATURES

1104
GENERATE A GRAPH STRUCTURE FOR THE RECEIPT BY SAMPLING EDGES BETWEEN ONES OF THE TEXT SEGMENTS

1106
UTILIZE A GNN-BASED MODEL TO ENRICH THE NODE FEATURES WITH INFORMATION FROM NEIGHBOR SEGMENTS

1108
APPLY AN EDGE PREDICTION HEAD TO THE GNN OUTPUT TO GENERATE AN ADJACENCY MATRIX OF EDGE CONFIDENCE SCORES

1110
SOLVE THE LINE DETECTION TASK

1112
OUTPUT CONNECTED LINE SEGMENTS

RETURN TO 1010

GENERATE EMBEDDINGS FOR NODE FEATURES

1202
OBTAIN OCR OUTPUT DATA

1204
DISCARD TEXT INFORMATION

1206
SELECT BOUNDING BOX FEATURES

1208
NORMALIZE CENTER COORDINATES

1210
CONCATENATE THE NORMALIZED FEATURES TO GENERATE THE EMBEDDINGS

RETURN TO 1104

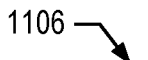
1106
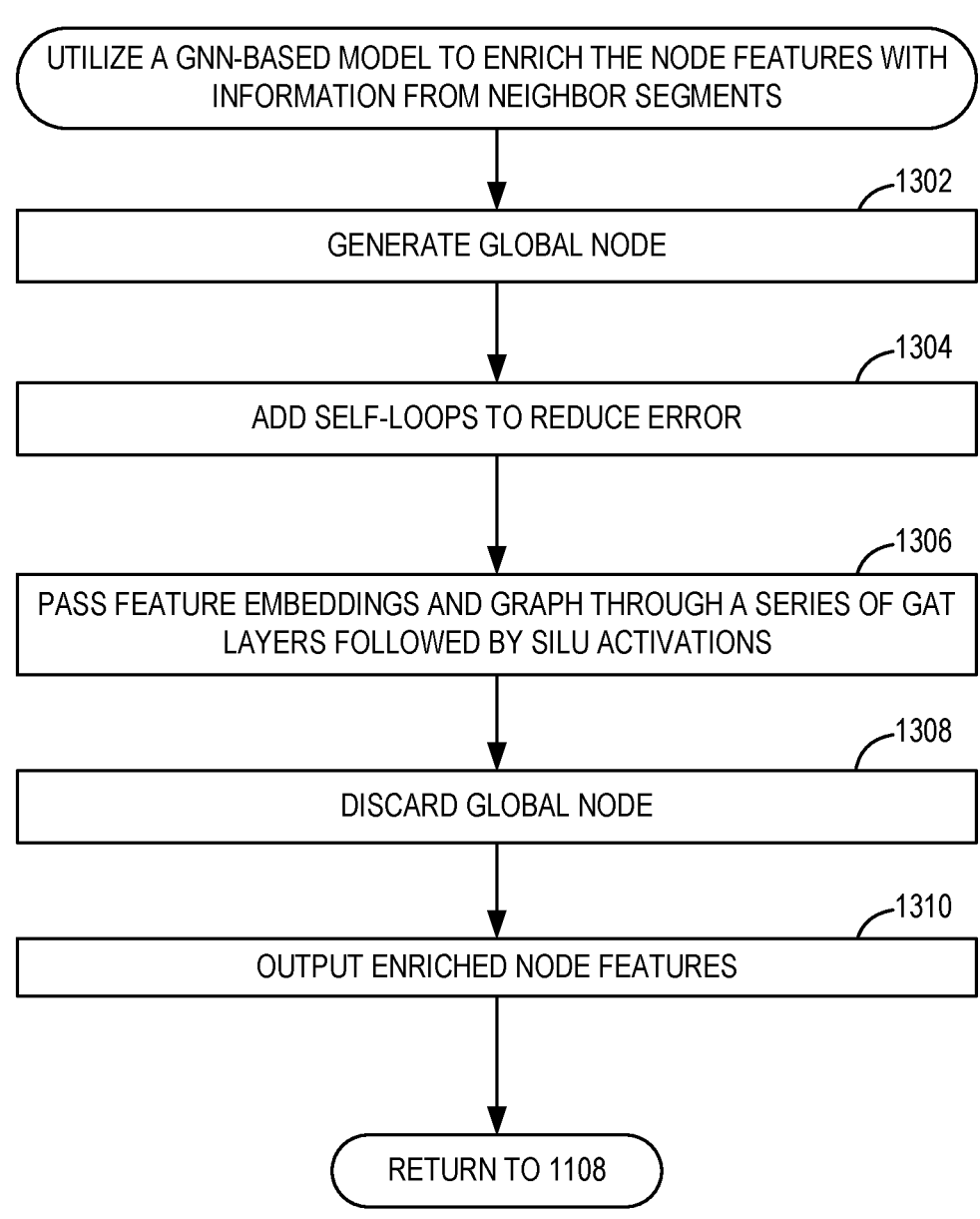
UTILIZE A GNN-BASED MODEL TO ENRICH THE NODE FEATURES WITH INFORMATION FROM NEIGHBOR SEGMENTS
1302
GENERATE GLOBAL NODE
1304
ADD SELF-LOOPS TO REDUCE ERROR
1306
PASS FEATURE EMBEDDINGS AND GRAPH THROUGH A SERIES OF GAT LAYERS FOLLOWED BY SILU ACTIVATIONS
1308
DISCARD GLOBAL NODE
1310
OUTPUT ENRICHED NODE FEATURES
RETURN TO 1108
FIG. 13

1108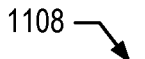

APPLY AN EDGE PREDICTION HEAD TO THE GNN OUTPUT TO GENERATE AN ADJACENCY MATRIX OF EDGE CONFIDENCE SCORES

1402

IDENTIFY A PAIR OF SEGMENTS CONNECTED BY AN EDGE

1404

CONCATENATE OUTPUT FEATURES OF BOTH NODES

1406

PASS THE CONCATENATED FEATURES THROUGH AN MLP BASED MODEL TO EXTRACT A CONFIDENCE SCORE

1408

PROCESS ANOTHER PAIR OF SEGMENTS?

YES

NO

1410

OUTPUT ADJACENCY MATRIX

RETURN TO 1110

METHODS, SYSTEMS, ARTICLES OF MANUFACTURE, AND APPARATUS TO DETECT LINES ON DOCUMENTS

RELATED APPLICATION

This patent claims the benefit of U.S. Provisional Patent Application No. 63/349,898, which was filed on Jun. 7, 2022. U.S. Provisional Patent Application No. 63/349,898 is hereby incorporated herein by reference in its entirety. Priority to U.S. Provisional Patent Application No. 63/349, 898 is hereby claimed.

FIELD OF THE DISCLOSURE

This disclosure relates generally to computer-based image analysis and, more particularly, to methods, systems, articles of manufacture, and apparatus to detect lines in a document.

BACKGROUND

Artificial intelligence (AI) leverages computers and machines to mimic problem solving and decision making challenges that typically require human intelligence. Machine learning (ML), deep learning (DL), computer Vision (CV), and Natural Language Processing (NLP) are powerful AI techniques that can be combined to process an image. For example, these AI techniques can be applied to an image of a purchase document to extract purchase-related data.

BRIEF DESCRIPTION OF THE DRAWINGS

FIGS. 8A-8D illustrate example receipt images for which examples disclosed herein may be implemented.

FIGS. 10-15 are flowcharts representative of example machine readable instructions and/or example operations that may be executed by example processor circuitry to implement the document processor circuitry of FIG. 1 and, more specifically, the line detection circuitry of FIGS. 1-2.

In general, the same reference numbers will be used throughout the drawing(s) and accompanying written description to refer to the same or like parts. The figures are not to scale.

Figure 1:
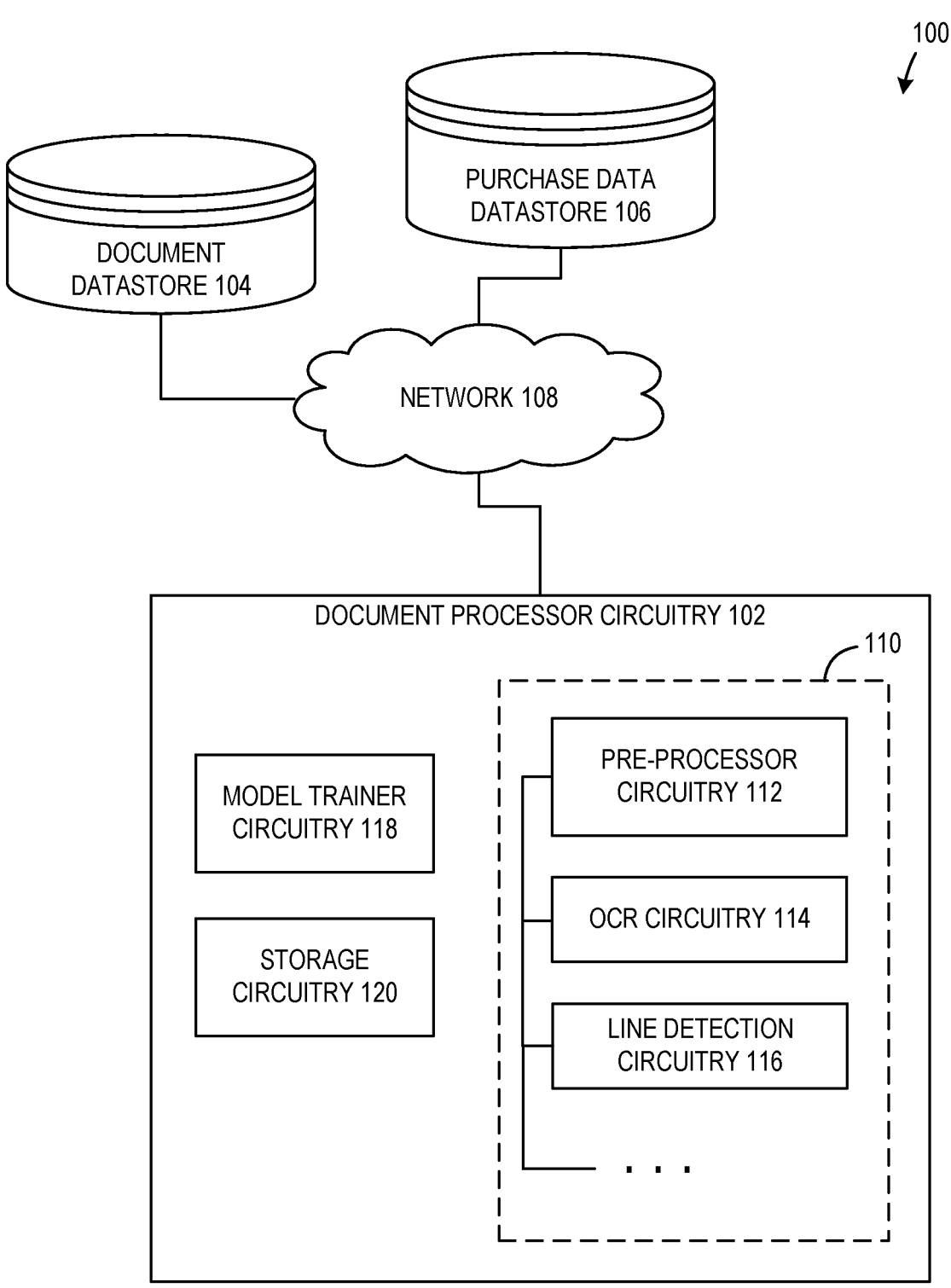
FIG. 1 is a block diagram of an example system for collecting purchase data constructed in accordance with teachings of this disclosure.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/ or indirect communication through one or more intermediary components, and does not require direct physical (e.g., wired) communication and/or constant communication, but rather additionally includes selective communication at periodic intervals, scheduled intervals, aperiodic intervals, and/ or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Market dynamics (e.g., forces that affect a market) have been evolving for several years, but it was dramatically accelerated by of the novel coronavirus (COVID-19) and its impact on shopping behaviors and channel composition. To help market participants (e.g., manufacturers, retailers, etc.) understand these forces, a market research entity can collect and analyze market data to extract insights. A common source of such market data includes purchase data provided by consumer panels, which are groups of individuals (e.g., panelists, panel members, etc.) who agree to provide their purchase data and/or other types of data (e.g., demographic data) to the entity. For example, a panelist(s) can use an electronic device to capture and/or transmit an image of a receipt to the market research entity for purchase data extraction. However, uploaded receipt images often include issues with image quality, document defects, image perspective and/or viewpoint issues, etc. resulting in difficult or otherwise non-readable purchase documents. These challenges decrease an effectiveness, efficiency, and accuracy of a traditional, manual decoding process.

Modernization of consumer panels is needed for market research entities to grow and stay relevant in data analysis markets. In particular, there is a need to automate the transcription and extraction of information from images of receipts, which are highly unstructured documents that vary in layout (e.g., based on country, store, etc.) and size (e.g., based on an amount of items purchase, a store, etc.). Advances in the AI fields of NLP and CV are making it possible to develop systems capable of outperforming human workers on this task. In some examples, such AI systems first extract machine-readable text segments from the document images (e.g., via an optical character recognition (OCR) engine) and then apply a layout extraction stage to identify more complex relationships among the text segments. In some such examples, the layout extraction stage can include tasks such as (but not limited to) the detection of lines, columns, or paragraphs within the purchase document.

Among these tasks, line detection is especially important for understanding highly unstructured documents, such as receipts where key-value pairs are often spaced apart (e.g., separated) but presented in the same and/or adjacent lines. However, automating the detection of lines in unstructured documents poses several technological, analytical, and/or real-world challenges. For example, technological line detection techniques for receipts can neither incorporate constraints regarding distances between neighbor text segments that belong to the same line nor consider distances between adjoining text segments that belong to adjacent lines. Further, the text segments output by the OCR engine often include errors such as (but not limited to) typos in the detected text, noisy bounding box regions, and duplicated detections (e.g., a segment detected more than once, whether fully or partially). A standard out-of-the-box OCR engine can detect text, generate text boxes (e.g., bounding boxes) corresponding to the text, determine locations (e.g., coordinates) of the bounding boxes, and transcribe the text, but cannot guarantee a strict top-to-bottom, left-to-right ordering in the list of obtained words. Moreover, a machine cannot examine a receipt image to visually identify text and/or structural layout as a human can, resulting in inherent challenges in the processing of images by machines. For example, images do not include implicit structure that is relied upon for the extraction of information from portable document format (PDF) file or digitized documents.

The foregoing challenges are exacerbated when the images are captured in uncontrolled manners. For example, receipts are often wrinkled (e.g., resulting in non-flat deformations), worn, and/or otherwise difficult for a machine to read. Further, the receipts in the images may be rotated and/or include issues with image quality, receipt defects, perspective and/or viewpoint of the receipt image (e.g., skewed, tilted in any direction, squeezed, rotated by some angle, etc.), etc. This implies adding more complexity to a line detection solution because more variables need to be considered. All this variance in the appearance of the receipt images necessitates a technological solution for detecting lines in highly unstructured documents that can generalize well to new formats.

Examples disclosed herein address the foregoing issues by modeling line detection as a link prediction task, where at least one goal of the link prediction task is to determine if two segments that have some type of relation (spatial in this use-case) should be linked together. In particular, example methods, systems, articles of manufacture, and apparatus are disclosed herein to detect rows in images of documents by grouping together text segments that belong to a same line. As disclosed herein, a text segment (e.g., a segment, etc.) is a string of characters detected by an OCR engine, and specifically refers a lowest-level region(s) of text information output by the OCR engine. A type or level of segment (e.g., at word level, paragraph level, etc.) can depend on a specific use case and/or the OCR engine utilized in a pipeline. Disclosed examples facilitate the processing of receipts and, thus, utilize word-level text segments. However, it is understood that other use cases can utilize text segments having other levels of granularity, such as character-level segments, sentence-level segments, paragraph-level segments, etc.

Examples disclosed herein generate and/or otherwise implement an AI model(s) based on a graph neural network (GNN, GraphNN, etc.) to solve the link prediction task(s). A GNN is a type of artificial neural network that can efficiently process data represented as a graph. In particular, disclosed examples apply an example GNN-based model(s) to a graphical representation of the receipt(s) in which each text segment is represented by a node. Examples disclosed herein utilize the text segments output from an OCR engine to extract node features and to sample edges among the text segments (e.g., to form the graph). As discussed in further detail below, the nodes and the sampled edges enable features of each text segment to interact with neighboring text segments to get context.

In some examples, information for each text segment provided by the OCR engine includes a text string (e.g., transcribed text, a word, etc.) and a rotated bounding box defined by characteristics (e.g., a group of coordinates and/or an angle). In some examples (e.g., the use-case of line detection in receipts), there are no generalizable relationships between two text strings that help determine if the respective text segments are oriented in the same line. Certain examples thus discard the text string, thereby removing any impact of text errors output by the OCR engine. Examples disclosed herein extract node features from the text segments using geometric features of the bounding boxes. In some examples, the geometric features include a left center coordinate(s), right center coordinate(s), and rotation of the bounding boxes.

Examples disclosed herein sample edges among the text segments using an example novel edge sampling strategy designed for unstructured documents. While other edge sampling techniques can be used additionally or alternatively, such as k-nearest neighbor or beta-skeleton, these techniques are prone to miss important connections, especially in highly unstructured document in which two segments that should be connected are at opposite ends of a line, which can reduce an accuracy of the model.

Examples disclosed herein cause the text segments to determine contributions of neighbor text segments that affect their respective node features by performing weight message passing. Information needed for computing message passing weights is related to the bounding box coordinates, which are already embedded in the node features. As such, disclosed examples provide the node features and sampled edges to an example graph attention network (GAN)-based model in which the nodes iteratively update their representations by exchanging information with their neighbors. A GAN is a GNN that includes Graph Attention Layers (GAT) for pairwise message passing, enabling the weights for the message passing to be computed directly inside the attention layer using the input node features. In some examples, the example GAN-based model enables the node features to be enriched (e.g., supplemented, augmented, modified, etc.) with information from their neighbors. The GAN-based model generates example output features corresponding to the text segments.

Example disclosed herein apply an example edge prediction head to the sampled edges based on the output features to determine confidence scores for the edges. The edge prediction head can determine a confidence score for a sampled edge between a pair of text segments in view of the enriched node features of the text segments. In some examples, the edge prediction head outputs an example sparse adjacency matrix that includes a confidence score for each pair of text segments associated with a sampled edge.

Examples disclosed herein apply an example postprocessing function(s) to the confidence scores to generate clusters of nodes that group the text segments by line. In some examples, at least one of the post-processing functions include an example novel limited connected components (LCC) algorithm, which is an algorithm based on a connected components algorithm. However, the LCC algorithm introduces constraints to reduce a number of errors. For example, the example LCC algorithm constrains text segments such that each segment can only be connected to one segment on each lateral side of the segment. By grouping the text segments by line, disclosed examples extract lines from the receipt image.

Examples disclosed herein provide for a line detection model(s) structured to extract information from complex receipt layouts. Certain examples extract the information by implementing a link prediction task (e.g., segment grouping), which refers to the task of connecting text segments that are spatially close in the document. Example line detection model(s) disclosed herein generalize for different countries and banners, even when confronted with complex receipt layouts. Technological (e.g., automatic) examples disclosed herein facilitate collection of purchase data from a purchase document to provide a large improvement on the productivity, error reduction, and digitalization of a marketing intelligence entity.

Technological examples disclosed herein reduce costs related to manual annotation and verification of information extraction from receipts and increase the entity's throughput by enabling the entity to process more purchase documents with improved accuracy, collect more purchase data, and increase the entity's profits. Traditional data collection approaches that require maintaining a (e.g., human) workforce to manually transcribe, digitize, and store the receipt and/or extracted purchase data in a database are resource intensive, time consuming, prone to error, and costly. Further, the volume of receipts that need to be processed is often too great to be practically processed on a manual basis, especially in a fast and efficient manner to enable meaningful intelligence with actionable insights. A confidence level associated market predictions based on purchase data increases as an amount of available and accurate purchase data related to a market of interest and/or a product of interest increases. Thus, disclosed examples improve a quality of actionable insights extracted from purchase data by increasing the scale of receipts that can be processed by the market research entity.

Examples disclosed herein enable data collection from panelists' via purchase documents (e.g., receipts, purchase orders, invoices, cash slips, etc.), which can reduce burdens for the panelists, increase data quality by correcting panelist errors, and facilitate detection of fraud. For example, certain traditional purchase data collection techniques called for panelists' to manually enter purchase information (e.g., product description, price of product, quantity purchased, promotions applied, etc.) for each purchased product of a transaction and/or scan barcodes for the purchased products. These tasks can be quite time-consuming and are often burdensome for the panelists'. In some examples, these burdens can diminish the panelists' willingness to collaborate with the marketing research entity long term, resulting in reduced data capture by the entity. The reduced data capture can result in missed valuable data that can limit an ability of the research marketing entity to collect actionable consumer behavior data such as consumer consumption and/or impulse purchases, etc.

A panel member(s) typically represents at least one demographic (e.g., characteristic) such as, but not limited to, geographic location, household income, presence of children, etc., enabling the marketing research entity to extract insights about consumer purchase behavior beyond just a sale of a product. Consequently, this data source can be particularly important for the market research entity. For example, consumer panel data enables the market research entity to track consumer purchasing behavior to identify correlations between what consumers do (e.g., purchase a product at a physical store and/or an e-commerce store) and why (e.g., a promotion, advertisement, convenience, etc.) to diagnose trends and changes over time. Further, the consumer panel data enables tracking of individual and/or household purchasing behavior over time across all purchases (e.g., product-level granularity) and outlets (e.g., retailers, stores, etc.), including e-commerce, to provide a complete view of changing omnichannel behaviors and enable an understanding movements across categories, brands, and retailers.

In some examples, reducing the burdens on the panelist reduces the churn of panelists recruited to participate in consumer panels. Additionally, because the panelist burden is relieved via a technological process, erroneous human behaviors are eliminated. Further, automating the extraction of information from a receipt facilitates the collection of more information (e.g., more details of baskets of purchased goods and/or more baskets) by the entity. In other words, disclosed examples enable increases in the scale and quality of data that can be processed by the market research entity, enabling higher quality data insights.

Disclosed examples outperform previous technological approaches used within the industry for line detection in terms of accuracy, processing time, and resource consumption. For example, certain previous techniques avoid using the OCR engine by operating directly over the receipt images (e.g., performing image detection and/or segmentation) and providing line-level polygon detections. However, these techniques are not valid for systems that require the information at word level for further analysis. Further, these previous techniques are computationally expensive because they require loading and preprocessing of receipts images as well as the inference of the image backbone for extracting a feature map. Other previous techniques are oriented towards tabulated formats, such as tables, and focus on finding relations over structured documents, where there are some constraints related to word spacing that can help the model with the task. As such, these techniques are inherently unsuitable for the processing of highly unstructured documents, such as receipts.

While examples disclosed herein are described in relation to processing receipts, examples disclosed herein can be applied to other use cases additionally or alternatively. For instance, examples disclosed herein can be applied to other types of purchase documents (e.g., invoices, purchase orders, etc.), other types of documents, etc. Additionally or alternatively, example line detection pipelines disclosed herein can be applied to product packaging images to detect lines for textual features such as ingredients, nutritional facts, pack size, etc. Further, line detection models enabled by examples disclosed herein can be combined with other (e.g., more complex) tasks to force the model to have a better understanding of the document layout and improve results for all tasks.

FIG. 1 is a block diagram of an example data collection system 100 constructed in accordance with teachings of this disclosure to process images of purchase documents. As disclosed herein, a purchase document refers to a document (e.g., physical, digital, digitized, etc.) that memorializes a transaction between a consumer and a retailer and, thus, can be used to extract the purchase data. In some examples, the data collection system 100 implements an example data collection pipeline to collect purchase data. In some examples, the data collection system 100 is associated with a market research entity that collects data from which to generate actionable insights that can be used by businesses to make data-driven decisions. In particular, the market research entity can use the data collection system 100 to process purchase document images provided by consumer panelists to extract purchase data and remove the panelists' burdens of manually providing information for each product purchased in a basket.

In some examples, the data collection system 100 is implemented by one or more servers. For example, the data collection system 100 can correspond to a physical processing center including servers. In some examples, at least some functionality of the data collection system 100 is implemented via an example cloud and/or Edge network (e.g., AWS®, etc.). In some examples, at least some functionality of the data collection system 100 is implemented by different amounts and/or types of electronic devices.

The data collection system 100 of FIG. 1 includes example document processor circuitry 102, which is communicatively coupled to an example document datastore 104 and an example purchase data datastore 106 via an example network 108. The document processor circuitry 102 of FIG. 1 is structured to obtain an image of a purchase document from the document datastore 104, extract information from the purchase document, and to store the extracted information in the purchase data datastore 106. However, the document processor circuitry 102 can be structured in any manner that enables the data collection system 100 to collect purchase data from documents and/or images thereof from panelists.

The document datastore 104 is structured to store purchase documents such as invoices, receipts, purchase orders, cash slips, etc. and/or images thereof. In some examples, the document datastore 104 stores images of receipts that are uploaded by panelists (e.g., via an electronic device(s) and/or an application installed thereon). For example, a panelist may use an electronic device such as (but not limited to) a laptop, a smartphone, an electronic tablet, etc. to scan, capture, or otherwise obtain an image of a receipt and transmit the image to the document datastore 104 (e.g., via the network 108). In some examples, the document datastore 104 can include purchase document images from other sources, such as retailers, vendors, receipt collection entities, etc.

The purchase data datastore 106 is structured to store data generated by the document processor circuitry 102. In some examples, the purchase data datastore 106 is implemented as a platform that provides for agile cloud computing. For example, the purchase data datastore 106 can be used for storing datasets associated with the collected receipts and for serving models jointly with microservices. In some examples, the purchase data datastore 106 implements an example data system (e.g., a database management system, a reference data system, etc.).

In the illustrated example of FIG. 1, the document processor circuitry 102 includes or otherwise implements an example extraction pipeline (e.g., an information extraction pipeline, extraction system, etc.) 110. For example, the document processor circuitry 102 can obtain (e.g., retrieve, receive, etc.) purchase document images from the document datastore 104 and pass the purchase document images through one or more stages of the extraction pipeline 110 to identify product- and/or purchase-related data in the document. At least one such stage is a layout extraction stage that includes the detection of lines in the purchase document. In the illustrated example of FIG. 1, the extraction pipeline 110 (and the document processor circuitry 102) includes example pre-processor circuitry 112, example OCR circuitry 114, and example line detection circuitry 116. In the illustrated example of FIG. 1, the document processor circuitry 102 further includes example model trainer circuitry 118, which is structured to train one or more example models that can be utilized by the extraction pipeline 110 and/or components thereof, and example storage circuitry 120 which is structure to store a model(s).

The example pre-processor circuitry 112 is structured to pre-process an input receipt image to help the extraction process. For example, receipt images uploaded by panelists often include clutter in a background of the image, which can include irrelevant and/or unwanted text, visual texture, etc. that can contribute noise and/or undesired text detection during an OCR process. In some examples, the pre-processor circuitry 112 of FIG. 1 can detect a region(s) of interest within the receipt image to segment out information of particular interest to the market research entity. For example, the pre-processor circuitry 112 can apply an AI model (e.g., based on a region-based convolutional neural network (R-CNN), a faster R-CNN, a deep neural networks (DNN), etc.) to the receipt image to identify the regions of interest.

In some examples, the regions of interest include a receipt region (e.g., receipt), which is rectangular area in the receipt image where the receipt is present, and a purchase region (e.g., purchased products), which is a rectangular area around printed text that contains purchase details (e.g., product description, price, quantity, etc.). In some examples, the receipt region is needed to segment out (e.g., separate) the receipt from such background clutter. In some examples, the product region is the area containing a list of purchased products with product descriptions (e.g., item descriptions), quantities, prices, promotions, discounts and is thus a main targeted region for extracting data from the receipt.

In some examples, the pre-processor circuitry 112 crops the images based on the regions of interest to extract the receipt region. In some examples, detecting the regions of interest can strengthen the extraction process by focusing on a specific region of the receipt image. In some examples, the pre-processor circuitry 112 provides the receipt (e.g., receipt region) of the receipt image to the example OCR circuitry 114. In some examples, the pre-processor circuitry 112 also pre-processes an output of the OCR circuitry 114 to, for example, filter text segments that are outside the receipt, shift coordinates of the bounding boxes, and/or otherwise prepare the receipt for downstream tasks (including line detection).

The example OCR circuitry 114 is structured to convert the receipt image into machine readable form. For example, the OCR circuitry 114 can apply an OCR-based algorithm over the receipt to extract text segments. In the example of FIG. 1, the text segments are at the word level and can include (but are not limited to) a word, a partial word, an abbreviation, a name, a number, a symbol, etc. For example, a text segment can correspond to a price of a purchased product, a word in a product description, a number representing a quantity, etc. In some examples, the OCR circuitry 114 is implemented by a third party OCR engine (e.g., a third party web based OCR tool, etc.). In such examples, the OCR circuitry 114 is an application programming interface (API) that interfaces with the third party tool.

In some examples, each text segment output by the OCR circuitry 114 includes a string of characters (e.g., a text string, transcribed characters, etc.) and a bounding box (e.g., text box) that defines a location of a text segment within the receipt image. As used herein, a "bounding box" represents characteristics (e.g., a group of coordinates, etc.) of a shape (e.g., a rectangle) enclosing a text segment.

In some examples, the OCR circuitry 114 outputs an array (e.g., a sequence, list, etc.) of detected text segments. For example, the output of the OCR circuitry 114 can be an ordered list of text segments based on the top to bottom order and then left to right order of the bounding boxes. In some examples, the output of the OCR circuitry 114 is not usefully organized for receipt analysis. For example, a bounding box(es) associated with a product may not be ordered next to a bounding box(es) associated with corresponding price. Further, the OCR circuitry 114 does not typically provide relations between text segments.

The example line detection circuitry 116 is structured to obtain the array of text segments output by the OCR circuitry 114 and to group the text segments by line. In other words, the line detection circuitry 116 is structured to detect rows in the receipt by grouping together words that belong to the same line. As discussed above, this task can be modeled as a link prediction task, where at least one goal is to predict if two segments that have some spatial relation should be linked together. In some examples, the line detection circuitry 116 implements an example line detection model.

The line detection circuitry 116 of FIG. 1 utilizes an example GNN-based model to solve the link prediction task. Thus, the receipt can be interpreted as a graph in which each detected text segment is a node. GNNs have been demonstrated to be highly effective in this kind of task. A number of text segments in a receipt can highly vary (e.g., from a couple to hundreds) depending on a retailer from which the receipt originated, a number of products purchased, etc. Thus, methods based on fixed input sizes (e.g., Fully Connected Neural Networks (FCNN)) are not suitable for this use case. Further, a number of connections that need to be evaluated can be limited based on the bounding box coordinates generated by the OCR circuitry 114 to accelerate the inference and reduce an amount of resources needed to perform the task. This rules out using methods based on Convolutional Neural Networks (CNN), because the evaluated connections depend on the order in which the nodes are stacked. Accordingly, the GNN-based model(s) utilized herein are more efficient than methods based on FCNNs to evaluate all possible connections. GNNs are found to be effective and efficient for memory and processing time because the GNN is not a fully-connected method.

As discussed in further detail below, the line detection circuitry 116 is structured to generate feature embeddings for the nodes by extracting and concatenating certain features from bounding boxes of the text segments. The line detection circuitry 116 generates a structure of the graph by sampling edges among the text segments using a novel edge sampling equation. The line detection circuitry 116 passes the feature embeddings and the sampled edges through graph attention layers to get context and through activation layers to update the nodes. In doing so, the line detection circuitry 116 enriches the features of the nodes using information from their neighbors to generate output features. The line detection circuitry 116 generates confidence scores (e.g., values) for each sampled edge based on the output features using an example multi-layer perceptron. Finally, the line detection circuitry 116 clusters the text segments based on the confidence scores using an example LCC algorithm and outputs the linked text segments. An example implementation of the line detection circuitry 116 is discussed in further detail in relation to FIG. 2.

In some examples, the line detection circuitry 116 and/or the document processor circuitry 102 may provide the detected lines to one or more downstream components that perform additional operations of the receipt image and/or information extracted therefrom. For example, the line detection information may be used in downstream tasks, such as (but not limited to) receipt field extraction and/or segment grouping by entity. In other words, the line detection circuitry 116 can be part of a larger end-to-end system for unstructured document understanding. Thus, the line detection circuitry 116 can implement a fast and accurate line detection method with limited resource consumption.

In the illustrated example of FIG. 1, the example document processor circuitry 102 implements at least a portion of a document decode service (DDS). In some examples, the document processor circuitry 102 serves as a host machine for the extraction pipeline 110 to process of the receipt images and/or other purchase documents. In additional or alternative examples, the document processor circuitry 102 enlists a cloud service provider to execute the extraction pipeline 110 or components thereof as a cloud service (e.g., infrastructure as a service, system as a service, etc.).

The example model trainer circuitry 118 is structured to train one or more AI models utilized in the extraction pipeline 110 and/or the line detection circuitry 116. Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a graph neural network (GNN) based model is used. Using a GNN-based model enables the line detection circuitry 116 to solve the task as a line prediction problem in which the receipt is structured as a graph. In general, machine learning models/architectures that are suitable to use in the example approaches disclosed herein will be a graph attention network that includes a series of graph attentions layers. However, other types of machine learning models could additionally or alternatively be used such as a multi-layer perceptron, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using stochastic gradient descent. However, any other training algorithm may additionally or alternatively be used. In examples disclosed herein, training is performed for 100 epochs using a batch of 2 graphs on each iteration, which improves the results over using just a single graph. In examples disclosed herein, training is performed using the model trainer circuitry 118, but can be trained elsewhere in additional or alternative examples. Training is performed using hyperparameters that control how the learning is performed (e.g., a learning rate, a number of layers to be used in the machine learning model, etc.). In some examples, the selected optimizer is Adam, with an initial learning rate of 0.001 and a reduction factor of 0.1 in epochs 70 and 90. Certain examples also apply a dropout of 0.3 before the last layer of the MLP. Certain examples use binary cross entropy as the loss function. In some examples re-training may be performed.

Training is performed using training data. In examples disclosed herein, the training data originates from a private dataset of collected receipts from different countries. In some examples, the training receipts include varying height, densities, and image qualities. In some examples, the training receipts may include rotation and all kinds of wrinkles. Because supervised training is used, the training data is labeled. Labeling is applied to the training data by detecting the text segments via an OCR engine, and then manually inspection to correct for errors. In some examples, each text segment of the training receipts include line manually annotated line identifiers and in-line positions. In some examples, the training data is pre-processed by, for example, cropping the receipt images, filtering segments that are outside the receipt, and shifting the coordinates of the remaining segments. In some examples, the training data is sub-divided into training, validation and test sets using a ratio of 70/20/10.

Once training is complete, the model is deployed for use as an executable construct that processes an input and provides an output based on the network of nodes and connections defined in the model. The model is stored at example storage circuitry 120 and/or in respective components. The model may then be executed by the line detection circuitry 116 and/or components thereof. In some examples, the model is executed by a graphics processing unit (GPU) and/or processor circuitry disclosed herein.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Figure 2:
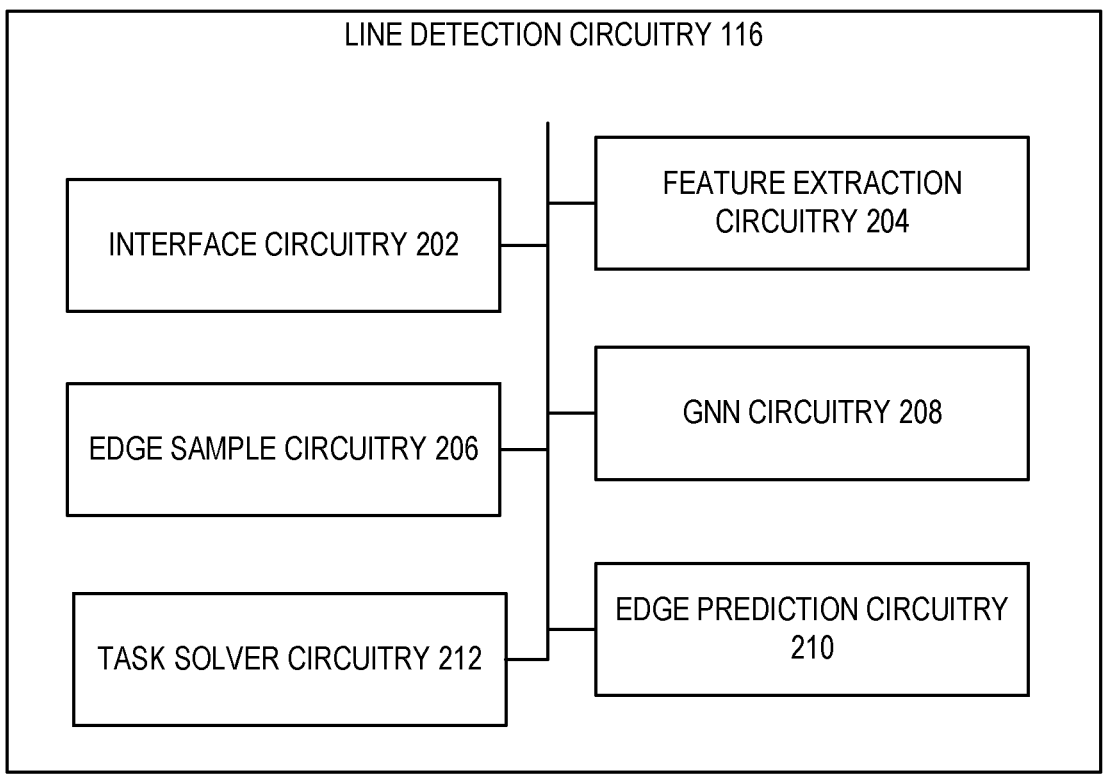
FIG. 2 is a block diagram of example line detection circuitry structured in accordance with teachings of this disclosure to detect lines from an image of a document.

FIG. 2 is a block diagram of the example line detection circuitry 116 of FIG. 1 structured in accordance with teachings of this disclosure for detecting lines in document images. The line detection circuitry 116 of FIG. 2 may be instantiated (e.g., creating an instance of, bring into being for any length of time, materialize, implement, etc.) by processor circuitry such as a central processing unit executing instructions. Additionally or alternatively, the line detection circuitry 116 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

In some examples, the line detection circuitry 116 implements an example line detection model. In some such examples, the components of the line detection circuitry 116 (discussed below) define an architecture or otherwise implement a framework of the line detection model. In some examples, the line detection circuitry 116 implements an example line detection pipeline. The line detection circuitry 116 is to detect lines in a receipt image using features associated with bounding boxes of text segments identified in the receipt image. Thus, the line detection circuitry 116 of FIG. 2 includes example interface circuitry 202, which is structured to obtain a sequence of text segments (e.g., from the OCR circuitry 114) detected in a document image (e.g., a receipt). In other words, the text segments are an input to the line detection circuitry 116.

The line detection circuitry 116 includes example feature extraction circuitry 204, which is structured to extract features from the text segments and to generate embeddings (e.g., feature embeddings) for nodes representing the text segments based on the extracted features. In some examples, the embeddings are dense numerical feature representations of the text segments, which correspond to nodes of a graph representing the receipt image. The embeddings include a series of floating point values, a number of which specify a length of an embedding. In some examples, the feature extraction circuitry 204 is instantiated by processor circuitry executing feature extraction instructions and/or configured to perform operations such as those represented by the flowcharts of FIGS. 10-12.

Each of the text segments include two sources of information: a text string and a rotated bounding box. In receipts, there are no generalizable relationships between text strings of any two segments that can be used to determine if the text segments are oriented on the same line. Further, using the text string could be counterproductive given that an example graph attention network (GAT) to be applied to the node features (e.g., via example GNN circuitry 208, discussed below) could learn to link specific pairs of segments that are in a training set, leading to hard overfitting. Moreover, text errors are common when applying OCR algorithms over an image.

Based on at least the foregoing, the feature extraction circuitry 204 of FIG. 2 is structured to discard the text string. The feature extraction circuitry 204 extracts geometric features from the bounding boxes. In some examples, such as the use case discussed herein, the features extracted from the bounding boxes provide sufficient information necessary to solve this task. However, the feature extraction circuitry 204 can extract other features, such as text features and/or visual features, for additional or alternative use cases, such as the detection of more complex structures (e.g., paragraphs, semantic entities, etc.).

Figure 3:
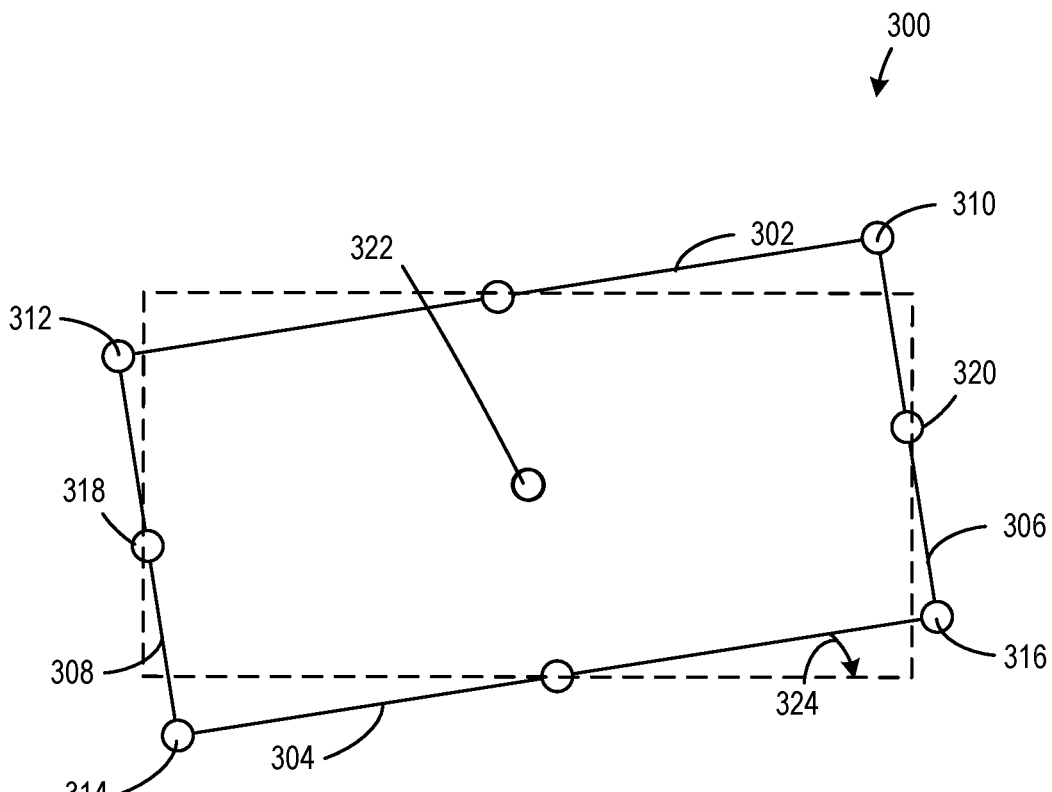
FIG. 3 illustrates an example bounding box that may be output by an optical character recognition engine.

FIG. 3 illustrates an example bounding box 300 that may be output by the OCR circuitry 114. The bounding box 300 includes an example top side 302, an example bottom side 304, an example first lateral (e.g., right) side 306, and an example second lateral (e.g., left) side 308. The bounding box 300 includes four corner vertices: an example top-right vertex 310, an example top-left vertex 312, an example bottom-left vertex 314, and an example bottom-right vertex 316.

The bounding box 300 includes an example left-center coordinate 318, which is a middle point between the top-left vertex 312 and the bottom-left vertex 314 of the bounding box 300. The bounding box 300 also includes an example right-center coordinate 320, which is a middle point between the top-right vertex 310 and the bottom-right vertex 316 of the bounding box 300. The bounding box 300 includes a middle vertex 322, which is a center point of the bounding box 300. Further, the bounding box 300 includes an example bounding box rotation (e.g., rotation angle, angle) 324, which is an angle of the bounding box 300 (in radians, between $-\pi/2$ and $\pi/2$).

Referring again to FIG. 2, the feature extraction circuitry 204 extracts one or more features from each of the bounding boxes associated with the text segments. Specifically, the feature extraction circuitry 204 extracts a left-center coordinate (e.g., left-center coordinate 318), a right-center coordinate (e.g., right-center coordinate 320), and a bounding box rotation (e.g., rotation angle 324) from each text bounding box output by the OCR circuitry 114. In extracting the left- and right-center coordinates 318, 320 and the rotation angle 324, the feature extraction circuitry 204 ignores information related to a height(s) of the bounding box(es). In particular, this omission is performed by design because instances of overfitting may otherwise occur. Further, the height of the segment is not a crucial feature for this task, as it might vary across text segments of the same text line, and it does not contain reliable information about the distance between different lines.

The feature extraction circuitry 204 normalizes the left- and right-center coordinates 318, 320 of the bounding boxes using a width of the document, as it is the most stable dimension. In particular, because documents may be unstructured, the number of lines and the height of the document can highly vary. Thus, normalizing left- and right-center coordinates 318, 320 relative to the width provides stability.

To generate a node feature embedding(s) for a text segment(s), the feature extraction circuitry 204 concatenates the features extracted from a respective bounding box(es). Specifically, the feature extraction circuitry 204 concatenates a normalized left-center coordinate 318 (2 floats), a normalized right center coordinate 320 (2 floats), and a rotation angle 324 (1 float) from a bounding box to generate a node feature embedding (e.g., with 5 float values) for a text segment. As such, the feature extraction circuitry 204 converts the text segment into an array of numbers that represent the text segment. For a given receipt having n text segments, the $i^{th}$ text segment would have an input feature embedding of $(x_{ilc}, y_{ilc}, x_{irc}, y_{irc}, R_i)$. In some examples, the line detection circuitry 116 transmits the feature embeddings for the text segments (the nodes) to example GNN circuitry 208.

The line detection circuitry 116 includes example edge sample circuitry 206, which is structured to sample edges among the text segments. In doing so, the edge sample circuitry 206 generates the structure of the graph on which the line prediction task is performed. The edge sample circuitry 206 does not utilize the features extracted by the line detection circuitry 116 and, thus, can operate in parallel (e.g., concurrently) with the feature extraction circuitry 204. However, the edge sample circuitry 206 and the feature extraction circuitry 204 can additionally or alternatively operate irrelative of one another. In some examples, the edge sample circuitry 206 is instantiated by processor circuitry executing edge sample instructions and/or configured to perform operations such as those represented by the flowchart of FIGS. 10-11.

The edge sample circuitry 206 of FIG. 1 obtains the rotated bounding boxes of the text segments detected by the OCR circuitry 114. The edge sample circuitry 206 determines which neighbor text segment(s) can interact with a given text segment (e.g., during message passing) based on a proximity of the neighbors text segment(s) to the given text segment. As discussed in further detail below, the edges sampled by the edge sample circuitry 206 are used by the GNN circuitry 208 to perform message passing and by example edge prediction circuitry 210 to generate confidence scores for the sampled edges. In some instances, if there is a missing edge between two segments that belong to the same entity, traditional models will not be able to connect them, no matter how well they perform. Hence, examples disclosed herein utilize a novel edge sampling strategy (e.g., function, equation (1) below) that covers possible true positive (e.g., connects the possible segments within the same line).

$$Edge_{A\text{-}B} = (|C_A^y - C_B^y| < H_A \times K)$$ Equation (1)

As indicated in equation (1), an edge from a first text segment (e.g., segment A) to a second text segment (e.g., segment B) is created if a vertical distance between their centers (C) is less than a height (H) of segment A (or segment B) multiplied by a constant (K). In other words, when equation 1 is true, segment A and segment B are linked by an edge. In some examples, the constant to two because the constant of two enables the edge sample circuitry 206 to generate connections between the segments and also between the segments of adjacent (e.g., previous and next) lines, and to consider the possible rotation of the document. However, the constant can be higher (which may increase resource consumption, but raise accuracy) or lower (which may lower accuracy, but reduce resource consumption). The edge sample circuitry 206 transmits the sampled edges, which define the structure of the graph) to the GNN circuitry 208.

The line detection circuitry 116 includes the example GNN circuitry 208, which is structured to enrich the node features of the text segments with information from their neighbor text segments. In some examples, the GNN circuitry 208 is instantiated by processor circuitry executing GNN instructions and/or configured to perform operations such as those represented by the flowchart of FIGS. 10-11 and 13. The GNN circuitry 208 obtains the graph structure with the nodes connected by the sampled edges from the edge sample circuitry 206 and the feature embeddings extracted from the text segments from the feature extraction circuitry 204. The GNN circuitry 208 applies a message passing stage in which the graph nodes iteratively update their representations by exchanging information with their neighbors.

In some examples, GNN layer implementations require an additional scores vector for performing a weighted message passing to facilitate deciding the contribution of each neighbor node. While this approach may suggest adding additional complexity to the design of the network to compute the weights (e.g., by selecting a set of features for each pair of nodes and processing them with a Multi-Layer Perceptron (MLP)), examples disclosed herein focus on bounding boxes for weight passing. In particular, the information needed for computing the message passing weights is related to the bounding box coordinates and the entity category, which is information already embedded in the node features. Taking advantage of this, Graph Attention Layers (GAT) are utilized in examples disclosed herein. In the GAT layers, the weights for the message passing are computed directly inside the layer using the input node features. To avoid 0-in-degree errors (disconnected nodes) while using the GAT layers, a self-loop is added for each node, which means adding an edge that connects the node with itself.

The GNN circuitry 208 of FIG. 2 structures the GNN architecture for the graph using four GAT layers, each of which is followed by a sigmoid linear unit function (SiLU activation) except for the last one. In some examples, the SiLU activations work better for this use case than a rectified linear unit function (ReLU activation) and/or variants thereof. In some examples, residual connections are added in all the layers to accelerate the convergence of the model. However, it is noted that the GNN architecture can be structured differently in additional or alternative examples. For example, the GNN architecture can include more or less layers, additional or alternative types of layers, etc.

The GNN circuitry 208 of FIG. 2 also applies a global document node enhancement. The global node is connected bidirectionally to the rest of the nodes. The example GNN circuitry 208 computes global node's feature embedding by averaging all the input node feature embeddings, which accomplishes at least two tasks. First, it provides some context information to the nodes by gathering information from the whole graph. That is, the global node assists each node to capture the global information of the receipt. Second, it acts as a regularization term for the GAT layer weights, as it is not a real neighbor node.

The GNN circuitry 208 passes the node features through the layers and activations to be enriched with the information from the neighbor nodes. Thus, the graph structure extracted from the receipt is injected to an attention mechanism to help each input node fully understand the receipt from both a local and a global perspective. The global node is attended to by each input node to assist the model to understand documents in a global aspect. The global nodes are only considered during the message passing and are discarded once the GNN stage is finished. The GNN circuitry 208 outputs the enriched node features, which are transmitted to the edge prediction circuitry 210.

The line detection circuitry 116 includes the example edge prediction circuitry 210, which is structured to apply an edge prediction head based on the output features and the sampled edges. In other words, the edge prediction circuitry 210 evaluates each edge sampled by the edge sample circuitry 206 based on the output features of the GNN circuitry 208 to generate confidence scores for the edges. In some examples, edge prediction circuitry 210 is instantiated by processor circuitry executing edge prediction instructions and/or configured to perform operations such as those represented by the flowchart of FIGS. 10-11 and 14.

For each pair of segments that are connected by a sampled edge, the edge prediction circuitry 210 is structured to extract a confidence score (e.g., value, etc.) that text segments of the pair belong to the same line. To do so, the edge prediction circuitry 210 concatenates the enriched features of both nodes and processes them with an example multi-layer perceptron (MLP). In some examples, the MLP includes two linear layers with an output size of 32 and 1, respectively. After the first layer, the edge prediction circuitry 210 applies another SiLU activation. Further, the edge prediction circuitry 210 applies a sigmoid function to an output logit from the last MLP layer to obtain the confidence.

The edge prediction circuitry 210 generates an example sparse adjacency matrix of confidence scores corresponding to the sampled edges. In some examples, the adjacency matrix includes a confidence score for each pair of text segments connected by a sampled edge. In some examples, the edge prediction circuitry 210 transmits the adjacency matrix to the task solver circuitry 212 for post-processing.

The line detection circuitry 116 includes the example task solver circuitry 212, which is structured to group (e.g., cluster) the text segments by line based on the adjacency matrix. In some examples, the task solver circuitry 212 is instantiated by processor circuitry executing task solver instructions and/or configured to perform operations such as those represented by the flowchart of FIGS. 10-11 and 15.

Simply binarizing the confidence scores using a threshold and applying a traditional connected components algorithm can result in erroneously connected segments that are far away from each other. The connection components algorithm is a simple algorithm based on the following statement: two nodes belong to the same connected component when there exists a path between them. However, due to its simplicity, it suffers from any link error and usually struggles when dealing with complex data distributions. Thus, to reduce the number of errors, the task solver circuitry 212 applies an example limited connected components (LLC) algorithm to the adjacency matrix. The LCC algorithm is a modified version of the connected components algorithm.

The LCC algorithm disclosed herein constrains connections between text segments such that each segment can only be connected to one segment on each lateral side (e.g., one segment to its left and one to its right). Further, if there is more than one candidate to a lateral side of a text segment, the task solver circuitry 212 is structured to select the one that is closest, no matter its confidence score. Finally, the threshold for binarizing the adjacency matrix is computed using a grid search over all the documents in the validation set. The task solver circuitry 212 thus groups together the segments that belong to the same text line.

In some examples, the line detection circuitry 116 includes means for extracting node features from the text segments. For example, the means for extracting may be implemented by the example feature extraction circuitry 204. In some examples, the line detection circuitry 116 includes means for sampling edges among the text segments. For example, the means for sampling may be implemented by the example edge sample circuitry 206. In some examples, the line detection circuitry 116 includes means for message passing. For example, the means for message passing may be implemented by the example GNN circuitry 208. In some examples, the line detection circuitry 116 includes means for generating confidence scores for the sampled edges. For example, the means for generating confidence scores may be implemented by the example edge prediction circuitry 210. In some examples, the line detection circuitry 116 includes means for grouping text segments by line. For example, the means for determining may be implemented by the example task solver circuitry 212.

Figure 15:
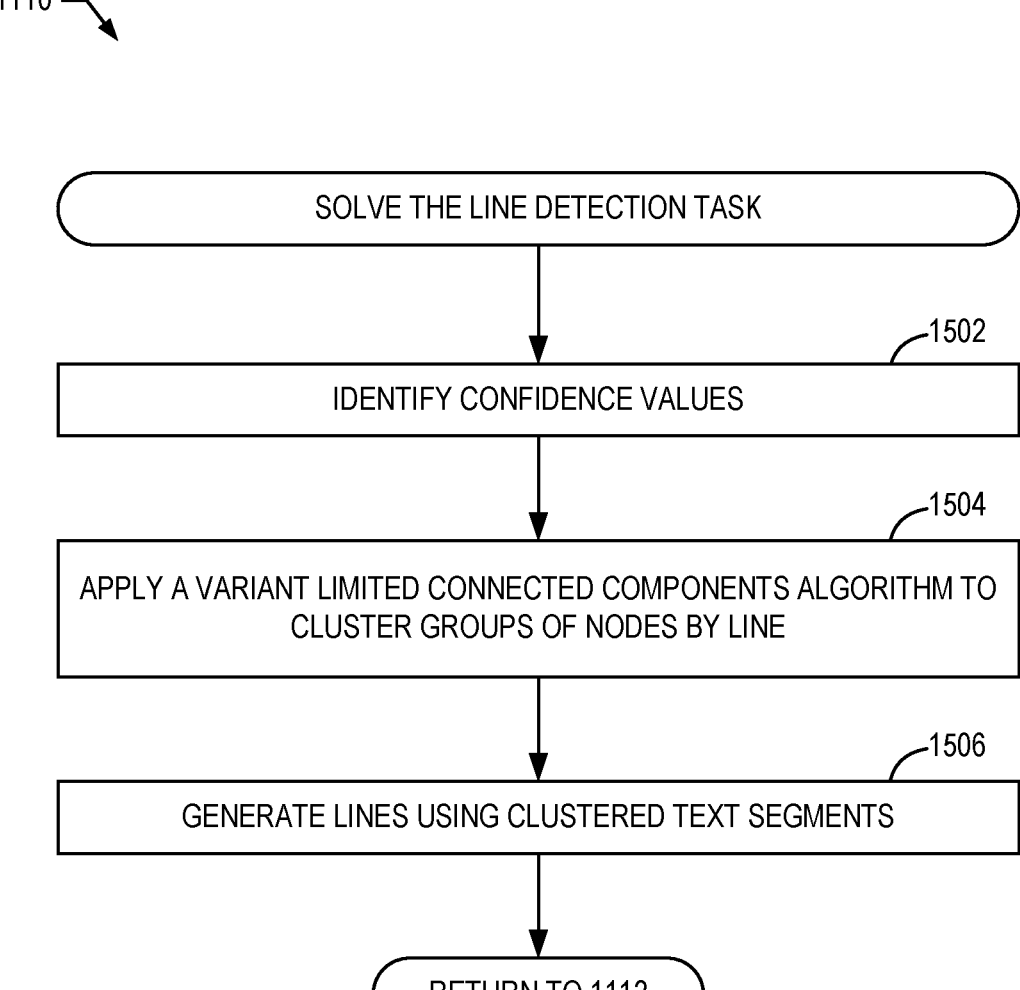
Figure 16:
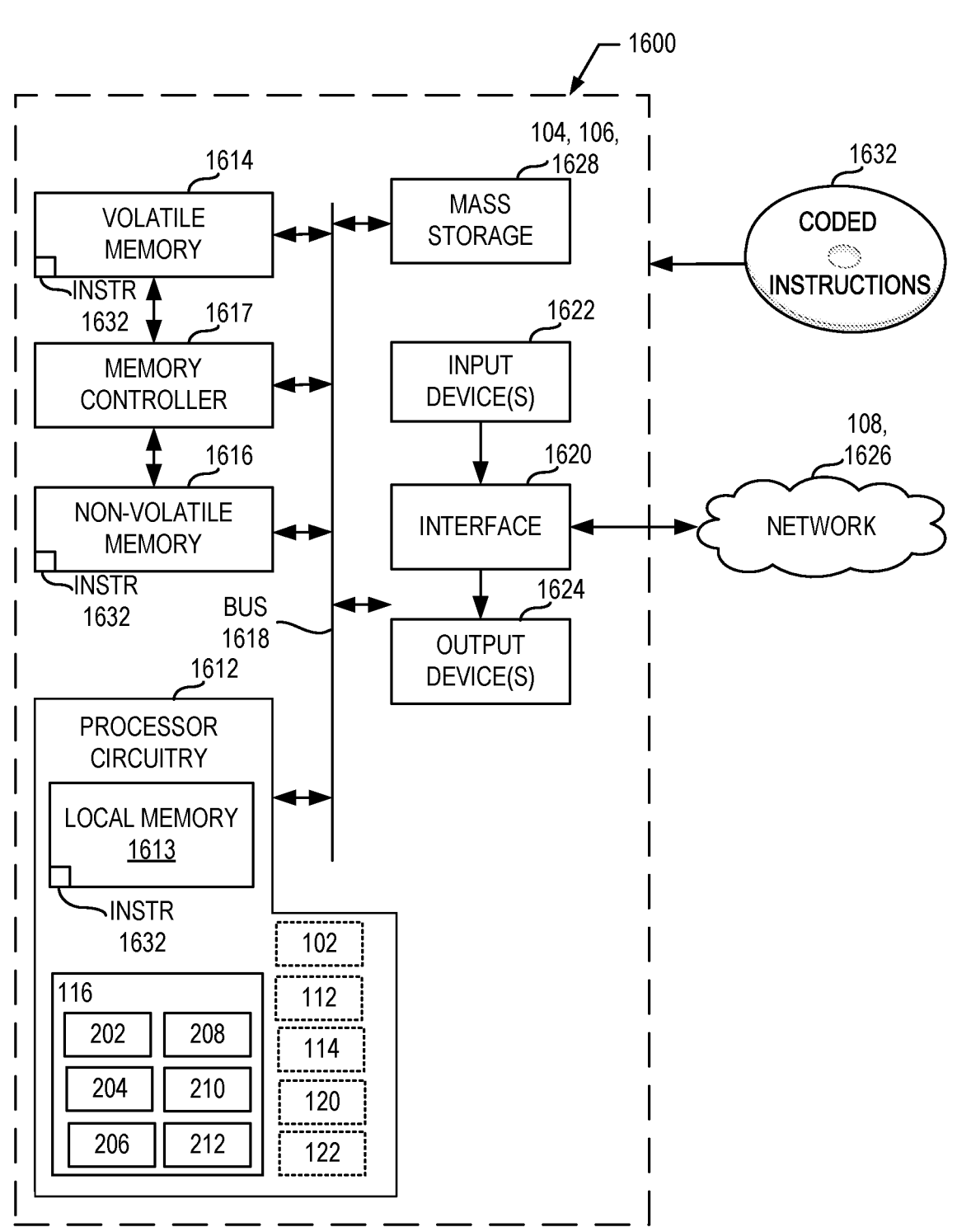
FIG. 16 is a block diagram of an example processing platform including processor circuitry structured to execute the example machine readable instructions and/or the example operations of FIGS. 10-15 to implement the document processor circuitry of FIG. 1 and, more specifically, the line detection circuitry of FIGS. 1-2.

In some examples, the feature extraction circuitry 204, the edge sample circuitry 206, the GNN circuitry 208, edge prediction circuitry 210, and/or the task solver circuitry 212 may be instantiated by processor circuitry such as the example processor circuitry 1612 of FIG. 16. For instance, the feature extraction circuitry 204, the edge sample circuitry 206, the GNN circuitry 208, edge prediction circuitry 210, and/or the task solver circuitry 212 may be instantiated by the example microprocessor 1700 of FIG. 17 executing machine executable instructions such as those implemented by at least blocks 1110 of FIGS. 10-15. In some examples, the feature extraction circuitry 204, the edge sample circuitry 206, the GNN circuitry 208, edge prediction circuitry 210, and/or the task solver circuitry 212 may be instantiated by hardware logic circuitry, which may be implemented by an ASIC, XPU, or the FPGA circuitry 1800 of FIG. 18 structured to perform operations corresponding to the machine readable instructions. Additionally or alternatively, the feature extraction circuitry 204, the edge sample circuitry 206, the GNN circuitry 208, edge prediction circuitry 210, and/or the task solver circuitry 212 may be instantiated by any other combination of hardware, software, and/or firmware. For example, the feature extraction circuitry 204, the edge sample circuitry 206, the GNN circuitry 208, edge prediction circuitry 210, and/or the task solver circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 4:
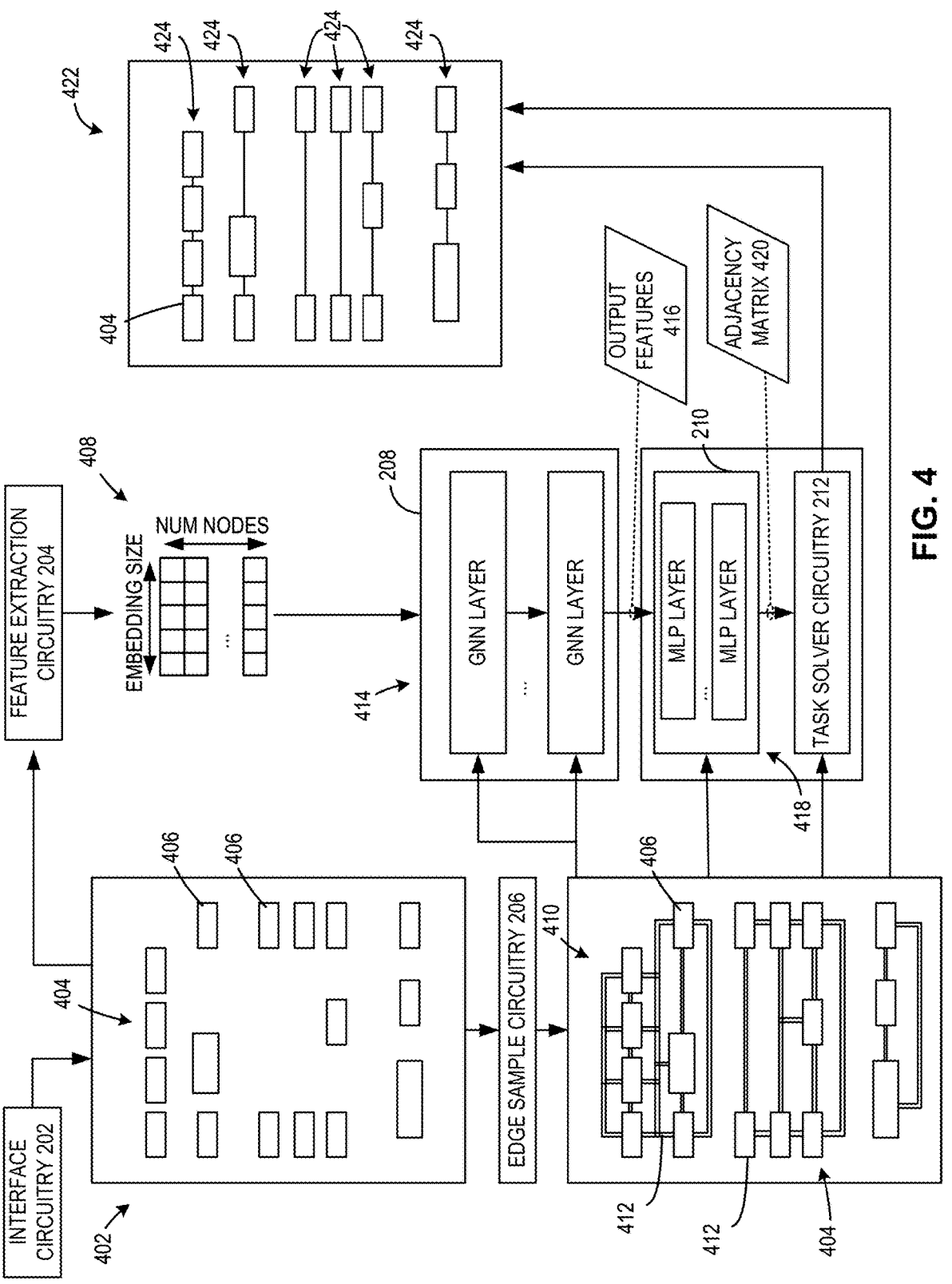
FIG. 4 illustrates an example implementation of the line detection circuitry of FIGS. 1 and 2 in accordance with teachings of this disclosure.

FIG. 4 illustrates an example implementation 400 of the line detection circuitry of FIGS. 1 and 2 in accordance with teachings of this disclosure. The line detection circuitry 116 obtains (via the interface circuitry 202) an example receipt 402 that includes example text segments 404 detected by an OCR engine (e.g., the OCR circuitry 114 of FIG. 1). The text segments 404 are associated with respective example bounding boxes 406 that represent group of coordinates defining a text box that enclose a text string detected by the OCR engine.

The example feature extraction circuitry 204 is structured to generate example input feature embeddings 408 (e.g., node feature embeddings, etc.) for nodes representing the text segments 404. For example, the feature extraction circuitry 204 can obtain an array of the text segments 404 based on a top to bottom and then left to right order of the bounding boxes 406. In some examples, the feature extraction circuitry 204 iterates sequentially through the text segments 404 in the array to generate an ordered array of the input feature embeddings 408. For example, the feature extraction circuitry 204 of FIG. 3 can iteratively extract a left-center coordinate, a right-center coordinate, and a bounding box rotation (e.g., angle of the bounding box in radians) from each of the text segments 404. It is understood, however, that the feature extraction circuitry 204 can operate on the text segments 404 in different orders in additional or alternative examples. In some examples, the feature extraction circuitry 204 normalizes the left- and right-center coordinates using the width of the receipt 402.

To generate the input feature embeddings 408, the feature extraction circuitry 204 concatenates the three extracted features together. In some examples, a number of the input feature embeddings 408 corresponds to a number of nodes of a graph representing the receipt 402. In some examples, the number of nodes corresponds to a number of the text segments 404 in the array. In some such examples, each input feature embedding 408 corresponds to a respective text segment 404 (e.g., a node). However, in additional or alternative examples, the feature extraction circuitry 204 may be structured to generate additional or alternative input feature embeddings, such as a global node embedding.

In some examples, an embedding size of each input feature embedding 408 is based on the features in the embeddings. For example, the features of each input feature embedding 408 of FIG. 4 include the normalized left-center coordinate, which includes 2 float values (e.g., an x coordinate and a y coordinate), the normalized right-center coordinate, which includes 2 float values (e.g., an x coordinate and a y coordinate), and the rotation angle, which includes 1 float value (e.g., the rotation angle R, in radians). Thus, the embedding size is 5 float values. The input feature embeddings 408 are provided as an input to the example CNN circuitry 208.

As illustrated in FIG. 4, the edge sample circuitry 206 also obtains the text segments 404 of the receipt 402. The edge sample circuitry 206 generates an example graph (e.g., graph structure) 410 for the receipt 402 by sampling example edges 412 among the text segments 404. The graph 410 includes the text segments 404, which are the nodes of the graph 410, and which are connected by the edges 412.

The edge sample circuitry 206 samples the edges by applying equation (1), above, to each pair of text segments in the receipt 402. For a pair of segments (e.g., Segment A and Segment B), the edge sample circuitry 206 determines to create an edge from segment A to segment B if a vertical distance between their centers (C) is less than a height (H) of segment A multiplied by a constant (K) (2 in this use case). The edge 412 are utilized by and/or provided to the GNN circuitry 208 to perform the message passing, the edge prediction circuitry 210 to confidence scores for the edges, and/or the task solver circuitry 212 to select solve the link prediction task.

The GNN circuitry 208 obtains the input feature embeddings 408 and the graph 410 with the sampled edges 412. The GNN circuitry 208 generates another feature embedding for a global node by averaging all the input feature embeddings 408. The global node is connected bidirectionally to the rest of the nodes. The GNN circuitry 208 applies an example GAN-based model 414 to the input feature embeddings 408, the edges 412, and the global node. The GAN-based model 414 is used to compute hidden representations of each node in the graph 410 by attending over its neighbors nodes (e.g., a local aspect) and the global node, which causes the model to learn contextualized information in the document from both local and global aspects. The GNN circuitry 208 provides example output features 416 to the edge prediction circuitry 210, which uses the output features 416 to determine confidence scores for each sampled edge 412.

Figure 5:
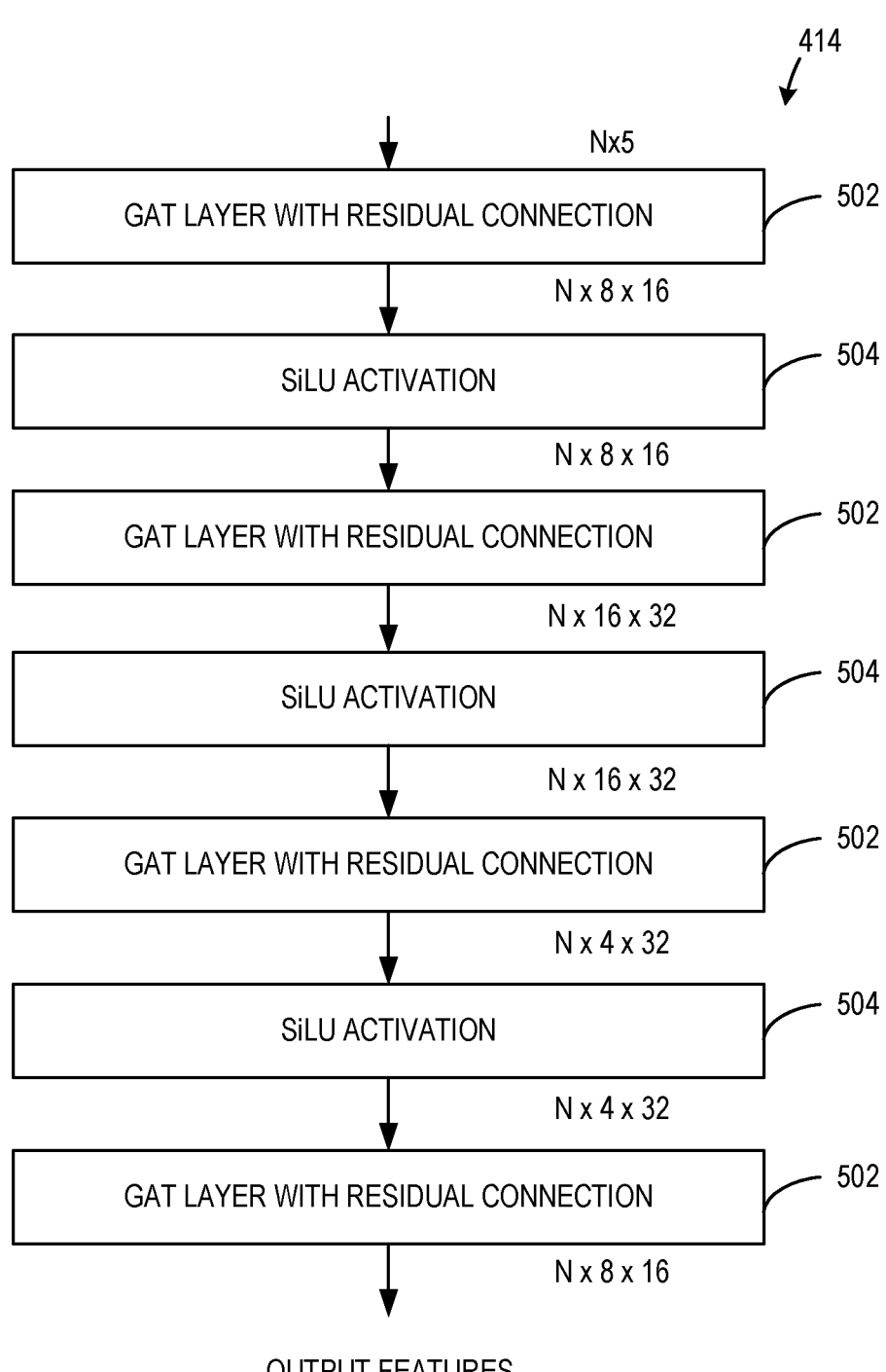
FIG. 5 illustrates an example architecture of an graph attention network structured in accordance with teachings of this disclosure for enriching input node features.

FIG. 5 illustrates an architecture of an example GAN-based model 414 structured in accordance with teachings of this disclosure for enriching node feature embeddings. As illustrated in FIG. 5, the GAN-based model 414 includes series of stacked layers. In particular, the GAN-based model 414 includes four example graph attention (GAT) layer 502, the first three of which are followed by an example SiLu activation layer 504. The GAT layers 502 include residual connections to accelerate the convergence of the model 414. The GAT layers 502 compute the weights for the message passing directly inside each layer using equations (2)-(5), wherein 1 is a specifical layer, W is a weight, $h_i$ is an embedding for the $i^{th}$ node, $$e_{ij}^{(l)}$$

is an attention coefficient indicating the importance of node j's features to node i (where $.^T$ represents transposition and $\parallel$ is the concatenation operation), $a^{(l)^T}$ is an attention mechanism, $$\alpha_{ij}^{(l)}$$

represents a normalized attention coefficient, and $$z_i^{(l)} = W^{(l)} h_i^{(l)} \qquad\qquad \text{Equation (2)}$$

$$e_{ij}^{(l)} = LeakyReLU\left(a^{(l)^T}\left(z_i^l \| z_j^l\right)\right) \qquad \text{Equation (3)}$$

$$\alpha_{ij}^{(l)} = \frac{\exp\left(e_{ij}^l\right)}{\sum_{k \in N(i)} \exp\left(e_{ik}^l\right)} \qquad \text{Equation (4)}$$

$$h_i^l = \sigma\left(\sum_{j \in N(i)}^{a_{ij}^{(l)}} z_j^{(l)}\right) \qquad\qquad \text{Equation (5)}$$

The graph structure 410 and the input feature embeddings 408 are provided to the GAT layers 502, which cause the nodes to determine contributions (e.g. weights) of each neighbor affecting features of the nodes. That is, the graph 410 is input into a masked attention mechanism that determines $$e_{ij}^{(l)}$$

for nodes j ε $\mathcal{N}$ (i), where $\mathcal{N}$ (i) is some neighborhood of node i in the graph 410. Once obtained, the normalized attention coefficients are used to compute a linear combination of the features corresponding to them, to serve as the final output features for every node. The SiLu activation layers 504 are to update the nodes based on the modified feature embeddings. The last GAT layer 502 generates the output features 416, which are modified (e.g., enriched) versions of the input feature embeddings for the nodes.

Referring again to FIG. 4, the edge prediction circuitry 210 obtains the output features 416 from the GNN circuitry 208. The edge prediction circuitry 210 also obtains the sampled edges 412 from the edge sample circuitry 206. Each example edge 412 generated in the edge sampling step (e.g., by the edge sample circuitry 206) is evaluated using a multilayer perception (MLP) based model 418 that includes of two fully-connected layers.

Figure 6:
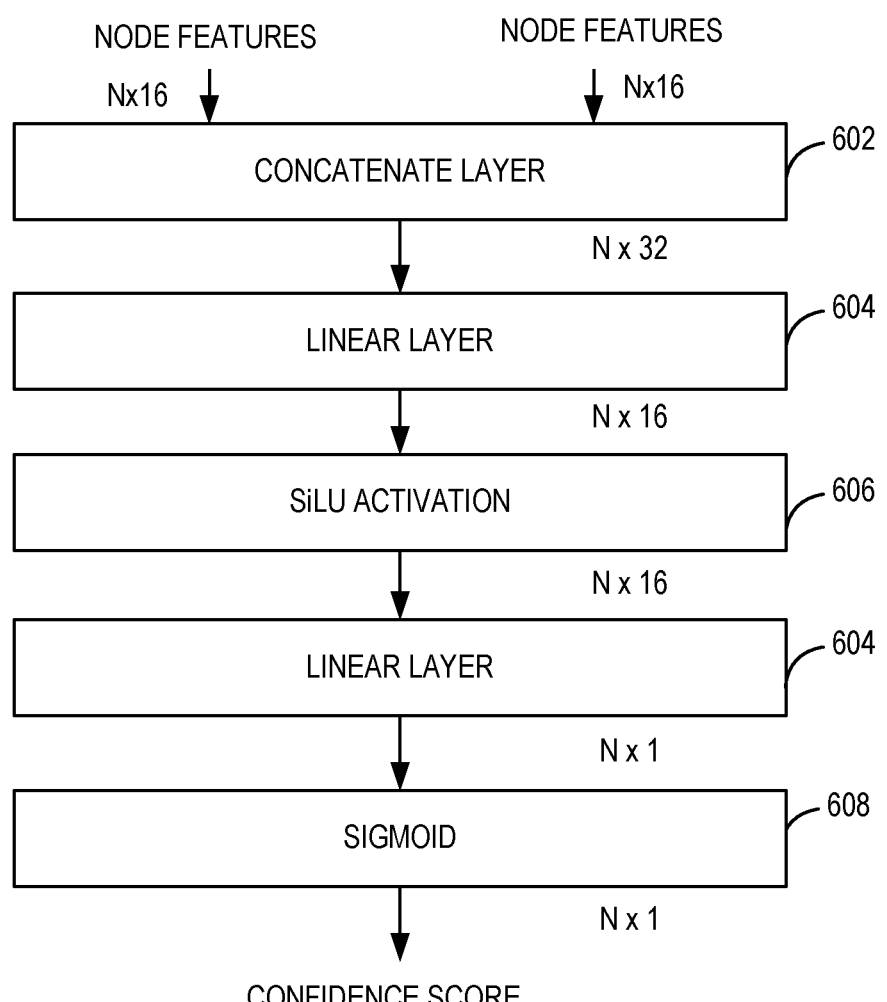
FIG. 6 illustrates an example architecture of an multilayer perceptron structured in accordance with teachings of this disclosure for determining linking confidence scores for sampled edges.

FIG. 6 illustrates an architecture of the example MLP-based model 418 structured in accordance with teachings of this disclosure for determining linking confidence scores for sampled edges. The MLP-based model 418 includes an example first (e.g., concatenate) layer 602, which is structured to concatenate output features 416 of two nodes connected by a sampled edge 412. The first layer 602 is followed by two example liner layers 604 (e.g., with an output size of 32 and 1, respectively), between which is an example SiLU activation layer 606. An example sigmoid layer of the last linear layer 604, which is a logit, is provided to an example sigmoid layer 608. The sigmoid layer 608 applies a sigmoid function to the output logit from the last linear layer 604 to generate a confidence score for the sampled edge 412.

Referring again to FIG. 4, the edge prediction circuitry 210 is structured to pass each sampled edge 412 through the MLP-based model 418. In doing so, the edge prediction circuitry 210 can determine a confidence score for each of the sampled edges 412. In the example of FIG. 4, the edge prediction circuitry 210 outputs an example adjacency matrix 420 of confidence scores.

The example task solver circuitry 212 obtains the adjacency matrix 420 from the edge prediction circuitry 210 groups the text segments into line clusters. The task solver circuitry 212 applies a LCC algorithm to the text segments and outputs an example line detection 422 having example segment clusters 424 representing lines.

Figure 7:
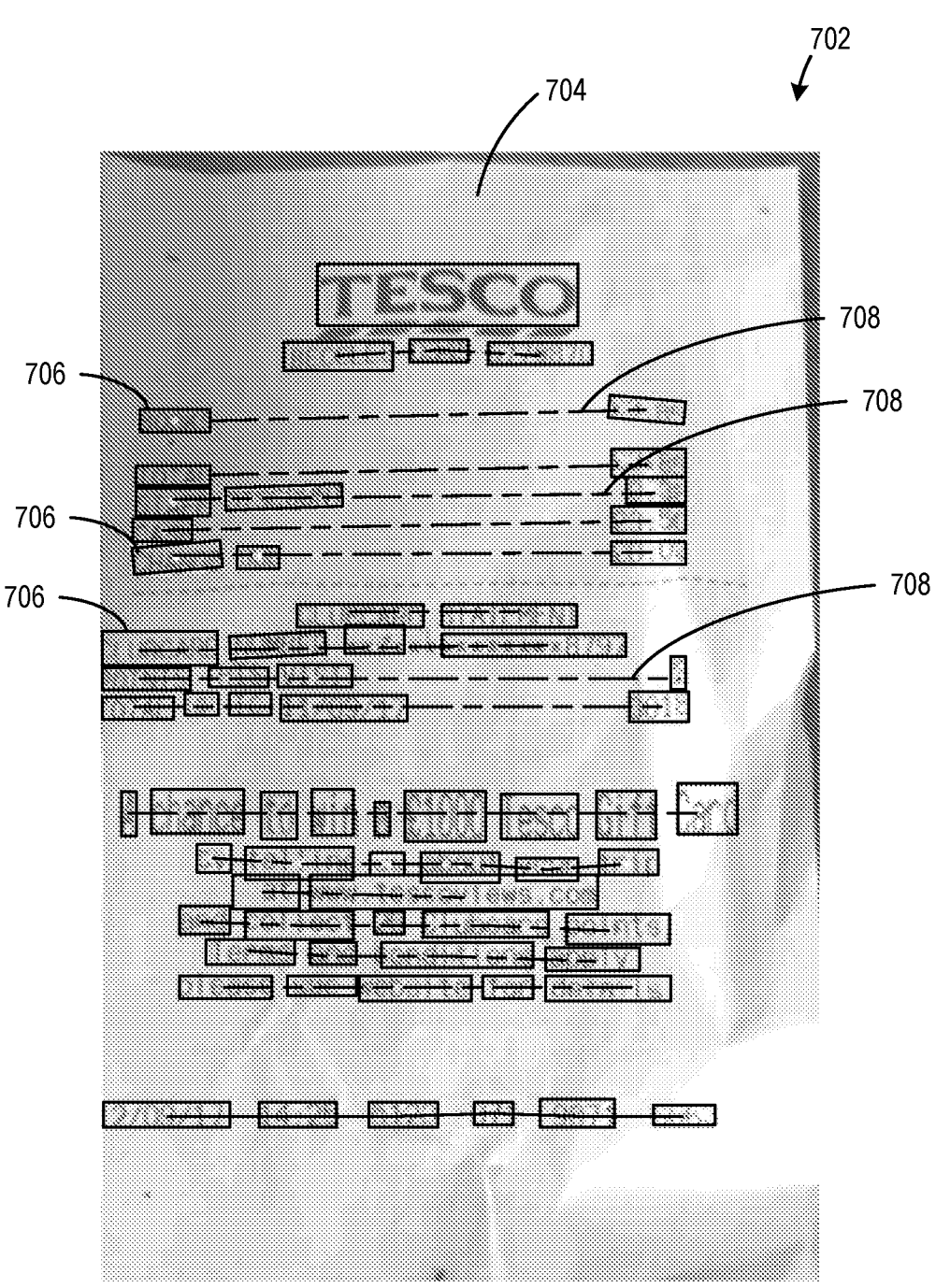
FIG. 7 illustrates an example output of the example line detection circuitry of FIGS. 1 and 2 in accordance with teachings of this disclosure.

FIG. 7 illustrates an example output 702 of the example line detection circuitry 116 of FIGS. 1-2 in accordance with teachings of this disclosure. Specifically, FIG. 7 illustrates the output 702 as applied to an example receipt 704 on which an example line detection model was applied by the line detection circuitry 116. As illustrated in FIG. 7, the line detection circuitry 116 clustered and linked example text segments 706 belonging to example lines 708. Each of the text segments 706 belongs to a respective line 708, whether the line 708 includes one text segment 706 or multiple.

While an example manner of implementing the line detection circuitry 116 of FIG. 1 is illustrated in FIG. 2, one or more of the elements, processes, and/or devices illustrated in FIG. 2 may be combined, divided, re-arranged, omitted, eliminated, and/or implemented in any other way. Further, the example interface circuitry 202, the example feature extraction circuitry 204, the example edge sample circuitry 206, the example GNN circuitry 208, the example edge prediction circuitry 210, the example task solver circuitry 212, and/or, more generally, the example line detection circuitry 116 of FIG. 1, may be implemented by hardware alone or by hardware in combination with software and/or firmware. Thus, for example, any of the example interface circuitry 202, the example feature extraction circuitry 204, the example edge sample circuitry 206, the example GNN circuitry 208, the example edge prediction circuitry 210, the example task solver circuitry 212, and/or, more generally, the example line detection circuitry 116 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device (s) (FPLD(s)) such as Field Programmable Gate Arrays (FPGAs). Further still, the example line detection circuitry 116 of FIG. 1 may include one or more elements, processes, and/or devices in addition to, or instead of, those illustrated in FIG. 2, and/or may include more than one of any or all of the illustrated elements, processes and devices.

FIGS. 8A-8D illustrate example receipt images on which disclosed examples may be applied. FIG. 8A illustrates a receipt image 802 that includes a receipt 804 captured with a background 806. The background 806 includes clutter that is irrelevant to the purchase data in the receipt. Further, the receipt 804 includes a bend 808, which affects at least some text in the receipt 804.

FIG. 8B illustrates another example receipt image 810 that includes numerous wrinkles 812. FIG. 8C illustrates an example receipt image 814 that includes a background 806 a large shadow 816. FIG. 8D illustrates an example receipt image 818 that includes a background 806 and text that is small and blurry. Example disclosed herein are able to detect and extract lines of text within the foregoing receipt images 802, 810, 814, 818 with improved accuracy and reduced resource consumption and processing time (e.g., relative to previous techniques).

Figure 9:
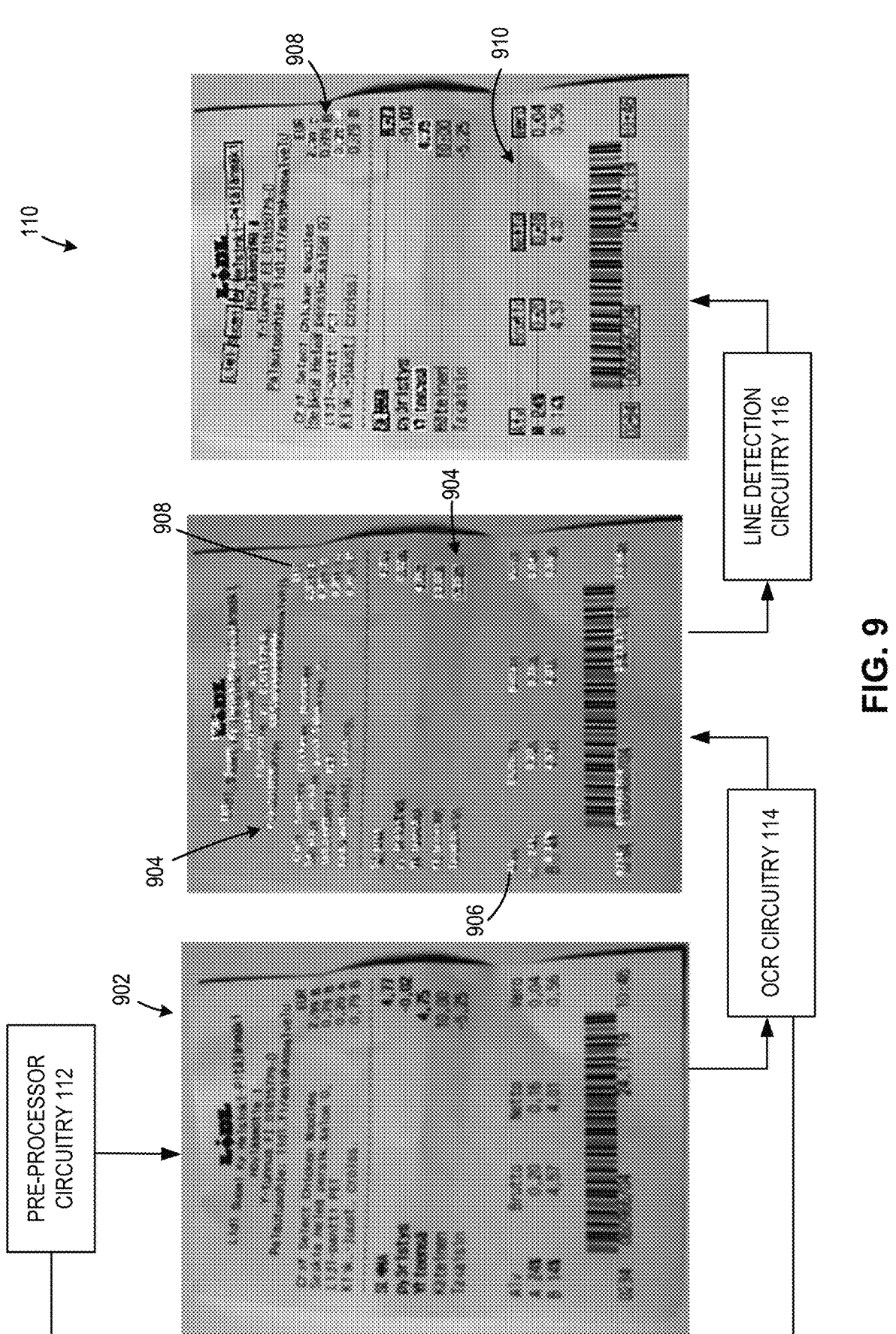
FIG. 9 illustrates an example implementation of the example document processor circuitry of FIG. 1 in accordance with teachings of this disclosure.

FIG. 9 illustrates an example implementation of the document processor circuitry 102 of FIG. 1 in accordance with teachings of this disclosure. The example pre-processor circuitry 112 provides an example receipt 902 of an example receipt image (not illustrated) to the example OCR circuitry 114. The receipt 902 is a raw, unstructured document that includes purchase data corresponding to a transaction between a consumer and a retailer. As illustrated in FIG. 2, the receipt 902 in the image is wrinkled, resulting in imperfections and rotated text. Further, as can be seen by the human eye, some of the text is blurry.

The OCR circuitry 114 obtains the receipt 902 and applies an OCR algorithm to detect, extract, and localize text in the receipt 902. In some examples, the OCR circuitry 114 outputs an array (e.g., a sequence) of example text segments 904. In some examples, each text segment 904 and includes an text string (e.g., a string of characters) 906 corresponding to a word and an example bounding box 908. However, the OCR circuitry 114 does not typically provide relations between text segments 904. Further, the output of the OCR circuitry 114 can include errors such as (but not limited to) typos in the detected text strings 906, noisy bounding boxes 908, inaccuracy in detected segment regions (e.g., offset or have the length, width, or angle incorrectly adjusted) and/or may include duplicated detections. For example, the OCR circuitry 114 may detect a single segment twice (e.g., totally, partially, etc.), resulting in a duplicated and overlapped detection that can include some shift.

Moreover, the output of the OCR circuitry 114 can include errors such as (but not limited to) typos in the detected text strings, noisy bounding boxes, inaccuracy in detected segment regions (e.g., offset or have the length, width, or angle incorrectly adjusted) and/or may include duplicated detections. For example, the OCR circuitry 114 may detect a single segment twice (e.g., totally, partially, etc.), resulting in a duplicated and overlapped detection that can include some shift.

The line detection circuitry 116 is structured to obtain the array of text segments 904 output by the OCR circuitry 114 and to detect group the text segments 904 by line. The line detection circuitry 116 removes the text strings 906, which removes any errors in text detected by the OCR circuitry 114. In particular, the line detection circuitry 116 detects example lines 910 using information from the bounding boxes 908. With the bounding box information, the line detection circuitry 116 groups together the text segments 904 that belong to the same text line 910 in an accurate and efficient manner.

While an example manner of implementing the data collection system 100 of FIG. 1 is illustrated in FIG. 9, one or more of the elements, processes, and/or devices illustrated in FIG. 1 may be combined, divided, re-arranged, omitted, eliminated, and/or implemented in any other way. Further, the example pre-processor circuitry 112, the example OCR circuitry 114, the example line detection circuitry 116, the example model trainer circuitry 118, and/or, more generally, the example data collection system 100 of FIG. 1, may be implemented by hardware alone or by hardware in combination with software and/or firmware. Thus, for example, any of the example pre-processor circuitry 112, the example OCR circuitry 114, the example line detection circuitry 116, the example model trainer circuitry 118, and/or, more generally, the example data collection system 100, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device (s) (FPLD(s)) such as Field Programmable Gate Arrays (FPGAs). Further still, the example data collection system 100 of FIG. 1 may include one or more elements, processes, and/or devices in addition to, or instead of, those illustrated in FIG. 9, and/or may include more than one of any or all of the illustrated elements, processes and devices.

Flowcharts representative of example machine readable instructions, which may be executed to configure processor circuitry to implement the document processor circuitry 102 of FIG. 1 and, more specifically, the line detection circuitry 116 of FIGS. 1-2, are shown in FIGS. 10-15. The machine readable instructions may be one or more executable programs or portion(s) of an executable program for execution by processor circuitry, such as the processor circuitry 1612 shown in the example processor platform 1600 discussed below in connection with FIG. 16 and/or the example processor circuitry discussed below in connection with FIGS. 17 and/or 18. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 10-15, many other methods of implementing the example document processor circuitry 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 10-15 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 10:
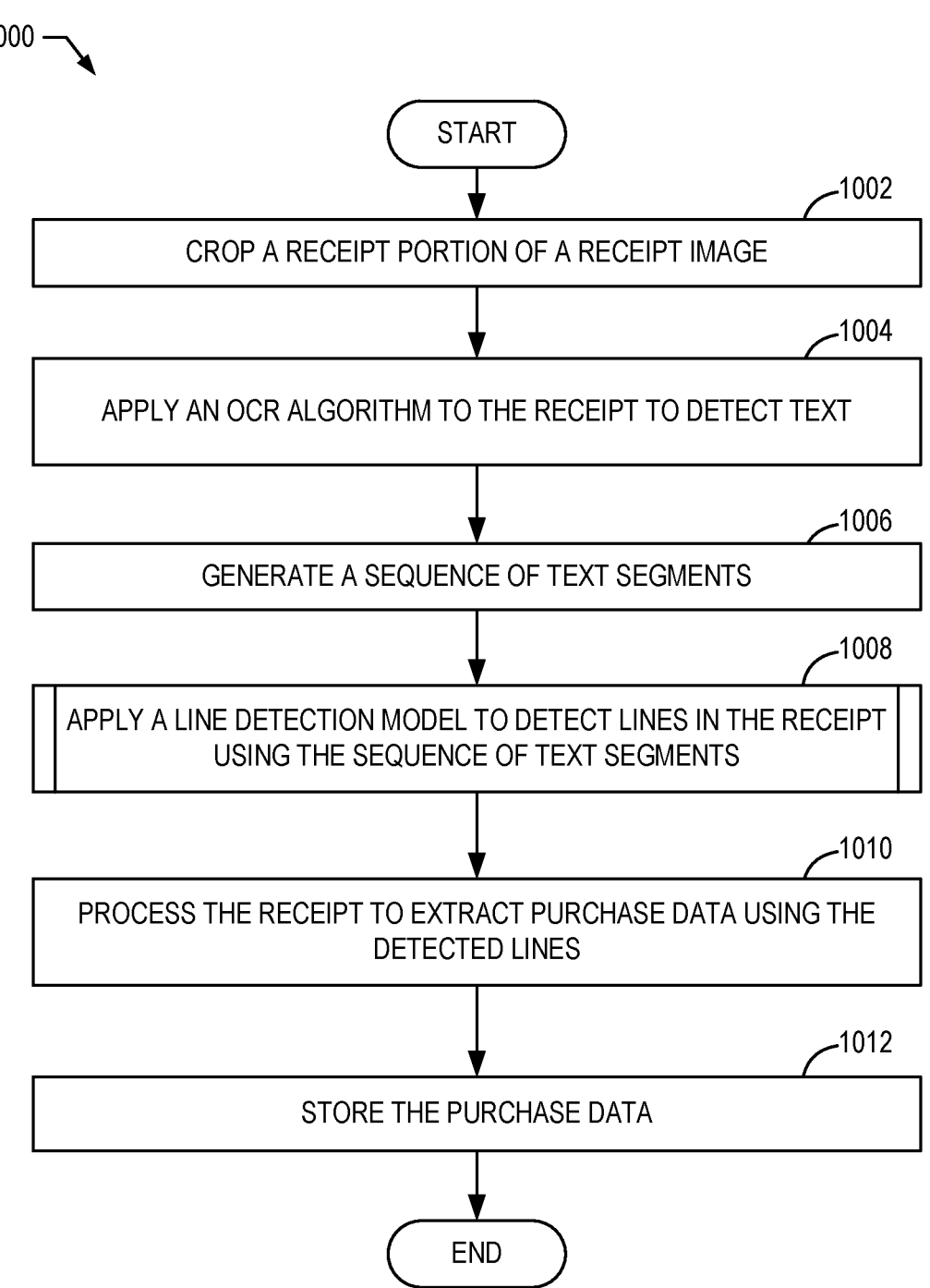

FIG. 10 is a flowchart representative of example machine readable instructions and/or example operations 1000 that may be executed and/or instantiated by processor circuitry to process an image of a purchase document, such as a receipt. The operations 1000 start when the document processor circuitry 102 obtains the purchase document image. The machine readable instructions and/or the operations 1000 of FIG. 10 begin at block 1002, at which the example pre-processor circuitry 112 crops a receipt portion of a receipt image obtained by the document processor circuitry 102. For example, the pre-processor circuitry 112 segments the purchase document from a background of the purchase document image by cropping the image based on detected regions of interest.

At block 1004, the example OCR circuitry 114 applies an OCR algorithm to the receipt to detect text in the receipt. For example, the OCR circuitry 114 can examine the purchase document pixel by pixel, looking for shapes that match character traits.

At block 1006, the OCR circuitry 114 generates a sequence of text segments. For example, the OCR circuitry 114 can generate bounding boxes corresponding to the detected text and determine coordinates of the bounding boxes that define a location of a text segment within the receipt image. The OCR circuitry 114 can order an ordered list of bounding boxes (e.g., based on the top to bottom order and then left to right order of the bounding boxes) to generate the sequence of text segments.

At block 1008, the example line detection circuitry 116 applies an example line detection model to detect lines in the purchase document using the sequence of text segments output by the OCR circuitry 114. For example, the line detection circuitry 116 can generate a graph representing the receipt by sampling edges among the text segments. Further, the line detection circuitry 116 generate feature embeddings for the text segments (e.g., the nodes of the graph) and pass the graph with the feature embeddings through an example GAN-based model 414 that produces enriched features that learn context of neighbor features. Further, the line detection circuitry 116 can determine confidence scores for the sampled edges based on the enriched features using an example novel edge prediction function, and group the text segments by line using the confidence scores and an example LCC algorithm. The line detection circuitry 116 can output the detected lines in the receipt.

At block 1010, the document processor circuitry 102 processes the receipt to extract purchase data using the detected lines. For example, the detected lines may be used in downstream tasks, such as receipt field extraction and/or segment grouping by entity. At block 1012, the document processor circuitry 102 stores the purchase data in the purchase data datastore 106.

FIG. 11 is a flowchart representative of example machine readable instructions and/or example operations 1008 that may be executed and/or instantiated by processor circuitry to apply the line detection model to the receipt to detect lines in the receipt using the sequence of text segments. The machine readable instructions and/or the operations 1008 of FIG. 11 begin at block 1102, at which the feature extraction circuitry 204 generates feature embeddings for nodes representing the text segments. For example, the feature extraction circuitry 204 can extract features from the text segments (e.g., from the bounding boxes) detected by the OCR circuitry 114 to and convert the features into input feature embeddings (described further in relation to FIG. 12).

At block 1104, the edge sample circuitry 206 generates an example graph structure for the receipt by sampling edges between ones of the text segments. For example, edge sample circuitry 206 can identify a pair of text segments, and identify an edge between the text segments of the pair if a vertical distance between their centers (C) is less than a height (H) of a first text segment of the pair multiplied by a constant (K) (e.g., 2). If the foregoing is not true, no edge is generated. Thus, the graph structure includes nodes corresponding to the text segments and the sampled edges among the text segments.

At block 1106, the example GNN circuitry 208 utilizes an example GAN-based model 414 to enrich the node features with information from neighbor text segments. For example, the GNN circuitry 208 can pass the input node feature embeddings and the sampled edges through an example GAT-based model having a series of stacked layer (described further in relation to FIG. 13). The GNN circuitry 208 can output enriched node features that include context of neighbor text segments.

At block 1108, the example edge prediction circuitry 210 applies an edge prediction head to the GNN output (e.g., the enriched node features) to generate an example adjacency matrix of edge confidence scores. For example, the edge prediction head can include an example MLP-based model 418 having a series of liner layers designed to extract confidence scores of the sampled edges (described further in relation to FIG. 14). Further, the edge prediction circuitry 210 can structure the output confidence scores into the adjacency matrix.

At block 1110, the example task solver circuitry 212 solves the line detection task. For example, the task solver circuitry 212 applies a post-processing algorithm the adjacency matrix to cluster the text segments by line (described further in relation to FIG. 15). At block 1112, the line detection circuitry 116 outputs the connected line segments. That is, the line detection circuitry 116 outputs the text segments as connected by ones of the sampled edges that are maintained based on the post-processing algorithm.

Figure 12:
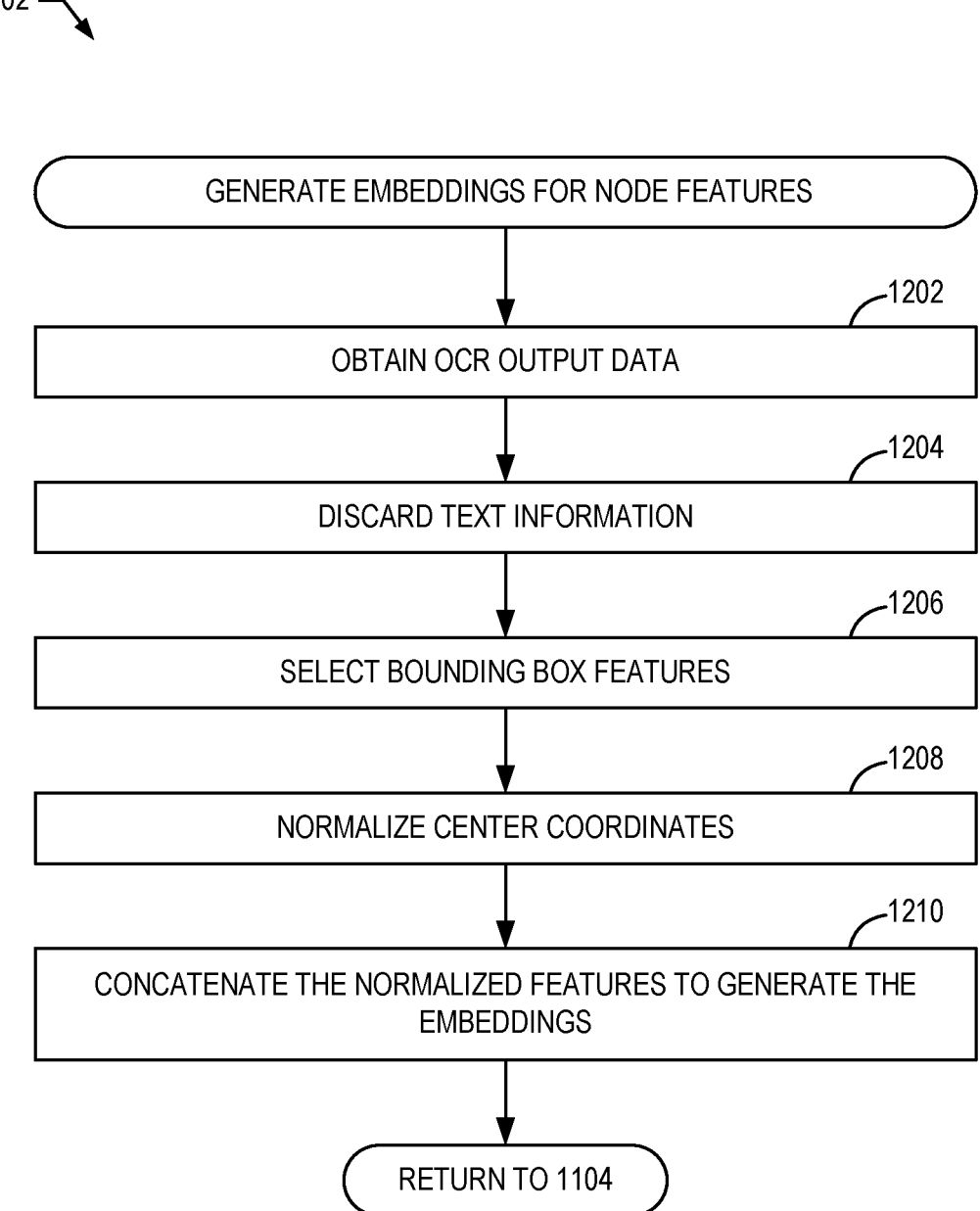

FIG. 12 is a flowchart representative of example machine readable instructions and/or example operations 1102 that may be executed and/or instantiated by processor circuitry to generate embeddings for the node features. The machine readable instructions and/or the operations 1102 of FIG. 12 begin at block 1202, at which the examples interface circuitry 202 obtains the OCR output data generated by the OCR circuitry 1202. For example, the OCR output data can include, for each text segment (e.g., word) in the receipt, a text string and a bounding box.

At block 1204, the feature extraction circuitry 204 discards text information from the OCR output data. For example, the feature extraction circuitry 204 discards the text string for each text segment. In doing so, the feature extraction circuitry 204 removes any error in the text extracted by the OCR circuitry 114.

At block 1206, the feature extraction circuitry 204 selects bounding box features from the bounding boxes corresponding to the text segments. For example, the feature extraction circuitry 204 can extract, from each text segment, a left-center coordinate, a right-center coordinate, and a rotation of the bounding box (e.g., the rotation angle).

At block 1208, the feature extraction circuitry 204 normalizes the center coordinates of the bounding boxes. For example, the feature extraction circuitry 204 can normalize the left- and right-center coordinates extracted from the bounding boxes relative to a width of the document. In some examples, the width is utilized because it is a more stable dimension than a length for unstructured documents such as receipts.

At block 1210, the feature extraction circuitry 204 concatenates the normalized features to generate the embeddings, which are to be input to the GNN-based model. For example, the feature extraction circuitry 204 concatenates the left- and right-center coordinates and respective angles of each text segment to generate the input feature embeddings. Control then advances to block 1104 of FIGS. 11 and 13.

FIG. 13 is a flowchart representative of example machine readable instructions and/or example operations 1106 that may be executed and/or instantiated by processor circuitry to enrich the node features with information from neighbor segments. The machine readable instructions and/or the operations 1106 of FIG. 13 begin at block 1302, at which the GNN circuity 208 generates a global node. For example, the GNN circuitry 208 can generate the global node by averaging the input feature embeddings for the receipt.

At block 1304, the GNN circuitry 208 adds self-loops to reduce error. For example, the GNN circuitry 208 can add a self-loop for each node, which means adding an edge that connects the node with itself. In some examples, the self-loops are used to avoid 0-in-degree errors while using GAT layers of the example GAN-based model.

At block 1306, the GNN circuitry 208 passes the input feature embeddings and the graph through a series of GAT layers and SiLU activations. In some examples, the GNN circuitry 208 inputs the input feature embeddings and the graph to the GAN-based model, which performs message passing of weights. In some examples, the weights for the message passing are computed directly inside the GAT layers using the input node features. At block 1308, the GNN circuitry 208 discards the global node. For example, the global node may be used only during the message passing and can be discarded once the GAN stage is finished.

At block 1310, the GNN circuitry 208 outputs enriched node features. For example, after the node features have been passed through the graph attention network and enriched with the information from the neighbor nodes, the GNN circuitry 208 outputs the enriched node features. Control then advances to block 1104 of FIGS. 11 and 14.

FIG. 14 is a flowchart representative of example machine readable instructions and/or example operations 1108 that may be executed and/or instantiated by processor circuitry to apply an edge prediction head to the GNN output to generate the adjacency matrix of edge confidence scores. The machine readable instructions and/or the operations 1108 of FIG. 14 begin at block 1402, at which the edge prediction circuity 210 identifies a pair of segments connected by an edge. For example, the edge prediction circuitry 210 can select an edge sampled by and received from the edge sample circuitry 206.

At block 1404, the edge prediction circuity 210 concatenates respective output features of the nodes representing the text segments. For example, the edge prediction circuitry 210 can identify the enriched node features for the text segments as generated by the GNN circuitry 208 and concatenate the enriched node features. At block 1406, the edge prediction circuity 210 passes the concatenated features through an example MLP-based model to extract a confidence score. For example, the edge prediction circuitry 210 can pass the concatenated features through two multi-layer perceptron layers with SiLU activation to extract a confidence score the edge connecting the text segments. In some examples, the MLP-based model that includes two linear layers, a SiLU activation layer therebetween, and a sigmoid function. The MLP-based model can output the confidence score based on the sigmoid function.

At block 1408, the edge prediction circuitry 210 determines whether to process another pair of segments. For example, the edge prediction circuitry 210 is structured to process each edge sampled by the edge prediction circuitry 210. If another edges needs to be processed, the edge prediction circuitry 210 can determine to process another pair of segments (e.g., block 1408: YES). When the answer to block 1408 is YES, control returns to block 1402. When the answer to block 1410 is NO, control advances to block 1410 at which the edge prediction circuitry 210 outputs an adjacency matrix of configure scores. In some examples, the edge prediction circuitry 210 outputs an example adjacency matrix of confidence scores for the sampled edges. Control then advances to block 1110 of FIGS. 11 and 15.

FIG. 15 is a flowchart representative of example machine readable instructions and/or example operations 1110 that may be executed and/or instantiated by processor circuitry to solve the line detect task. The machine readable instructions and/or the operations 1110 of FIG. 15 begin at block 1502, at which the task solver circuitry 212 identifies confidence scores for the sampled edges. For example, the task solver circuitry 212 can identify the confidence scores in the adjacency matrix output by the edge prediction circuitry 210.

At block 1504, the task solver circuitry 212 applies a variant limited connected components (LCC) algorithm to cluster groups of nodes by line. For example, the task solver circuitry 212 can apply the LCC algorithm to the adjacency matrix to cluster the text segments. At block 1506, the task solver circuitry 212 generates the lines using the clustered text components.

FIG. 16 is a block diagram of an example processor platform 1600 structured to execute and/or instantiate the machine readable instructions and/or the operations of FIGS. 10-15 to implement the document processor circuitry 102 of FIG. 1 and/or, more specifically, the line detection circuitry 116 of FIGS. 1-2. The processor platform 1600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a Blu-ray player, a gaming console, a set top box, a headset (e.g., an augmented reality (AR) headset, a virtual reality (VR) headset, etc.) or other wearable device, or any other type of computing device.

The processor platform 1600 of the illustrated example includes processor circuitry 1612. The processor circuitry 1612 of the illustrated example is hardware. For example, the processor circuitry 1612 can be implemented by one or more integrated circuits, logic circuits, FPGAs, microprocessors, CPUs, GPUs, DSPs, and/or microcontrollers from any desired family or manufacturer. The processor circuitry 1612 may be implemented by one or more semiconductor based (e.g., silicon based) devices. In this example, the processor circuitry 1612 implements example document processor circuitry 102, example pre-processor circuitry 112, example OCR circuitry 114, example line detection circuitry 116, example model trainer circuitry 118, example storage circuitry 120, example interface circuitry 202, example feature extraction circuitry 204, example edge sample circuitry 206, example GNN circuitry 208, example edge prediction circuitry 210, and example task solver circuitry 212.

The processor circuitry 1612 of the illustrated example includes a local memory 1613 (e.g., a cache, registers, etc.). The processor circuitry 1612 of the illustrated example is in communication with a main memory including a volatile memory 1614 and a non-volatile memory 1616 by a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1616 may be implemented by flash memory and/or any other desired type of memory device. Access to the main memory 1614, 1616 of the illustrated example is controlled by a memory controller 1617.

The processor platform 1600 of the illustrated example also includes interface circuitry 1620. The interface circuitry 1620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1622 are connected to the interface circuitry 1620. The input device(s) 1622 permit(s) a user to enter data and/or commands into the processor circuitry 1612. The input device(s) 1622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1624 are also connected to the interface circuitry 1620 of the illustrated example. The output device(s) 1624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1620 of the illustrated example, thus, typically includes a graphics driver card, a graphics driver chip, and/or graphics processor circuitry such as a GPU.

The interface circuitry 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1600 of the illustrated example also includes one or more mass storage devices 1628 to store software and/or data. Examples of such mass storage devices 1628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1632, which may be implemented by the machine readable instructions of FIGS. 10-15, may be stored in the mass storage device 1628, in the volatile memory 1614, in the non-volatile memory 1616, and/or on a removable non-transitory computer readable storage medium such as a CD or DVD.

Figure 17:
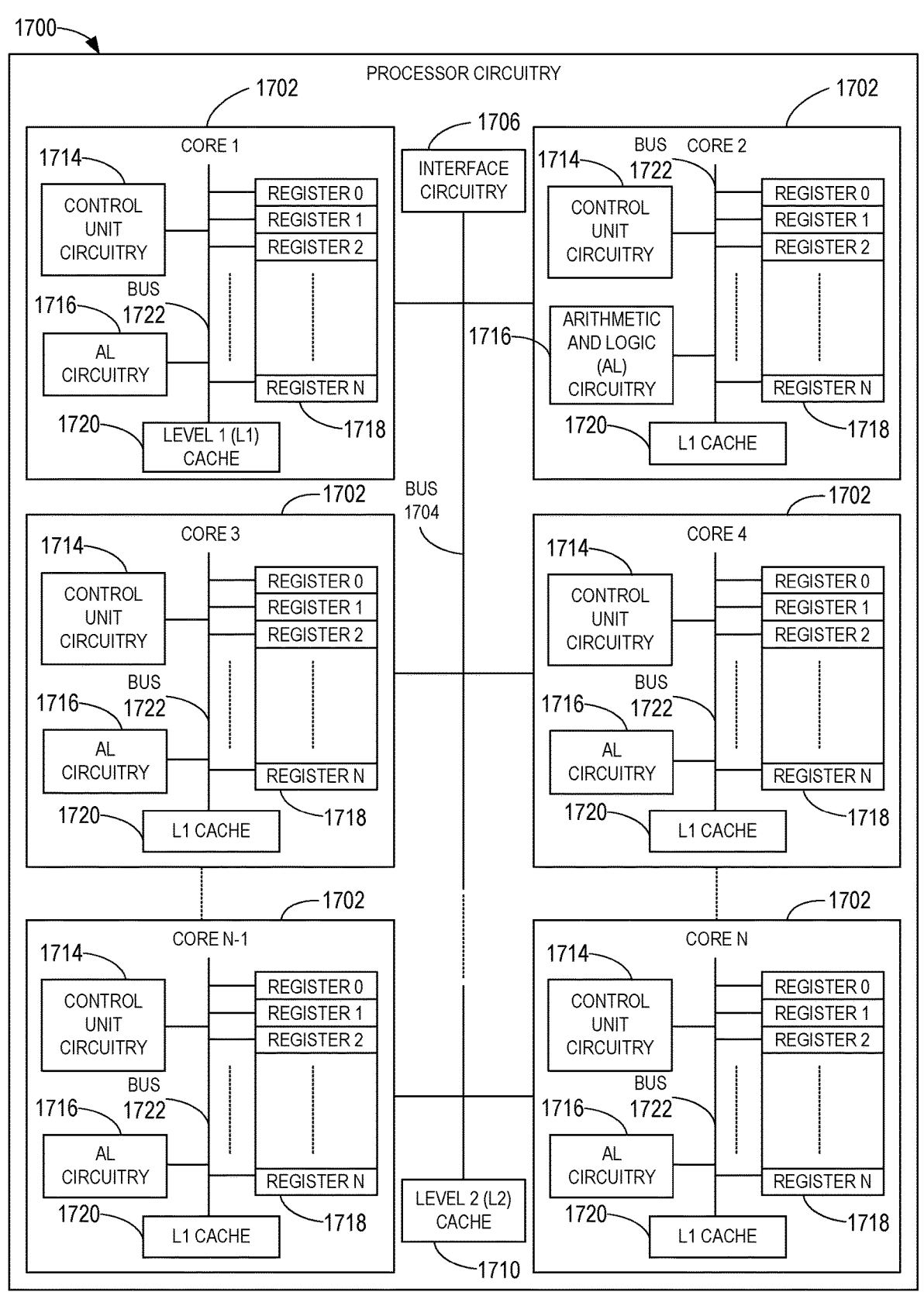
FIG. 17 is a block diagram of an example implementation of the processor circuitry of FIG. 16.

FIG. 17 is a block diagram of an example implementation of the processor circuitry 1612 of FIG. 16. In this example, the processor circuitry 1612 of FIG. 16 is implemented by a microprocessor 1700. For example, the microprocessor 1700 may be a general purpose microprocessor (e.g., general purpose microprocessor circuitry). The microprocessor 1700 executes some or all of the machine readable instructions of the flowcharts of FIGS. 10-15 to effectively instantiate the circuitry of FIGS. 1-2 as logic circuits to perform the operations corresponding to those machine readable instructions. In some such examples, the circuitry of FIGS. 1-2 is instantiated by the hardware circuits of the microprocessor 1700 in combination with the instructions. For example, the microprocessor 1700 may be implemented by multi-core hardware circuitry such as a CPU, a DSP, a GPU, an XPU, etc. Although it may include any number of example cores 1702 (e.g., 1 core), the microprocessor 1700 of this example is a multi-core semiconductor device including N cores. The cores 1702 of the microprocessor 1700 may operate independently or may cooperate to execute machine readable instructions. For example, machine code corresponding to a firmware program, an embedded software program, or a software program may be executed by one of the cores 1702 or may be executed by multiple ones of the cores 1702 at the same or different times. In some examples, the machine code corresponding to the firmware program, the embedded software program, or the software program is split into threads and executed in parallel by two or more of the cores 1702. The software program may correspond to a portion or all of the machine readable instructions and/or operations represented by the flowcharts of FIGS. 10-15.

The cores 1702 may communicate by a first example bus 1704. In some examples, the first bus 1704 may be implemented by a communication bus to effectuate communication associated with one(s) of the cores 1702. For example, the first bus 1704 may be implemented by at least one of an Inter-Integrated Circuit (I2C) bus, a Serial Peripheral Interface (SPI) bus, a PCI bus, or a PCIe bus. Additionally or alternatively, the first bus 1704 may be implemented by any other type of computing or electrical bus. The cores 1702 may obtain data, instructions, and/or signals from one or more external devices by example interface circuitry 1706. The cores 1702 may output data, instructions, and/or signals to the one or more external devices by the interface circuitry 1706. Although the cores 1702 of this example include example local memory 1720 (e.g., Level 1 (L1) cache that may be split into an L1 data cache and an L1 instruction cache), the microprocessor 1700 also includes example shared memory 1710 that may be shared by the cores (e.g., Level 2 (L2 cache)) for high-speed access to data and/or instructions. Data and/or instructions may be transferred (e.g., shared) by writing to and/or reading from the shared memory 1710. The local memory 1720 of each of the cores 1702 and the shared memory 1710 may be part of a hierarchy of storage devices including multiple levels of cache memory and the main memory (e.g., the main memory 1614, 1616 of FIG. 16). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1702 may be referred to as a CPU, DSP, GPU, etc., or any other type of hardware circuitry. Each core 1702 includes control unit circuitry 1714, arithmetic and logic (AL) circuitry (sometimes referred to as an ALU) 1716, a plurality of registers 1718, the local memory 1720, and a second example bus 1722. Other structures may be present.

For example, each core 1702 may include vector unit circuitry, single instruction multiple data (SIMD) unit circuitry, load/store unit (LSU) circuitry, branch/jump unit circuitry, floating-point unit (FPU) circuitry, etc. The control unit circuitry 1714 includes semiconductor-based circuits structured to control (e.g., coordinate) data movement within the corresponding core 1702. The AL circuitry 1716 includes semiconductor-based circuits structured to perform one or more mathematic and/or logic operations on the data within the corresponding core 1702. The AL circuitry 1716 of some examples performs integer based operations. In other examples, the AL circuitry 1716 also performs floating point operations. In yet other examples, the AL circuitry 1716 may include first AL circuitry that performs integer based operations and second AL circuitry that performs floating point operations. In some examples, the AL circuitry 1716 may be referred to as an Arithmetic Logic Unit (ALU). The registers 1718 are semiconductor-based structures to store data and/or instructions such as results of one or more of the operations performed by the AL circuitry 1716 of the corresponding core 1702. For example, the registers 1718 may include vector register(s), SIMD register(s), general purpose register(s), flag register(s), segment register(s), machine specific register(s), instruction pointer register(s), control register(s), debug register(s), memory management register(s), machine check register(s), etc. The registers 1718 may be arranged in a bank as shown in FIG. 17. Alternatively, the registers 1718 may be organized in any other arrangement, format, or structure including distributed throughout the core 1702 to shorten access time. The second bus 1722 may be implemented by at least one of an I2C bus, a SPI bus, a PCI bus, or a PCIe bus Each core 1702 and/or, more generally, the microprocessor 1700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 18:
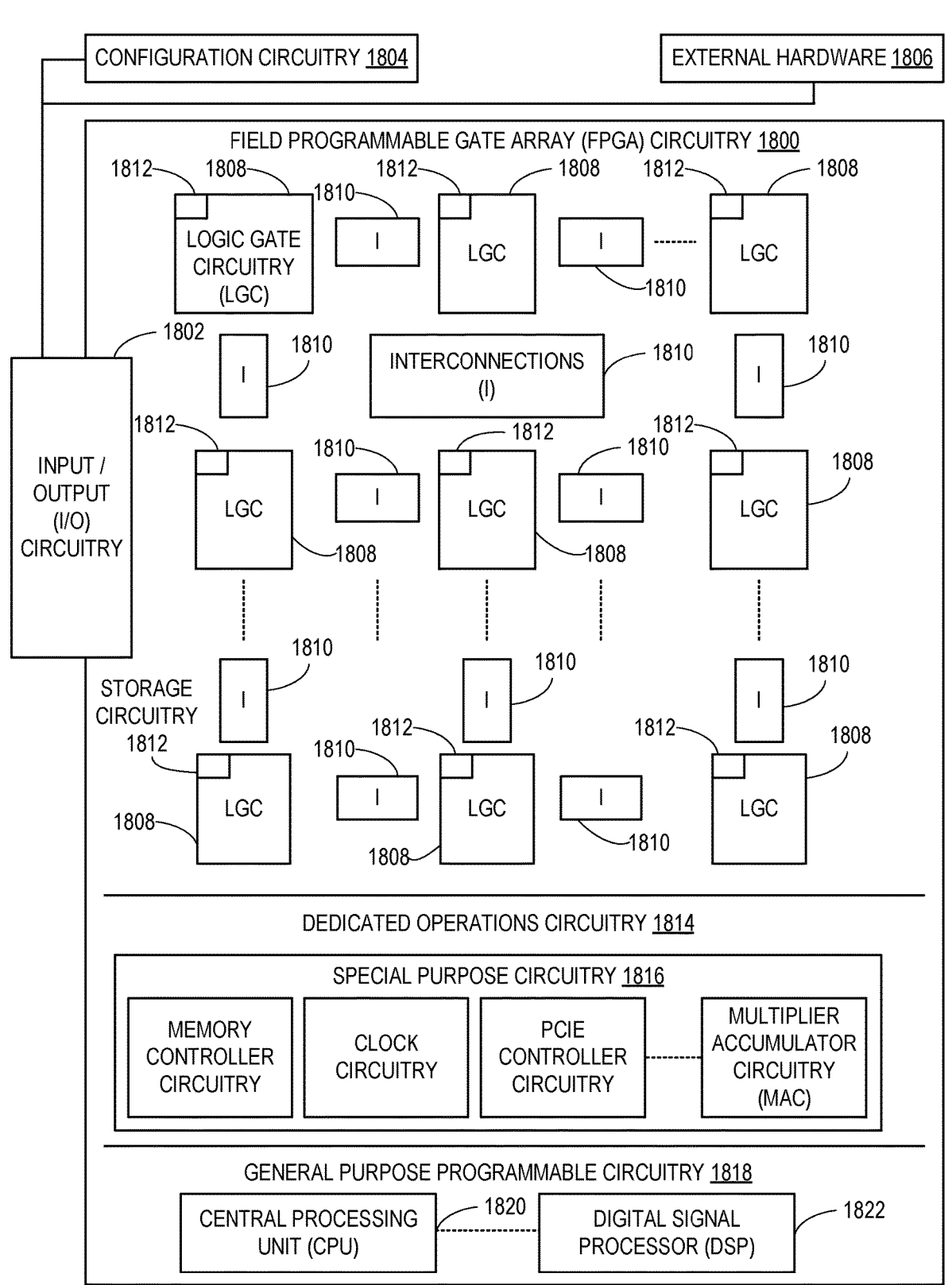
FIG. 18 is a block diagram of another example implementation of the processor circuitry of FIG. 16.

FIG. 18 is a block diagram of another example implementation of the processor circuitry 1612 of FIG. 16. In this example, the processor circuitry 1612 is implemented by FPGA circuitry 1800. For example, the FPGA circuitry 1800 may be implemented by an FPGA. The FPGA circuitry 1800 can be used, for example, to perform operations that could otherwise be performed by the example microprocessor 1700 of FIG. 17 executing corresponding machine readable instructions. However, once configured, the FPGA circuitry 1800 instantiates the machine readable instructions in hardware and, thus, can often execute the operations faster than they could be performed by a general purpose microprocessor executing the corresponding software.

More specifically, in contrast to the microprocessor 1700 of FIG. 17 described above (which is a general purpose device that may be programmed to execute some or all of the machine readable instructions represented by the flowcharts of FIGS. 10-15 but whose interconnections and logic circuitry are fixed once fabricated), the FPGA circuitry 1800 of the example of FIG. 18 includes interconnections and logic circuitry that may be configured and/or interconnected in different ways after fabrication to instantiate, for example, some or all of the machine readable instructions represented by the flowcharts of FIGS. 10-15. In particular, the FPGA circuitry 1800 may be thought of as an array of logic gates, interconnections, and switches. The switches can be programmed to change how the logic gates are interconnected by the interconnections, effectively forming one or more dedicated logic circuits (unless and until the FPGA circuitry 1800 is reprogrammed). The configured logic circuits enable the logic gates to cooperate in different ways to perform different operations on data received by input circuitry. Those operations may correspond to some or all of the software represented by the flowcharts of FIGS. 10-15. As such, the FPGA circuitry 1800 may be structured to effectively instantiate some or all of the machine readable instructions of the flowchart of FIGS. 10-15 as dedicated logic circuits to perform the operations corresponding to those software instructions in a dedicated manner analogous to an ASIC. Therefore, the FPGA circuitry 1800 may perform the operations corresponding to the some or all of the machine readable instructions of FIGS. 10-15 faster than the general purpose microprocessor can execute the same.

In the example of FIG. 18, the FPGA circuitry 1800 is structured to be programmed (and/or reprogrammed one or more times) by an end user by a hardware description language (HDL) such as Verilog. The FPGA circuitry 1800 of FIG. 18, includes example input/output (I/O) circuitry 1802 to obtain and/or output data to/from example configuration circuitry 1804 and/or external hardware 1806. For example, the configuration circuitry 1804 may be implemented by interface circuitry that may obtain machine readable instructions to configure the FPGA circuitry 1800, or portion(s) thereof. In some such examples, the configuration circuitry 1804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1806 may be implemented by external hardware circuitry. For example, the external hardware 1806 may be implemented by the microprocessor 1700 of FIG. 17. The FPGA circuitry 1800 also includes an array of example logic gate circuitry 1808, a plurality of example configurable interconnections 1810, and example storage circuitry 1812. The logic gate circuitry 1808 and the configurable interconnections 1810 are configurable to instantiate one or more operations that may correspond to at least some of the machine readable instructions of FIGS. 10-15 and/or other desired operations. The logic gate circuitry 1808 shown in FIG. 18 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1808 to enable configuration of the electrical structures and/or the logic gates to form circuits to perform desired operations. The logic gate circuitry 1808 may include other electrical structures such as look-up tables (LUTs), registers (e.g., flip-flops or latches), multiplexers, etc.

The configurable interconnections 1810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1808 to program desired logic circuits.

The storage circuitry 1812 of the illustrated example is structured to store result(s) of the one or more of the operations performed by corresponding logic gates. The storage circuitry 1812 may be implemented by registers or the like. In the illustrated example, the storage circuitry 1812 is distributed amongst the logic gate circuitry 1808 to facilitate access and increase execution speed.

The example FPGA circuitry 1800 of FIG. 18 also includes example Dedicated Operations Circuitry 1814. In this example, the Dedicated Operations Circuitry 1814 includes special purpose circuitry 1816 that may be invoked to implement commonly used functions to avoid the need to program those functions in the field. Examples of such special purpose circuitry 1816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1800 may also include example general purpose programmable circuitry 1818 such as an example CPU 1820 and/or an example DSP 1822. Other general purpose programmable circuitry 1818 may additionally or alternatively be present such as a GPU, an XPU, etc., that can be programmed to perform other operations.

Although FIGS. 17 and 18 illustrate two example implementations of the processor circuitry 1612 of FIG. 16, many other approaches are contemplated. For example, as mentioned above, modern FPGA circuitry may include an on-board CPU, such as one or more of the example CPU 1820 of FIG. 18. Therefore, the processor circuitry 1612 of FIG. 16 may additionally be implemented by combining the example microprocessor 1700 of FIG. 17 and the example FPGA circuitry 1800 of FIG. 18. In some such hybrid examples, a first portion of the machine readable instructions represented by the flowchart of FIGS. 10-15 may be executed by one or more of the cores 1702 of FIG. 17, a second portion of the machine readable instructions represented by the flowchart of FIGS. 10-15 may be executed by the FPGA circuitry 1800 of FIG. 18, and/or a third portion of the machine readable instructions represented by the flowcharts of FIGS. 10-15 may be executed by an ASIC. It should be understood that some or all of the circuitry of FIGS. 1-2 may, thus, be instantiated at the same or different times. Some or all of the circuitry may be instantiated, for example, in one or more threads executing concurrently and/or in series. Moreover, in some examples, some or all of the circuitry of FIGS. 1-2 may be implemented within one or more virtual machines and/or containers executing on the microprocessor.

In some examples, the processor circuitry 1612 of FIG. 16 may be in one or more packages. For example, the microprocessor 1700 of FIG. 17 and/or the FPGA circuitry 1800 of FIG. 18 may be in one or more packages. In some examples, an XPU may be implemented by the processor circuitry 1612 of FIG. 16, which may be in one or more packages. For example, the XPU may include a CPU in one package, a DSP in another package, a GPU in yet another package, and an FPGA in still yet another package.

Figure 19:
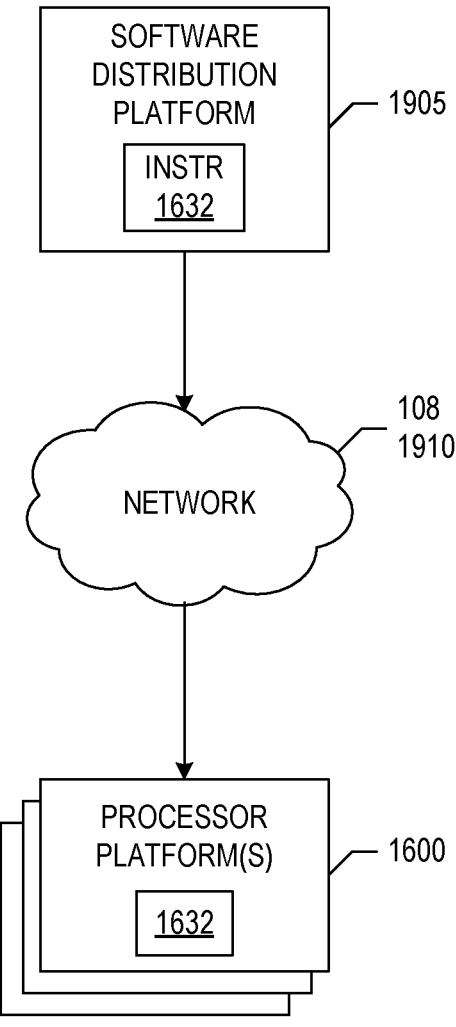
FIG. 19 is a block diagram of an example software distribution platform (e.g., one or more servers) to distribute software (e.g., software corresponding to the example machine readable instructions of FIGS. 10-15) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1905 to distribute software such as the example machine readable instructions 1632 of FIG. 16 to hardware devices owned and/or operated by third parties is illustrated in FIG. 19. The example software distribution platform 1905 may be implemented by any computer server, data facility, cloud service, etc., capable of storing and transmitting software to other computing devices. The third parties may be customers of the entity owning and/or operating the software distribution platform 1905. For example, the entity that owns and/or operates the software distribution platform 1905 may be a developer, a seller, and/or a licensor of software such as the example machine readable instructions 1632 of FIG. 16. The third parties may be consumers, users, retailers, OEMs, etc., who purchase and/or license the software for use and/or re-sale and/or sub-licensing. In the illustrated example, the software distribution platform 1905 includes one or more servers and one or more storage devices. The storage devices store the machine readable instructions 1632, which may correspond to the example machine readable instructions 1008 of FIGS. 10-15, as described above. The one or more servers of the example software distribution platform 1905 are in communication with an example network 1910, which may correspond to any one or more of the Internet and/or any of the example networks 108 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1632 from the software distribution platform 1905. For example, the software, which may correspond to the example machine readable instructions 1008 of FIGS. 10-15, may be downloaded to the example processor platform 1600, which is to execute the machine readable instructions 1632 to implement the line detection circuitry 116. In some examples, one or more servers of the software distribution platform 1905 periodically offer, transmit, and/or force updates to the software (e.g., the example machine readable instructions 1632 of FIG. 16) to ensure improvements, patches, updates, etc., are distributed and applied to the software at the end user devices.

From the foregoing, it will be appreciated that example systems, methods, apparatus, and articles of manufacture have been disclosed that detect lines in a document. Disclosed examples can provide a large improvement on the productivity, error reduction, and digitalization of companies by providing for the technological (e.g., automatic) extraction of data from the a document image. Disclosed examples can boost image processing throughput by enabling the collection of more data with improved accuracy. Disclosed examples provide improved accuracy by utilizing custom nodes that are normalized relative to a stable dimension (e.g., a document width). Disclosed example provide improved accuracy by discarding text strings output by an OCR engine, which removes any impact of text errors output by an OCR engine and prevents hard overfitting. Whereas current techniques to detect lines in image utilize sampling functions that are prone to errors, examples disclosed herein apply a novel sampling function that helps ensure that texts segments oriented on the same line are connected by a sampled edge. Further, whereas current techniques to detect lines in images utilize a connected component algorithm that is prone to erroneously context segments, disclosed examples apply a novel LCC algorithm in which each text segment can only be connected to one text segment on each lateral side.

Disclosed systems, methods, apparatus, and articles of manufacture improve the efficiency of using a computing device by detecting lines in document using bounding box features. Because examples disclosed herein utilize the bounding box features, example line detection pipelines disclosed herein do not operate over an image. As such, disclosed examples avoid a need to load and preprocess the image, and avoid the use of an image backbone for extracting a feature map. In other words, examples disclosed herein reduce the unnecessary consumption of computing resources by not utilizing an image. Further, disclosed examples limits number of connections that need to be evaluated among text segments by utilizing the bounding box coordinates, which accelerates the inference and reduces the amount of required resources. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for detecting lines in documents are disclosed herein. Further examples and combinations thereof include the following:

Example 1 includes an apparatus to detect lines, comprising at least one memory; machine readable instructions; and processor circuitry to at least one of instantiate or execute the machine readable instructions to generate feature embeddings for text segments detected in a document image, the text segments associated with respective bounding boxes, wherein the text segments are to be represented by nodes in a graph; identify candidate edges between ones of the text segments; pass the feature embeddings through graph attention (GAT) layers to update the feature embeddings with information from neighbor nodes; generate an adjacency matrix for the document image by determining confidence scores for the edges based on the updated feature embeddings; and cluster the nodes based on the adjacency matrix to group ones of the nodes that belong to a same line.

Example 2 includes the apparatus of example 1, wherein the document image corresponds to a receipt, and the text segments correspond to words in the receipt image.

Example 3 includes the apparatus of any preceding example, wherein the text segments include the bounding boxes and respective text strings, and wherein the processor circuitry is to discard the text strings.

Example 4 includes the apparatus of any preceding example, wherein the processor circuitry is to generate a first one of the feature embeddings for a first text segment by at least one of instantiating or executing the machine readable instructions to extract features for the feature embeddings from the first text segment, the features including a left center coordinate, a right center coordinate, and a rotation angle of a respective bounding box; normalize the left center and right center coordinates using a width of the document; and concatenate the normalized left and right center coordinates and the rotation angle.

Example 5 includes the apparatus of any preceding example, wherein the processor circuitry is to identify a first candidate edge between a first text segment and a second text segment in response to determining that an absolute value of vertical distance between a center coordinate of the first text segment and a center coordinate of the second text segment is less than a height of the first text segment multiplied by a constant.

Example 6 includes the apparatus of any preceding example, wherein the processor circuitry to at least one of instantiate or execute the machine readable instructions to generate a global node by averaging the feature embeddings, the global node to be passed through the graph attention (GAT) layers with the feature embeddings to provide a global document perspective.

Example 7 includes the apparatus of any preceding example, wherein the graph attention layers include residual connections.

Example 8 includes the apparatus of any preceding example, wherein a sigmoid linear unit (SiLu) activation is applied to an output of ones of the graph attention layers.

Example 9 includes the apparatus of any preceding example, wherein the processor circuitry is to determine a first confidence score for a first edge connecting a first text segment and a second text segment by at least one of instantiating or executing the instructions to identify respective updated feature embeddings for the first text segment and the second text segment; concatenate the updated feature embeddings for the first text segment and the second text segment; and pass the concatenated embeddings for the first text segment and the second text segment edges through a multi-layer perceptron, the multi-layer perceptron including two fully-connected layers, and a sigmoid function.

Example 10 includes the apparatus of any preceding example, wherein the processor circuitry is to cluster the text segments based on the adjacency matrix by at least one of instantiating or executing the instructions to apply a limited connected component algorithm to the adjacency matrix.

Example 11 includes a non-transitory machine readable storage medium comprising instructions that, when executed, cause processor circuitry to at least obtain text segments corresponding to a document image, the text segments including rotated bounding box coordinates, wherein the text segments are to be represented by nodes of a graph; sample edges between ones of the segments to generate a graph, the graph including nodes representing the text segments; generate feature embeddings for the nodes based on geometric features extracted from the text segments; provide the graph and the feature embeddings to graph attention layers, the graph attention layers to determine message passing weight values, the graph attention layers to enrich the feature embeddings with neighborhood nodes and a global node; determine confidence values for the edges based on the enriched feature embeddings; and cluster the text segments by line based on the confidence values to detect lines in the document image.

Example 12 includes the non-transitory machine readable storage medium of example 11, wherein the text segments include text strings, and wherein the instructions, when executed, cause the processor circuitry to dispose of the text strings.

Example 13 includes the non-transitory machine readable storage medium of any preceding example, wherein the instructions, when executed, cause the processor circuitry to extract the geometric features from bounding boxes associated with the text segments, the node features including left center coordinates, right center coordinates, and rotation angles.

Example 14 includes the non-transitory machine readable storage medium of any preceding example, wherein the instructions, when executed, cause the processor circuitry to generate a first one of the feature embeddings for a first text segment by normalizing respective ones of the left and right center coordinates using a width of the document image; and concatenating a respective rotation angle for the first text segment and the normalized left and right center coordinates for the first text segment.

Example 15 includes the non-transitory machine readable storage medium of any preceding example, wherein the instructions, when executed, cause the processor circuitry to identify a first edge between a first text segment and a second text segment in response to determining that an absolute value of vertical distance between a center coordinate of the first text segment and a center coordinate of the second text segment is less than a height of the first segment multiplied by a constant.

Example 16 includes the non-transitory machine readable storage medium of any preceding example, wherein the instructions, when executed, cause the processor circuitry to generate the global node by averaging the feature embeddings for the text segments.

Example 17 includes the non-transitory machine readable storage medium of any preceding example, wherein the document image is an image of a receipt, and the text segments correspond to words in the receipt image.

Example 18 includes the non-transitory machine readable storage medium of any preceding example, where a first one of the text segments can be connected to (a) a second one of the text segments that is laterally adjacent the first one of the text segments in a first direction, and (b) a third one of the text segments that is laterally adjacent the first one of the text segments in a second direction.

Example 19 includes an apparatus comprising means for generating feature embeddings for text segments detected in a document, the text segments to be represented by nodes in a graph; means for sampling edges among the text segments, the edges to connect ones of the text segments; means for performing message passing in a graph attention network, the means for performing message passing to generate augmented feature embeddings for the text segments; means for extracting confidence scores for the sampled edges based on the augmented feature embeddings; and means for clustering the text segments.

Example 20 includes the apparatus of example 19, wherein the text segments include text strings, the means for generating the feature embeddings is to remove text strings.

Example 21 includes the apparatus of any preceding example, wherein the means for generating the feature embeddings is to extract bounding box features from the text segments, the bounding box features including left-center coordinates, right-center coordinates, and rotation angles.

Example 22 includes the apparatus of any preceding example, wherein the means for generating the feature embeddings is to concatenate ones of the bounding box features corresponding to respective text segments.

Example 23 includes the apparatus of any preceding example, wherein means for performing message passing generate a global node by average the feature embeddings for the text segment and to use the global node to add a global aspect to the augmented feature embeddings for the text segments.

Example 24 includes the apparatus of any preceding example, wherein the means for extracting is to apply a multi-layer perceptron model to the augmented feature embeddings and the sampled edges.

Example 25 includes the apparatus of any preceding example, wherein the means for clustering is to apply a limited connected components (LCC) algorithm to the confidence scores to group the text segments by line.

Example 26 includes a method comprising generating feature embeddings for nodes representing text segments detected in a document image based on features extracted from the text segments, the text segments associated with bounding box coordinates; identifying edges between ones of the text segments based on the bounding box coordinates of the text segments; obtaining enriched feature embeddings for the nodes by providing the features of the nodes to a series of graph attention (GAT)layers; determining confidence values for pairs of nodes connected by the edges; and grouping the text segments by line based on the confidence values.

Example 27 includes the method of example 26, wherein the text segments include text information, further including removing the text information.

Example 28 includes the method of any preceding example, wherein extracted features for ones of the text segments include respective left center coordinates, respective right center coordinate, and respective rotation angle of respective bounding boxes.

Example 29 includes the method of any preceding example, wherein the generating the feature embeddings includes normalizing the left and right center coordinates using a width of the document image; and concatenating, for ones of the nodes, the normalized left and right center coordinates and respective rotation angle.

Example 30 includes the method of any preceding example, wherein the identifying the edges includes identifying a first vertical distance between a first one of the text segments and a second ones of the text segments; and determining that an absolute value of the first vertical distance is less than a first height of the first ones of the text segments multiplied by a constant.

Example 31 includes the method of any preceding example, wherein the determining the confidence values includes concatenating, for ones of the pairs of nodes, respective enriched features corresponding to the nodes of the pair; and applying a multi-layer perceptron.

Example 32 includes the method of any preceding example, wherein the document image is an image of a receipt, and the text segments correspond to words in the receipt image.

Example 33 includes the method of any preceding example, wherein the series of graph attention (GAT) layers includes (a) three GAT layers, each of which is followed by a sigmoid linear unit activations, and (b) a fourth GAT layer to output the enriched feature embeddings.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to detect lines, comprising:
at least one memory;
machine readable instructions; and
at least one processor circuit to be programmed by the machine readable instructions to:
  generate feature embeddings for text segments detected in a document image, the text segments associated with respective bounding boxes, wherein the text segments are to be represented by nodes in a graph;
  identify candidate edges between ones of the text segments;

pass the feature embeddings through graph attention (GAT) layers to update the feature embeddings with information from neighbor nodes;
  generate an adjacency matrix for the document image by determining confidence scores for the candidate edges based on the updated feature embeddings; and
  cluster the nodes based on the adjacency matrix to group ones of the nodes that belong to a same line.

2. The apparatus of claim 1, wherein the document image corresponds to a receipt, and the text segments correspond to words in the receipt image.

3. The apparatus of claim 1, wherein the text segments include the bounding boxes and respective text strings, and wherein one or more of the at least one processor circuit is to discard the text strings.

4. The apparatus of claim 1, wherein one or more of the at least one processor circuit is to generate a first one of the feature embeddings for a first text segment of the text segments by:
  extracting features for the feature embeddings from the first text segment, the features including a left center coordinate, a right center coordinate, and a rotation angle of a respective bounding box;
  normalizing the left center and right center coordinates using a width of the document; and
  concatenating the normalized left and right center coordinates and the rotation angle.

5. The apparatus of claim 1, wherein one or more of the at least one processor circuit is to identify a first candidate edge between a first text segment and a second text segment of the text segments in response to determining that an absolute value of vertical distance between a center coordinate of the first text segment and a center coordinate of the second text segment is less than a height of the first text segment multiplied by a constant.

6. The apparatus of claim 1, wherein one or more of the at least one processor circuit is to generate a global node by averaging the feature embeddings, the global node to be passed through the GAT layers with the feature embeddings to provide a global document perspective.

7. The apparatus of claim 1, wherein the graph attention layers include residual connections.

8. The apparatus of claim 1, wherein one or more of the at least one processor is to apply a sigmoid linear unit (SiLu) activation to an output of ones of the graph attention layers.

9. The apparatus of claim 1, wherein one or more of the at least one processor circuit is to determine a first confidence score for a first edge connecting a first text segment and a second text segment of the text segments by:
  identifying respective updated feature embeddings for the first text segment and the second text segment;
  concatenating the updated feature embeddings for the first text segment and the second text segment; and
  passing the concatenated feature embeddings for the first text segment and the second text segment through a multi-layer perceptron, the multi-layer perceptron including two fully-connected layers and a sigmoid function.

10. The apparatus of claim 1, wherein one or more of the at least one processor circuit is to cluster the text segments based on the adjacency matrix by applying a limited connected component algorithm to the adjacency matrix.

11. At least one non-transitory machine readable storage medium comprising machine readable instructions to cause at least one processor circuit to at least:

obtain text segments corresponding to a document image, the text segments including rotated bounding box coordinates, wherein the text segments are to be represented by nodes of a graph;

sample edges between ones of the text segments to generate a graph, the graph including nodes representing the text segments;

generate feature embeddings for the nodes based on geometric features extracted from the text segments;

provide the graph and the feature embeddings to graph attention layers, the graph attention layers to determine message passing weight values, the graph attention layers to enrich the feature embeddings with neighborhood nodes and a global node;

determine confidence values for the edges based on the enriched feature embeddings; and cluster the text segments by line based on the confidence values to detect lines in the document image.

12. The at least one non-transitory machine readable storage medium of claim 11, wherein the text segments include text strings, the machine readable instructions are to cause one or more of the at least one processor circuit to dispose of the text strings.

13. The at least one non-transitory machine readable storage medium of claim 11, wherein the machine readable instructions are to cause one or more of the at least one processor circuit to extract the geometric features from bounding boxes associated with the text segments, the geometric features including left center coordinates, right center coordinates, and rotation angles.

14. The at least one non-transitory machine readable storage medium of claim 13, wherein the machine readable instructions are to cause one or more of the at least one processor circuit to generate a first one of the feature embeddings for a first text segment of the text segments by:

normalizing respective ones of the left and right center coordinates using a width of the document image; and concatenating a respective rotation angle for the first text segment and the normalized left and right center coordinates for the first text segment.

15. The at least one non-transitory machine readable storage medium of claim 11, wherein the machine readable instructions are to cause one or more of the at least one processor circuit to identify a first edge between a first text segment and a second text segment in response to determining that an absolute value of vertical distance between a center coordinate of the first text segment and a center coordinate of the second text segment is less than a height of the first text segment multiplied by a constant.

16. The at least one non-transitory machine readable storage medium of claim 11, wherein the machine readable instructions are to cause one or more of the at least one processor circuit to generate the global node by averaging the feature embeddings for the text segments.

17. The at least one non-transitory machine readable storage medium of claim 11, wherein the document image is an image of a receipt, and the text segments correspond to words in the receipt image.

18. The at least one non-transitory machine readable storage medium of claim 11, where a first one of the text segments is connected to (a) a second one of the text segments that is laterally adjacent the first one of the text segments in a first direction, and (b) a third one of the text segments that is laterally adjacent the first one of the text segments in a second direction.

19. An apparatus comprising:

means for extracting node features to generate feature embeddings for text segments detected in a document, the text segments associated with bounding boxes and represented by nodes in a graph;

means for sampling edges to identify candidate edges between ones of the text segments;

means for message passing to pass the feature embeddings through graph attention (GAT) layers, the means for message passing to update the feature embeddings for the text segments with information from neighbor nodes;

means for generating confidence scores to generate an adjacency matrix for the document by determining confidence scores for the candidate edges based on the updated feature embeddings; and means for grouping to cluster the nodes based on the adjacency matrix to group ones of the nodes that belong to a same line.

20. The apparatus of claim 19, wherein the text segments include text strings, the means for extracting node features to remove text strings.

21. The apparatus of claim 19, wherein the means for extracting node features is to extract bounding box features from the text segments, the bounding box features including left-center coordinates, right-center coordinates, and rotation angles.

22. The apparatus of claim 21, wherein the means for extracting node features is to concatenate ones of the bounding box features corresponding to respective text segments.

23. The apparatus of claim 19, wherein the means for message passing is to generate a global node by averaging the feature embeddings for the text segments and to add a global aspect to the updated feature embeddings for the text segments based on the global node.

24. The apparatus of claim 19, wherein the means for generating confidence scores is to apply a multi-layer perceptron model to the updated feature embeddings and the candidate edges.

25. The apparatus of claim 19, wherein the means for grouping is to apply a limited connected components (LCC) algorithm to the confidence scores to group the text segments by line.

* * * * *